US010203434B2

(12) United States Patent
Constantz et al.

(10) Patent No.: US 10,203,434 B2
(45) Date of Patent: Feb. 12, 2019

(54) HIGHLY REFLECTIVE MICROCRYSTALLINE/AMORPHOUS MATERIALS, AND METHODS FOR MAKING AND USING THE SAME

(71) Applicant: Blue Planet, Ltd., Los Gatos, CA (US)

(72) Inventors: Brent R. Constantz, Portola Valley, CA (US); Chris Camire, Morgan Hill, CA (US); Seung-Hee Kang, San Jose, CA (US)

(73) Assignee: BLUE PLANET, LTD., Los Gatos, CA (US)

( * ) Notice: Subject to any disclaimer, the term of this patent is extended or adjusted under 35 U.S.C. 154(b) by 700 days.

(21) Appl. No.: 14/214,129

(22) Filed: Mar. 14, 2014

(65) Prior Publication Data

US 2014/0271440 A1 Sep. 18, 2014

Related U.S. Application Data

(60) Provisional application No. 61/943,992, filed on Feb. 24, 2014, provisional application No. 61/866,985, filed on Aug. 16, 2013, provisional application No. 61/793,661, filed on Mar. 15, 2013.

(51) Int. Cl.
| | |
|---|---|
| *B32B 13/04* | (2006.01) |
| *G02B 5/08* | (2006.01) |
| *C01F 11/18* | (2006.01) |
| *C01F 5/24* | (2006.01) |
| *E04D 7/00* | (2006.01) |
| *C04B 26/26* | (2006.01) |
| *C04B 28/02* | (2006.01) |
| *E04D 13/16* | (2006.01) |
| *C09C 1/02* | (2006.01) |
| *C04B 111/00* | (2006.01) |

(52) U.S. Cl.
CPC .............. *G02B 5/0808* (2013.01); *C01F 5/24* (2013.01); *C01F 11/18* (2013.01); *C01F 11/181* (2013.01); *C04B 26/26* (2013.01); *C04B 28/02* (2013.01); *C09C 1/02* (2013.01); *C09C 1/021* (2013.01); *E04D 7/005* (2013.01); *E04D 13/1618* (2013.01); *E04D 13/1675* (2013.01); *G02B 5/0891* (2013.01); *C01P 2002/82* (2013.01); *C01P 2004/02* (2013.01); *C01P 2004/03* (2013.01); *C01P 2004/50* (2013.01); *C01P 2006/60* (2013.01); *C04B 2111/0075* (2013.01); *C04B 2111/00586* (2013.01); *Y02P 40/18* (2015.11); *Y10T 428/24372* (2015.01)

(58) Field of Classification Search
CPC .................................................... B32B 13/04
USPC ........... 52/596, 750; 423/230, 220; 422/176; 428/221, 537.7, 446, 230, 220; 106/817, 106/772, 15.05, 789, 705
See application file for complete search history.

(56) References Cited

U.S. PATENT DOCUMENTS

| | | | |
|---|---|---|---|
| 4,112,052 A | 9/1978 | Sartori et al. | |
| 4,729,883 A | 3/1988 | Lam et al. | |
| 6,132,696 A | 10/2000 | Porter et al. | |
| 6,174,360 B1 | 1/2001 | Sliwinski et al. | |
| 6,217,851 B1 | 4/2001 | Kleinberg et al. | |
| 6,541,112 B1 | 4/2003 | Swiler et al. | |
| 6,908,507 B2 | 6/2005 | Lalande et al. | |
| 7,132,090 B2 | 11/2006 | Dziedzic et al. | |
| 7,596,952 B2 | 10/2009 | Fradette et al. | |
| 7,642,076 B2 | 1/2010 | Dziedzic et al. | |
| 7,867,562 B2 | 1/2011 | Wisniewski et al. | |
| 7,998,714 B2 | 8/2011 | Gellett et al. | |
| 8,070,856 B2 | 12/2011 | Rochelle et al. | |
| 8,394,350 B2 | 3/2013 | Aines | |
| 8,394,498 B2 | 3/2013 | Shiao et al. | |
| 8,491,985 B2 | 7/2013 | Kalkanoglu et al. | |
| 8,535,803 B2 | 9/2013 | Shiao et al. | |
| 2001/0022952 A1 | 9/2001 | Rau et al. | |
| 2005/0126441 A1 | 6/2005 | Skelhorn | |
| 2005/0142329 A1 | 6/2005 | Anderson et al. | |
| 2006/0128004 A1 | 6/2006 | Anctil et al. | |
| 2006/0185985 A1 | 8/2006 | Jones | |
| 2007/0030574 A1 | 2/2007 | Watanabe | |
| 2007/0218044 A1 | 9/2007 | Muller et al. | |
| 2009/0169452 A1* | 7/2009 | Constantz .......... | B01D 53/1425 423/230 |
| 2009/0202410 A1 | 8/2009 | Kawatra et al. | |
| 2010/0068784 A1 | 3/2010 | Dziedzic et al. | |
| 2010/0077691 A1* | 4/2010 | Constantz ............... | C04B 22/10 52/596 |
| 2010/0260925 A1 | 10/2010 | Brady | |
| 2010/0300894 A1 | 12/2010 | Lin et al. | |
| 2011/0081537 A1 | 4/2011 | Sexauer et al. | |
| 2011/0116998 A1 | 5/2011 | Van Straelen | |
| 2011/0151537 A1 | 6/2011 | Lightstone et al. | |

(Continued)

FOREIGN PATENT DOCUMENTS

| | | |
|---|---|---|
| CA | 2607928 A1 | 4/2008 |
| EP | 1546319 A1 | 6/2005 |

(Continued)

OTHER PUBLICATIONS

Berg, et al. "Mg2+ tunes the wettability of liquid precursors of CaCO3: Towards controlling mineralization sites in hybrid materials", J Am Chem Soc (Aug. 2013), 135(34):12512-12515.

(Continued)

*Primary Examiner* — Monique R Peets
(74) *Attorney, Agent, or Firm* — Bret E. Field; Bozicevic, Field & Francis LLP

(57) ABSTRACT

Compositions comprising highly reflective microcrystalline/amorphous materials are provided. In some instances, the highly reflective materials are microcrystalline or amorphous carbonate materials, which may include calcium and/or magnesium carbonate. In some instances, the materials are $CO_2$ sequestering materials. Also provided are methods of making and using the compositions, e.g., to increase the albedo of a surface, to mitigate urban heat island effects, etc.

18 Claims, 13 Drawing Sheets

(56) References Cited

U.S. PATENT DOCUMENTS

| | | | |
|---|---|---|---|
| 2011/0223385 A1 | 9/2011 | Shiao et al. | |
| 2011/0223650 A1 | 9/2011 | Saunders et al. | |
| 2011/0290156 A1 | 12/2011 | Constantz et al. | |
| 2012/0011783 A1 | 1/2012 | Jacobs et al. | |
| 2012/0082839 A1* | 4/2012 | Ha | C04B 22/10 428/221 |
| 2012/0199535 A1 | 8/2012 | Valdez et al. | |
| 2012/0227630 A1 | 9/2012 | Gray | |
| 2012/0296117 A1 | 11/2012 | Wu | |
| 2012/0308457 A1 | 12/2012 | Yoon et al. | |
| 2013/0019781 A1 | 1/2013 | Stratton et al. | |
| 2013/0101493 A1 | 4/2013 | Okabe et al. | |
| 2013/0171414 A1 | 7/2013 | Shiao et al. | |
| 2014/0186582 A1 | 7/2014 | Hong et al. | |

FOREIGN PATENT DOCUMENTS

| | | |
|---|---|---|
| FR | 2830249 A1 | 4/2003 |
| WO | 2008008624 A2 | 1/2008 |
| WO | WO 2008018928 A2 | 2/2008 |
| WO | 2008147972 A2 | 12/2008 |
| WO | WO 2008148055 A1 | 12/2008 |
| WO | 2009006213 A2 | 1/2009 |
| WO | 2009061939 A2 | 5/2009 |
| WO | 2009062178 A2 | 5/2009 |
| WO | WO 2009086460 A1 | 7/2009 |
| WO | 2009111281 A2 | 9/2009 |
| WO | WO 2009146436 A1 | 12/2009 |
| WO | WO 2009155378 A1 | 12/2009 |
| WO | WO 2010006242 A1 | 1/2010 |
| WO | WO 2010039903 A1 | 4/2010 |
| WO | WO 2010039909 A1 | 4/2010 |
| WO | WO 2010048457 A1 | 4/2010 |
| WO | WO 2010051458 A1 | 5/2010 |
| WO | WO 2010068924 A1 | 6/2010 |
| WO | WO 2010091029 A1 | 8/2010 |
| WO | WO 2010101953 A1 | 9/2010 |
| WO | WO 2010104989 A1 | 9/2010 |
| WO | WO 2010132863 A1 | 11/2010 |
| WO | WO 2011017609 A1 | 2/2011 |
| WO | WO 2011049996 A1 | 4/2011 |
| WO | WO 2011081681 A1 | 7/2011 |
| WO | WO 2012005867 A1 | 1/2012 |
| WO | WO 2012018434 A1 | 2/2012 |
| WO | WO 2012079173 A1 | 6/2012 |
| WO | WO 2012149173 A2 | 11/2012 |

OTHER PUBLICATIONS

Berner, et al. "The Carbonate-silicate geochemical cycle and its effect on atmospheric carbon dioxide over the past 100 million years", American Journal of Science (Sep. 1983), 283:641-683.

Bewernitz, et al. "A metastable liquid precursor phase of calcium carbonate and its interactions with polyaspartate", The Royal Society of Chemistry (Jun. 2012), 159:291-312.

Bhaduri, et al. "Nickel nanoparticles catalyse reversible hydration of carbon dioxide for mineralization carbon capture and storage", Catal. Sci. Technol. (Jan. 2013), 3:1234-1239.

Bindeman, et al. "Oxygen Isotopes in Mantle and Crustal Magmas as Revealed by Single Crystal Analysis", Reviews in Mineralogy & Geochemistry (2008), 69:445-478.

Brehm, et al. "The role of microorganisms and biofilms in the breakdown and dissolution of quartz and glass", Palaeo (Apr. 2005), 219(1-2):117-129.

Caldeira, et al. "Ocean storage", IPCC Special Report on Carbon dioxide Capture and Storage (2006), ISBN: 0521685516.

Combes, et al. "Calcium Carbonate Biphasic Cement Concept to Control Cement Resorption", European Cells and Materials (2006),11:8.

Combes, et al. "Preparation, physical-chemical characterisation and cytocompatibility of calcium carbonate cements", Biomaterials (Sep. 2006), 1945-1954.

"Corporate and Technology Presentation", CO2 Solutions Inc (Nov. 2012).

Dorvee, et al. "Water in the formation of biogenic minerals: Peeling away the hydration layers", J Struct Biol (Aug. 2013), 183(2):278-303.

Dunsmore, et al. "A geological perspective on global warming and the possibility of carbon dioxide removal as calcium carbonate mineral", Energy Conyers Mgmt (1992), 33(5-8):565-572.

Ehrlich, et al. "Modern Views on Desilicification: Biosilica and Abiotic Silica Dissolution in Natural and Artificial Environments", Chem Rev (2010), 110:4656-4689.

England, et al. "On the hydration and hydrolysis of carbon dioxide", Chemical Physics Letters (2011), 514:187-195.

Garcia-Ruiz, et al. "Morphogenesis of Self-Assembled Nanocrystalline Materials of Barium Carbonate and Silica", Science (Jan. 2009), 323:362-365.

Gebauer, et al. "Prenucleation clusters and non-classical nucleation", Nano Today (Jun. 2011), 6:564-584.

Gebauer, et al. "Stable Prenucleation Calcium Carbonate Clusters", Science (Dec. 2008), 322(5909):1819-1822.

Greene, et al. "Chemical Admixtures for Concrete: Prepared under the direction and supervision of ACI Committee E-701, Materials for Concrete Construction", ACI Education Bulletin E3-13 (Aug. 2013), E31-E326.

El-Hassan, "Reaction Products in Carbonation-Cured Lightweight Concrete," Journal of Materials in Civil Engineering (Jun. 2013), 25(6):799-809.

Hosoi, et al. "Low temperature solidification of calcium carbonate through vaterite-calcite wet transformation," Journal of Materials Science Letters (May 1996),15(9):812-814.

Hu, et al. "The thermodynamics of calcite nucleation at organic interfaces: Classical vs. non-classical pathways", Faraday Discuss (2012), 159:509-523.

Kozoil, et al. "Toward a Small Molecule, Biomimetic Carbonic Anhydrase Model: Theoretical and Experimental Investigations of a Panel of Zinc(II) Aza-Macrocyclic Catalysts", Inorg Chem (Jun. 2012), 51(12):6803-6812.

Masse, et al. "Modification of the Stober Process by a Polyazamacrocycle Leading to Unusual Core—Shell Silica Nanoparticles", Langmuir (2008), 24:4026-4031.

McGrath, et al. "Sea urchin nickel 'trick' could be key to capturing carbon", BBC News (Feb. 2013), 1-2.

Meldrum, et al. "Now You See Them", Science (Dec. 2008), 322(5909):1802-1803.

Park, et al. "Density, Viscosity, and Solubility of CO2 in Aqueous Solutions of 2-Amino-2-hydroxymethyl-1-1,3-propanediol", J. Chem. Eng (2002), 47:970-973.

Park, et al. "Effect of steric hindrance on carbon dioxide absorption into new amine solutions: thermodynamic and spectroscopic verification through solubility and NMR analysis", Environ Sci Technol (2003), 37:1670-1675.

Schroder, et al. "Silicateins, silicase and spicule-associated proteins: synthesis of demosponge silica skeleton and nanobiotechnological applications", Porfeira Research: Biodiversity, Innovation, and Sustainability (2007), 581-592.

Schumacher, et al. "Oxygen isotopic signature of CO2 from combustion processes", Atmos Chem Phys (2011), 1473-1490.

Su, et al. "Structural characterization of amorphous calcium carbonate-binding protein: an insight into the mechanism of amorphous calcium carbonate formation", Biochem J (2013), 453:179-186.

Zuddas, et al. "Kinetics of calcite precipitation from seawater: I. A classical chemical kinetics description for strong electrolyte solutions", Pergamon (1994), 58(20):4353-4362.

"Acrylic Coating"; (Material Safety Data Sheet) MSDS-A179; National Coatings Corporation; revision date: Dec. 17, 2007 (2007); 2pp.

BASF; "Rheocolor® L Liquid-Coloring Admixtures for Cool-Color Concrete"; website: http://www.basf-admixtures.com/en/sustainability/eco_friendly/cool_color/Pages/default.aspx; download date Jul. 11, 2014 (2014); 1pp.

Georgescu et al.; "Urban adaptation can roll back warming of emerging megapolitan regions"; PNAS; www.pnas.org/cgi/doi/10.1073/pnas.1322280111; (2014); 6 pp.

(56) References Cited

OTHER PUBLICATIONS

Itch et al., "Study on the spectral albedo in the geometrically complex urban spaces"; National Institute for Land and Infrastructure Management; The seventh International Conference on Urban Climate; Jun. 9-Jul. 3, 2009, Yokohama, Japan (2009); 4 pp.
Hansen et al.; "Target atmospheric CO2: Where should humanity aim?." arXiv preprint arXiv:0804.1126 (2008). 20pp.
Taha et al.; "Residential Cooling Loads and the Urban Heat Island—The effects of Albedo"; Building and Environment, vol. 23, No. 4; (1988) pp. 271-283; 13pp.
Taha, H.; "Urban climates and heat islands: albedo, evapotranspiration, and anthropogenic heat" Energy and Buildings 25 (1997) pp. 99-103; 5pp.
Petit et al., "Climate and atmospheric history of the past 420,000 years from the Vosktok ice core, Antarctica" Nature; vol. 399; Jun. 3, 1999 (1999); pp. 429-436; 8pp.
Wiscombe et al. "A model for the Spectral Albedo of Snow. I: Pure Snow" Journal of the Atmospheric Sciences, vol. 37; (1980) pp. 2712-2733; 22pp.
Levinson et al., "Methods of creating solar-reflective nonwhite surfaces and their application to residential roofing materials" Solar Energy Materials & Solar Cells, 91 (2007); 304-314; 11pp.
Hadley et al., "Black-carbon reduction of snow albedo" Nature Climate Change, vol. 2; Jun. 2012; www.nature.com/natureclimatechange; (2012) pp. 437-440; 4pp.
Miller et al. "Special infrared reflective pigments make a dark roof reflect almost like a white roof." in Thermal Performance of the Exterior Envelopes of Buildings, IX, proceedings of ASHRAE Therm VIII, Clearwater, FL., (Dec. 2004); 11pp.
Synnefa et al. "On the development, optical properties and thermal performance of cool colored coatings for the urban environment"; Solar Energy 81 (2007) 488-497; 10pp.

\* cited by examiner

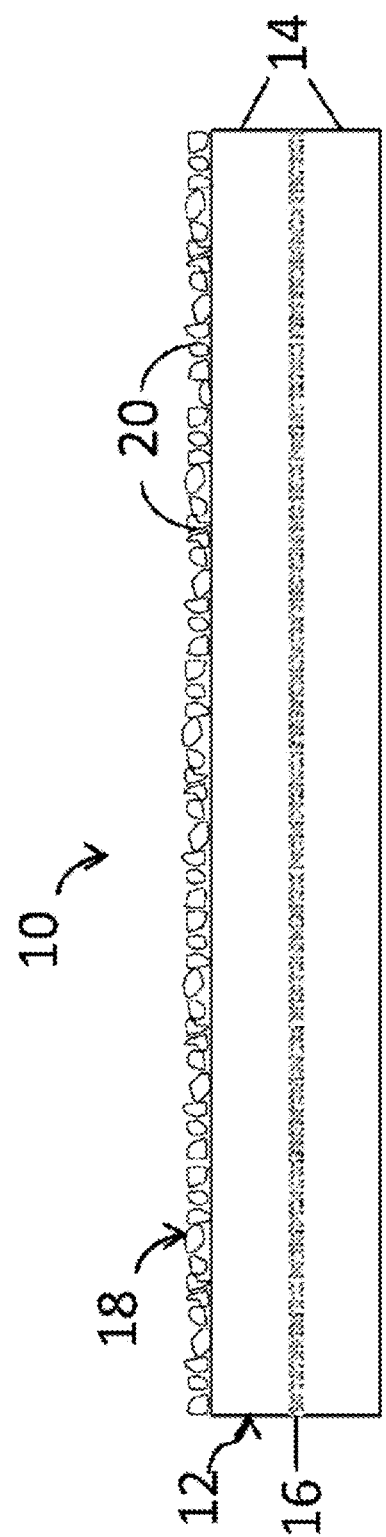

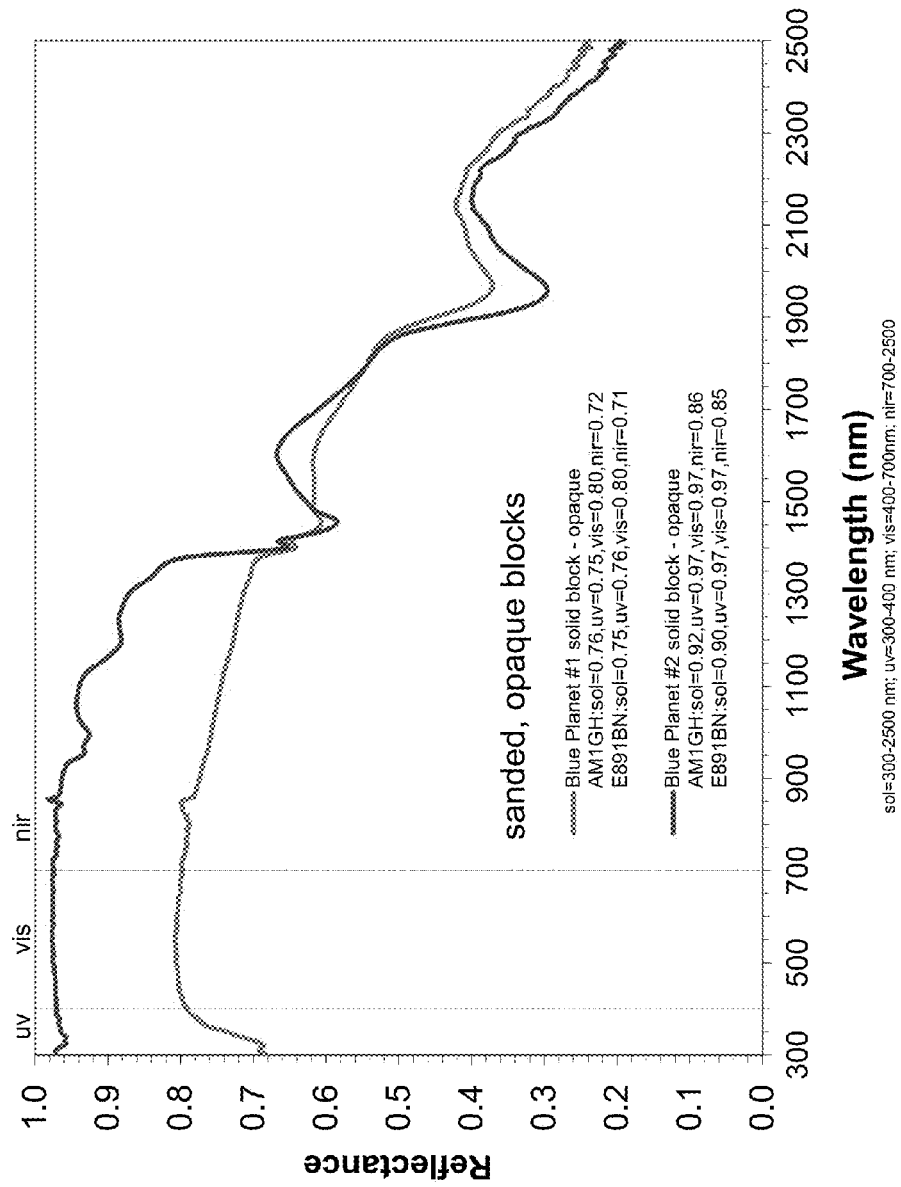

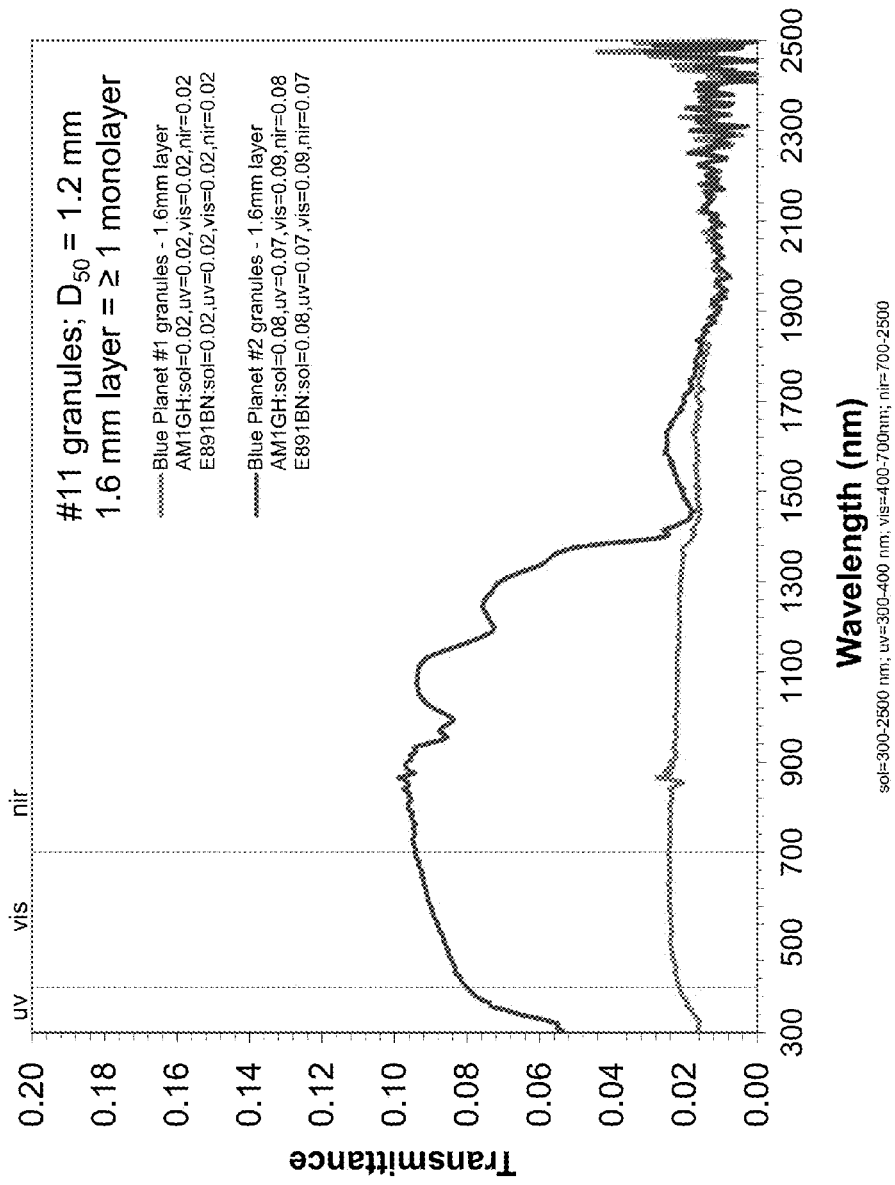

HIGHLY REFLECTIVE MICROCRYSTALLINE/AMORPHOUS MATERIALS, AND METHODS FOR MAKING AND USING THE SAME

CROSS REFERENCE TO RELATED APPLICATIONS

Under 35 U.S.C. § 119(e), this application claims priority to the filing date of U.S. Provisional Patent Application Ser. No. 61/943,992, filed on Feb. 24, 2014; U.S. Provisional Patent Application Ser. No. 61/866,985 filed on Aug. 16, 2013 and U.S. Provisional Patent Application Ser. No. 61/793,661 filed on Mar. 15, 2013; the disclosures of which applications are incorporated herein by reference

INTRODUCTION

As the development of cities replaces natural lands, forests and open grassy fields with pavements, buildings and other infrastructures, the relationship between incoming sun radiation and outgoing terrestrial radiation has been changed. The conversion of pervious surfaces to impervious surfaces alters local energy balances through changes in (1) the albedos of surfaces; (2) the heat capacities and thermal conductivities of surfaces; (3) the ratio of sensible heat to latent heat flowing from the surface into the atmosphere. Moreover, displacing trees and vegetation minimizes the natural cooling effects of shading and evaporation of water from soil and leaves (evapotranspiration); and tall buildings and narrow streets can heat air trapped between them and reduce air flow. In addition, waste heat from vehicles, factories, and air conditioners may add warmth to their surroundings. These changes in urban areas lead to urban air and surface temperatures are higher than nearby rural areas. This is referred to as "heat island" effect. Many U.S. cities and suburbs in summertime have air temperatures up to 5.6° C. (10° F.) warmer than the surrounding natural land cover. In some cities in the world the air temperatures in summer have up to 10° C. (18° F.) higher than the rural areas.

Heat islands are of growing concerns. Elevated temperatures in summertime can impact communities by increasing energy demand, air conditioning costs, air pollution levels, and heat-related illness and mortality. Summertime heat islands may also contribute to global warming by increasing demand for air conditioning, which results in additional power plant emissions of heat-trapping greenhouse gases. In U.S. cities with populations over 100,000, peak utility loads increase 2.5 to 3.5% for every 1° C. (1.8° F.) increase in summertime temperature. Higher temperatures in urban heat islands bring with them increased energy use, mostly due to a greater demand for air conditioning. Steadily increasing downtown temperatures over the last several decades mean that 3 to 8% of community-wide demand for electricity is used to compensate for the heat island effect. On warm afternoons in Los Angeles, for example, the demand for electric power rises nearly 2% for every 0.56° C. (1° F.) of the daily maximum temperature rises. In total, it is estimated that about 1 to 1.5 gigawatts of power are used to compensate for the impact of the heat island.

The heat island effect is one factor among several that can raise summertime temperatures to levels that pose a threat to human health. Extremely hot weather can result in illness including physiological disruptions and organ damage and even death. Excessive heat events or abrupt and dramatic temperature increases are particularly dangerous and can result in above average rates of mortality. Under certain conditions, excessive heat also can increase the rate of ground-level ozone formation, or smog, presenting an additional threat to health and ecosystems within and downwind of cities. It is estimated that probability of smog increases by 3% for every 0.56° C. (1° F.) rise in daily maximum temperature above 21° C. (70° F.). Ozone can be formed when precursor compounds react in the presence of sunlight and high temperatures. Exposure to ambient ozone, even at low levels, may trigger a variety of health problems, especially in vulnerable populations such as children, the elderly, and those with pre-existing respiratory disease. Because wind can carry ozone and its precursors hundreds of miles, even residents far away from urban centers and sources of pollution can be at risk. The specific health effects associated with ozone exposure include irritating lung airways and causing inflammation, possible permanent lung damage by repeated exposure to ozone pollution for several months, as well as resulting in aggravated asthma, reduced lung capacity, and increased susceptibility to respiratory illnesses by even low-level exposure, etc. In addition, ozone pollution can damage vegetation and ecosystems within and downwind of cities. For instance, ground-level ozone interferes with the ability of plants to grow and store food. Ozone also damages the foliage of trees and other vegetation, reducing crop and forest yields, and tarnishing the visual appeal of ornamental species and urban green spaces.

SUMMARY

Compositions comprising highly reflective microcrystalline/amorphous materials are provided. In some instances, the highly reflective materials are microcrystalline or amorphous carbonate materials, which may include calcium and/or magnesium carbonate. In some instances, the materials are $CO_2$ sequestering materials. Also provided are methods of making and using the compositions, e.g., to increase the albedo of a surface, to mitigate urban heat island effects, etc.

BRIEF DESCRIPTION OF THE FIGURES

FIG. 1 is a schematic view of a roof shingle according to an embodiment of the present invention.

FIG. 3A provides graphical results of the observed reflectance of a solid block of BP#1 and BP#2. FIG. 3B provides graphical results of the observed reflectance of a #11 granules of BP#1 and BP#2.

DETAILED DESCRIPTION

Figure 2A:
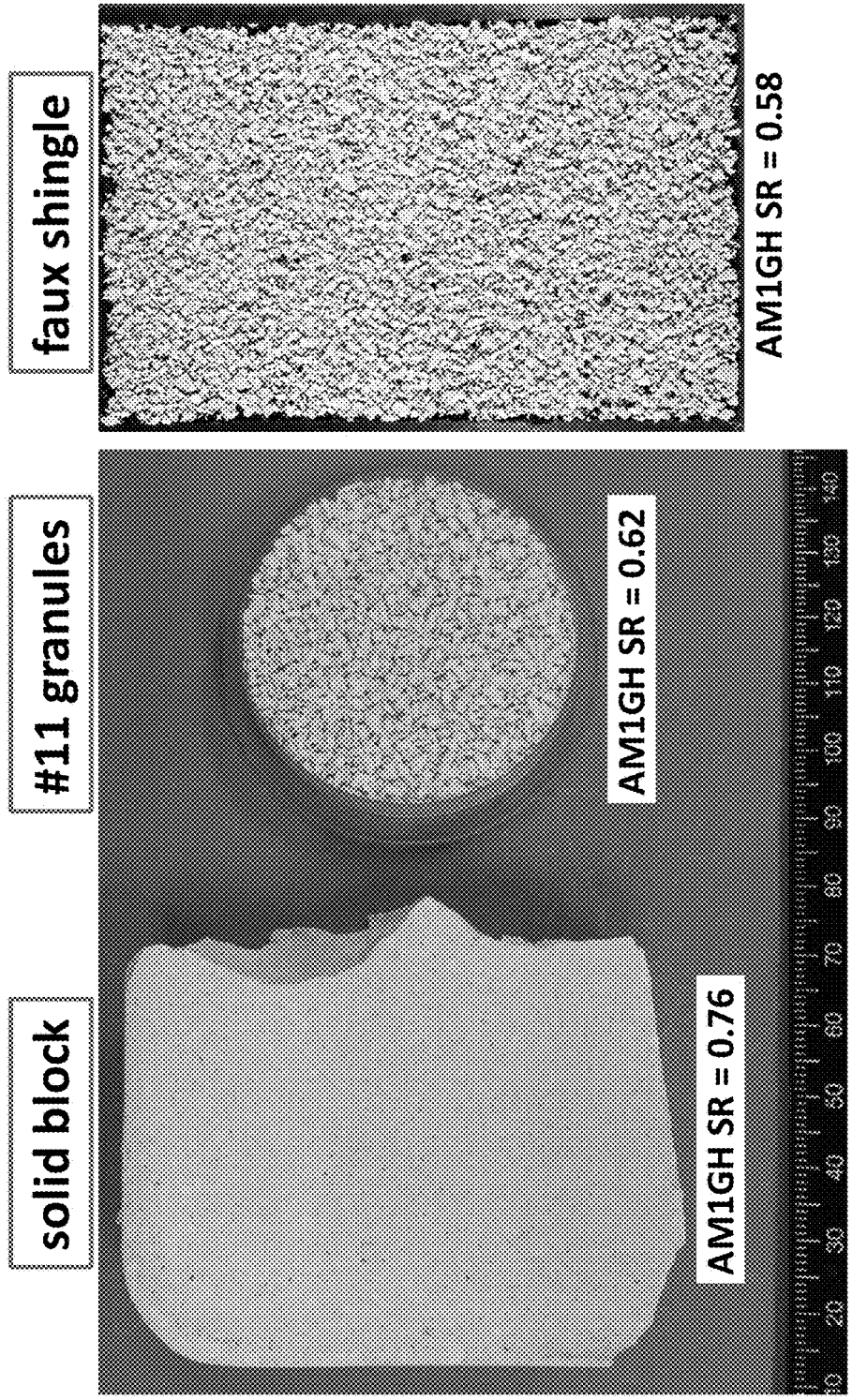
FIG. 2A provides a picture of a solid block, #11 granules and a faux shingle prepared from formulation BP#1.

Compositions comprising highly reflective microcrystalline/amorphous materials are provided. In some instances, the highly reflective materials are microcrystalline or amorphous carbonate materials, which may include calcium and/or magnesium carbonate. In some instances, the materials are $CO_2$ sequestering materials. Also provided are methods of making and using the compositions, e.g., to increase the albedo of a surface, to mitigate urban heat island effects, etc.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention.

The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Highly Reflective Amorphous/Microcrystalline Materials

As summarized above, aspects of the invention include compositions having highly reflective microcrystalline/amorphous materials. The microcrystalline/amorphous materials of the invention are those that are highly reflective. As the materials are highly reflective, they have a high total surface reflectance (TSR) value. TSR may be determined using any convenient protocol, such as ASTM E1918 Standard Test Method for Measuring Solar Reflectance of Horizontal and Low-Sloped Surfaces in the Field (see also R. Levinson, H. Akbari, P. Berdahl, Measuring solar reflectance—Part II: review of practical methods, LBNL 2010). In some instances, the materials exhibit a TSR value ranging from $Rg;0=0.0$ to $Rg;0,=1.0$, such as $Rg;0,=0.25$ to $Rg;0,=0.99$, including $Rg;0,=0.40$ to $Rg;0,=0.98$, e.g., as measured using the protocol referenced above.

In some instances, the materials are highly reflective of near infra-red (NIR) light. By NIR light is meant light having a wavelength ranging from 700 nanometers (nm) to 2.5 mm. NIR reflectance may be determined using any convenient protocol, such as ASTM C1371-04a(2010)e1 Standard Test Method for Determination of Emittance of Materials Near Room Temperature Using Portable Emissometers (http://www.astm.org/Standards/C1371.htm) or ASTM G173-03(2012) Standard Tables for Reference Solar Spectral Irradiances: Direct Normal and Hemispherical on 37° Tilted Surface (http://rredc.nrel.gov/solar/spectra/am1.5/ASTM G173/ASTM G173.html). In some instances, the materials exhibit a NIR reflectance value ranging from $Rg;0=0.0$ to $Rg;0=1.0$, such as $Rg;0=0.25$ to $Rg;0=0.99$, including $Rg;0=0.40$ to $Rg;0=0.98$, e.g., as measured using the protocol referenced above.

In some instances, the materials are highly reflective of ultra-violet (UV) light. By UV light is meant light having a wavelength ranging from 400 nm and 10 nm. UV reflectance may be determined using any convenient protocol, such as ASTM G173-03(2012) Standard Tables for Reference Solar Spectral Irradiances: Direct Normal and Hemispherical on 37° Tilted Surface. In some instances, the materials exhibit a UV value ranging from $Rg;0=0.0$ to $Rg;0=1.0$, such as $Rg;0=0.25$ to $Rg;0=0.99$, including $Rg;0=0.4$ to $Rg;0=0.98$, e.g., as measured using the protocol referenced above.

In some instances, the materials are reflective of visible light. By visible light is meant light having a wavelength ranging from 380 nm to 740 nm. Visible light reflectance properties may be determined using any convenient protocol, such as ASTM G173-03(2012) Standard Tables for Reference Solar Spectral Irradiances: Direct Normal and Hemispherical on 37° Tilted Surface. In some instances, the materials exhibit a visible light reflectance value ranging from Rg;0=0.0 to Rg;0=1.0, such as Rg;0=0.25 to Rg;0=0.99, including Rg;0=0.4 to Rg;0=0.98, e.g., as measured using the protocol referenced above.

The above reflectance properties of the materials may be determined using any convenient protocol, including the specific reflectance determination protocols described below.

The materials may be amorphous or microcrystalline. In some instances, the materials are microcrystalline. As the materials are microcrystalline, the crystal size, e.g., as determined using the Scherrer equation applied to the FWHM of X-ray diffraction pattern, is small, and in some instances is 1000 microns or less in diameter, such as 100 microns or less in diameter, and including 10 microns or less in diameter. In some instances, the crystal size ranges in diameter from 1000 µm to 0.001 µm, such as 10 to 0.001 µm, including 1 to 0.001 µm. In some instances, the crystal size is chosen in view of the wavelength(s) of light that are to be reflected. For example, where light in the visible spectrum is to be reflected, the crystal size range of the materials may be selected to be less than one-half the "to be reflected" range, so as to give rise to photonic band gap. For example, where the to be reflected wavelength range of light is 100 to 1000 nm, the crystal size of the material may be selected to be 50 nm or less, such as ranging from 1 to 50 nm, e.g., 5 to 25 nm. In some embodiments, the materials produced by methods of the invention may include rod-shaped crystals and amorphous solids. The rod-shaped crystals may vary in structure, and in certain embodiments have length to diameter ratio ranging from 500 to 1, such as 10 to 1. In certain embodiments, the length of the crystals ranges from 0.5 µm to 500 µm, such as from 5 µm to 100 µm. In yet other embodiments, substantially completely amorphous solids are produced.

The density, porosity, and permeability of the highly reflective materials may vary according to the application. With respect to density, while the density of the material may vary, in some instances the density ranges from 5 g/cm$^3$ to 0.01 g/cm$^3$, such as 3 g/cm$^3$ to 0.3 g/cm$^3$ and including 2.7 g/cm$^3$ to 0.4 g/cm$^3$. With respect to porosity, as determined by Gas Surface Adsorption as determined by the BET method (Brown Emmett Teller (e.g., as described at http://en.wikipedia.org/wiki/BET_theory, S. Brunauer, P. H. Emmett and E. Teller, *J. Am. Chem. Soc.*, 1938, 60, 309. doi:10.1021/ja01269a023) the porosity may range in some instances from 100 m$^2$/g to 0.1 m$^2$/g, such as 60 m$^2$/g to 1 m$^2$/g and including 40 m$^2$/g to 1.5 m$^2$/g. With respect to permeability, in some instances the permeability of the material may range from 0.1 to 100 darcies, such as 1 to 10 darcies, including 1 to 5 darcies (e.g., as determined using the protocol described in H. Darcy, Les Fontaines Publiques de la Ville de Dijon, Dalmont, Paris (1856).). Permeability may also be characterized by evaluating water absorption of the material. As determined by water absorption protocol, e.g., the water absorption of the material ranges, in some embodiments, from 0 to 25%, such as 1 to 15% and including from 2 to 9%.

The hardness of the materials may also vary. In some instances, the materials exhibit a Mohs hardness of 3 or greater, such as 5 or greater, including 6 or greater, where the hardness ranges in some instances from 3 to 8, such as 4 to 7 and including 5 to 6 Mohs (e.g., as determined using the protocol described in American Federation of Mineralogical Societies. "Mohs Scale of Mineral Hardness"). Hardness may also be represented in terms of tensile strength, e.g., as determined using the protocol described in ASTM C1167. In some such instances, the material may exhibit a compressive strength of 100 to 3000 N, such as 400 to 2000 N, including 500 to 1800 N.

In some instances, the highly reflective material is made up of one or more carbonate minerals, such that it is a carbonate material. By carbonate material is meant a material or composition that includes one or more carbonate compounds, such as two or more different carbonate compounds, e.g., three or more different carbonate compounds, five or more different carbonate compounds, etc., including non-distinct, amorphous carbonate compounds. Carbonate compounds of interest may be compounds having a molecular formulation $X_m(CO_3)_n$ where X is any element or combination of elements that can chemically bond with a carbonate group or its multiple, wherein X is in certain embodiments an alkaline earth metal and not an alkali metal; wherein m and n are stoichiometric positive integers. These carbonate compounds may have a molecular formula of $X_m(CO_3)_n \cdot H_2O$, where there are one or more structural waters in the molecular formula. The amount of carbonate in the carbonate compounds of the carbonate material, as determined by coulometry using the protocol described as coulometric titration, may be 40% or higher, such as 70% or higher, including 80% or higher. Carbonate compounds of interest are those having a reflectance value across the visible spectrum of 0.5 or greater, such as 0.6 or greater, 0.7 or greater, 0.8 or greater, 0.9 or greater, including 0.95 or greater.

The carbonate compounds may include a number of different cations, such as but not limited to ionic species of: calcium, magnesium, sodium, potassium, sulfur, boron, silicon, strontium, and combinations thereof. Of interest are carbonate compounds of divalent metal cations, such as calcium and magnesium carbonate compounds. Specific carbonate compounds of interest include, but are not limited to: calcium carbonate minerals, magnesium carbonate minerals and calcium magnesium carbonate minerals. Calcium carbonate minerals of interest include, but are not limited to: calcite ($CaCO_3$), aragonite ($CaCO_3$), amorphous vaterite precursor/anhydrous amorphous carbonate ($CaCO_3$), vaterite ($CaCO_3$), ikaite ($CaCO_3 \cdot 6H_2O$), and amorphous calcium carbonate ($CaCO_3$). Magnesium carbonate minerals of interest include, but are not limited to magnesite ($MgCO_3$), barringtonite ($MgCO_3 \cdot 2H_2O$), nesquehonite ($MgCO_3 \cdot 3H_2O$), lanfordite ($MgCO_3 \cdot 5H_2O$), hydromagnisite, and amorphous magnesium calcium carbonate ($MgCaCO_3$). Calcium magnesium carbonate minerals of interest include, but are not limited to dolomite ($CaMg(CO_3)_2$), huntite ($Mg_3Ca(CO_3)_4$) and sergeevite ($Ca_2Mg_{11}(CO_3)_{13} \cdot H_2O$). Also of interest are bicarbonate compounds, e.g., sodium bicarbonate, potassium bicarbonate, etc. The carbonate compounds may include one or more waters of hydration, or may be anhydrous. In some instances, the amount by weight of magnesium carbonate compounds in the precipitate exceeds the amount by weight of calcium carbonate compounds in the precipitate. For example, the amount by weight of magnesium carbonate compounds in the precipitate may exceed the amount by weight calcium carbonate compounds in the precipitate by 5% or more, such as 10% or more, 15% or more, 20% or more, 25% or more, 30% or more. In some instances, the weight ratio of magnesium carbonate compounds to calcium carbonate compounds in the precipitate ranges from 1.5-5 to 1, such as 2-4 to 1 including 2-3 to 1.

In some instances, the carbonate material may further include hydroxides, such as divalent metal ion hydroxides, e.g., calcium and/or magnesium hydroxides. The carbonate compounds may include one or more components that serve as identifying components, where these one more components may identify the source of the carbonate compounds. For example, identifying components that may be present in product carbonate compound compositions include, but are not limited to: chloride, sodium, sulfur, potassium, bromide, silicon, strontium, magnesium and the like. Any such source-identifying or "marker" elements are generally present in small amounts, e.g., in amounts of 20,000 ppm or less, such as amounts of 2000 ppm or less. In certain embodiments, the "marker" compound is strontium, which may be present in the precipitate incorporated into the aragonite lattice, and make up 10,000 ppm or less, ranging in certain embodiments from 3 to 10,000 ppm, such as from 5 to 5000 ppm, including 5 to 1000 ppm, e.g., 5 to 500 ppm, including 5 to 100 ppm. Another "marker" compound of interest is magnesium, which may be present in amounts of up to 20% mole substitution for calcium in carbonate compounds. The identifying component of the compositions may vary depending on the particular medium source, e.g., ocean water, lagoon water, brine, etc. In certain embodiments, the calcium carbonate content of the carbonate material is 25% w/w or higher, such as 40% w/w or higher, and including 50% w/w or higher, e.g., 60% w/w. The carbonate material has, in certain embodiments, a calcium/magnesium ratio that is influenced by, and therefore reflects, the water source from which it has been precipitated. In certain embodiments, the calcium/magnesium molar ratio ranges from 10/1 to ⅕ Ca/Mg, such as 5/1 to ⅓ Ca/Mg. In certain embodiments, the carbonate material is characterized by having a water source identifying carbonate to hydroxide compound ratio, where in certain embodiments this ratio ranges from 100 to 1, such as 10 to 1 and including 1 to 1.

$CO_2$ Sequestering Highly Reflective Materials

In some instances, the material is a $CO_2$ sequestering. By "$CO_2$ sequestering" is meant that the highly reflective material has been produced from $CO_2$ that is derived from a fuel source used by humans. For example, in some embodiments, a $CO_2$ sequestering material is produced from $CO_2$ that is obtained from the combustion of a fossil fuel, e.g., in the production of electricity. Examples of sources of such $CO_2$ include, but are not limited to, power plants, industrial manufacturing plants, etc., which combust fossil fuels and produce $CO_2$, e.g., in the form of a $CO_2$ containing gas or gases. Examples of fossil fuels include, but are not limited to, oils, coals, natural gasses, tar sands, rubber tires, biomass, shred, etc. Further details on how to produce a $CO_2$ sequestering material are provided below.

The $CO_2$ sequestering materials may have an isotopic profile that identifies the component as being of fossil fuel origin and therefore as being $CO_2$ sequestering. For example, in some embodiments the carbon atoms in the $CO_2$ materials reflect the relative carbon isotope composition ($\delta^{13}C$) of the fossil fuel (e.g., coal, oil, natural gas, tar sand) from which the industrial $CO_2$ that was used to make the material was derived. In addition to, or alternatively to, carbon isotope profiling, other isotopic profiles, such as those of oxygen ($\delta^{18}O$), nitrogen ($\delta^{15}N$), sulfur ($\delta^{34}S$), and other trace elements may also be used to identify a fossil fuel source that was used to produce an industrial $CO_2$ source from which a $CO_2$ sequestering material is derived. For example, another marker of interest is ($\delta^{18}O$). Isotopic profiles that may be employed as an identifier of $CO_2$ sequestering materials of the invention are further described in U.S. patent application Ser. No. 14/112,495; the disclosure of which is herein incorporated by reference.

The $CO_2$ sequestering materials may be fabricated using any convenient protocol. In some instances, at least a portion of the carbonate compounds of the $CO_2$ sequestering materials is obtained using a bicarbonate mediated $CO_2$ sequestering protocol. Aspects of such protocols include contacting a $CO_2$ containing gas with an aqueous medium to remove $CO_2$ from the $CO_2$ containing gas. The $CO_2$ containing gas may be pure $CO_2$ or be combined with one or more other gasses and/or particulate components, depending upon the source, e.g., it may be a multi-component gas (i.e., a multi-component gaseous stream). In certain embodiments, $CO_2$ containing gas is obtained from an industrial plant, e.g., where the $CO_2$ containing gas is a waste feed from an industrial plant. Industrial plants from which the $CO_2$ containing gas may be obtained, e.g., as a waste feed from the industrial plant, may vary. Industrial plants of interest include, but are not limited to, power plants and industrial product manufacturing plants, such as but not limited to chemical and mechanical processing plants, refineries, cement plants, steel plants, etc., as well as other industrial plants that produce $CO_2$ as a byproduct of fuel combustion or other processing step (such as calcination by a cement plant). Waste feeds of interest include gaseous streams that are produced by an industrial plant, for example as a secondary or incidental product, of a process carried out by the industrial plant.

Of interest in certain embodiments are waste streams produced by industrial plants that combust fossil fuels, e.g., coal, oil, natural gas, as well as man-made fuel products of naturally occurring organic fuel deposits, such as but not limited to tar sands, heavy oil, oil shale, etc. In certain embodiments, power plants are pulverized coal power plants, supercritical coal power plants, mass burn coal power plants, fluidized bed coal power plants, gas or oil-fired boiler and steam turbine power plants, gas or oil-fired boiler simple cycle gas turbine power plants, and gas or oil-fired boiler combined cycle gas turbine power plants. Of interest in certain embodiments are waste streams produced by power plants that combust syngas, i.e., gas that is produced by the gasification of organic matter, e.g., coal, biomass, etc., where in certain embodiments such plants are integrated gasification combined cycle (IGCC) plants. Of interest in certain embodiments are waste streams produced by Heat Recovery Steam Generator (HRSG) plants. Waste streams of interest also include waste streams produced by cement plants. Cement plants whose waste streams may be employed in methods of the invention include both wet process and dry process plants, which plants may employ shaft kilns or rotary kilns, and may include pre-calciners. Each of these types of industrial plants may burn a single fuel, or may burn two or more fuels sequentially or simultaneously. A waste stream of interest is industrial plant exhaust gas, e.g., a flue gas. By "flue gas" is meant a gas that is obtained from the products of combustion from burning a fossil or biomass fuel that are then directed to the smokestack, also known as the flue of an industrial plant.

In producing the $CO_2$ sequestering material from a $CO_2$-containing gas, a $CO_2$-containing gas may be contacted with an aqueous medium under conditions sufficient to remove $CO_2$ from the $CO_2$-containing gas and produce a bicarbonate component, which bicarbonate component may then be contacted with a cation source to produce a carbonate $CO_2$ sequestering component. The aqueous medium may vary, ranging from fresh water to bicarbonate buffered aqueous media.

Bicarbonate buffered aqueous media employed in embodiments of the invention include liquid media in which a bicarbonate buffer is present. As such, liquid aqueous media of interest include dissolved $CO_2$, water, carbonic acid ($H_2CO_3$), bicarbonate ions ($HCO_3^-$), protons ($H^+$) and carbonate ions ($CO_3^{2-}$). The constituents of the bicarbonate buffer in the aqueous media are governed by the equation:

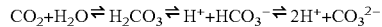

The pH of the bicarbonate buffered aqueous media may vary, ranging in some instances from 7 to 11, such as 8 to 11, e.g., 8 to 10, including 8 to 9. In some instances, the pH ranges from 8.2 to 8.7, such as from 8.4 to 8.55.

The bicarbonate buffered aqueous medium may be a naturally occurring or man-made medium, as desired. Naturally occurring bicarbonate buffered aqueous media include, but are not limited to, waters obtained from seas, oceans, lakes, swamps, estuaries, lagoons, brines, alkaline lakes, inland seas, etc. Man-made sources of bicarbonate buffered aqueous media may also vary, and may include brines produced by water desalination plants, and the like. Of interest in some instances are waters that provide for excess alkalinity, which is defined as alkalinity which is provided by sources other than bicarbonate ion. In these instances, the amount of excess alkalinity may vary, so long as it is sufficient to provide 1.0 or slightly less, e.g., 0.9, equivalents of alkalinity. Waters of interest include those that provide excess alkalinity (meq/liter) of 30 or higher, such as 40 or higher, 50 or higher, 60 or higher, 70 or higher, 80 or higher, 90 or higher, 100 or higher, etc. Where such waters are employed, no other source of alkalinity, e.g., NaOH, is required.

In some instances, the aqueous medium that is contacted with the $CO_2$ containing gas is one which, in addition to the bicarbonate buffering system (e.g., as described above), further includes an amount of divalent cations. Inclusion of divalent cations in the aqueous media can allow the concentration of bicarbonate ion in the bicarbonate rich product to be increased, thereby allowing a much larger amount of $CO_2$ to become sequestered as bicarbonate ion in the bicarbonate rich product. In such instances, bicarbonate ion concentrations that exceed 5,000 ppm or greater, such as 10,000 ppm or greater, including 15,000 ppm or greater may be achieved. For instance, calcium and magnesium occur in seawater at concentrations of 400 and 1200 ppm respectively. Through the formation of a bicarbonate rich product using seawater (or an analogous water as the aqueous medium), bicarbonate ion concentrations that exceed 10,000 ppm or greater may be achieved.

In such embodiments, the total amount of divalent cation source in the medium, which divalent cation source may be made up of a single divalent cation species (such as $Ca^{2+}$) or two or more distinct divalent cation species (e.g., $Ca^{2+}$, $Mg^{2+}$, etc.), may vary, and in some instances is 100 ppm or greater, such as 200 ppm or greater, including 300 ppm or greater, such as 500 ppm or greater, including 750 ppm or greater, such as 1,000 ppm or greater, e.g., 1,500 ppm or greater, including 2,000 ppm or greater. Divalent cations of interest that may be employed, either alone or in combination, as the divalent cation source include, but are not limited to: $Ca^{2+}$, $Mg^{2+}$, $Be^{2+}$, $Ba^{2+}$, $Sr^{2+}$, $Pb^{2+}$, $Fe^{2+}$, $Hg^{2+}$, and the like. Other cations of interest that may or may not be divalent include, but are not limited to: $Na^+$, $K^+$, $NH^{4+}$, and $Li^+$, as well as cationic species of Mn, Ni, Cu, Zn, Cu, Ce, La, Al, Y, Nd, Zr, Gd, Dy, Ti, Th, U, La, Sm, Pr, Co, Cr, Te, Bi, Ge, Ta, As, Nb, W, Mo, V, etc. Naturally occurring aqueous media which include a cation source, divalent or otherwise, and therefore may be employed in such embodiments include, but are not limited to: aqueous media obtained from seas, oceans, estuaries, lagoons, brines, alkaline lakes, inland seas, etc.

Contact of the $CO_2$ containing gas and bicarbonate buffered aqueous medium is carried out under conditions sufficient to remove $CO_2$ from the $CO_2$ containing gas (i.e., the $CO_2$ containing gaseous stream), and increase the bicarbonate ion concentration of the buffered aqueous medium to produce a bicarbonate rich product. The bicarbonate rich product is, in some instances, a two phase liquid which includes droplets of a liquid condensed phase (LCP) in a bulk liquid, e.g., bulk solution. By "liquid condensed phase" or "LCP" is meant a phase of a liquid solution which includes bicarbonate ions wherein the concentration of bicarbonate ions is higher in the LCP phase than in the surrounding, bulk liquid.

LCP droplets are characterized by the presence of a meta-stable bicarbonate-rich liquid precursor phase in which bicarbonate ions associate into condensed concentrations exceeding that of the bulk solution and are present in a non-crystalline solution state. The LCP contains all of the components found in the bulk solution that is outside of the interface. However, the concentration of the bicarbonate ions is higher than in the bulk solution. In those situations where LCP droplets are present, the LCP and bulk solution may each contain ion-pairs and pre-nucleation clusters (PNCs). When present, the ions remain in their respective phases for long periods of time, as compared to ion-pairs and PNCs in solution.

The bulk phase and LCP are characterized by having different $K_{eq}$, different viscosities, and different solubilities between phases. Bicarbonate, carbonate, and divalent ion constituents of the LCP droplets are those that, under appropriate conditions, may aggregate into a post-critical nucleus, leading to nucleation of a solid phase and continued growth. While the association of bicarbonate ions with divalent cations, e.g., $Ca^{2+}$, in the LCP droplets may vary, in some instances bidentate bicarbonate ion/divalent cation species may be present. For example, in LCPs of interest, $Ca^{2+}$/bicarbonate ion bidentate species may be present. While the diameter of the LCP droplets in the bulk phase of the LCP may vary, in some instances the droplets have a diameter ranging from 1 to 500 nm, such as 10 to 100 nm. In the LCP, the bicarbonate to carbonate ion ratio, (i.e., the $HCO_3^-$/$CO_3^{2-}$ ratio) may vary, and in some instances is 10 or greater to 1, such as 20 or greater to 1, including 25 or greater to 1, e.g., 50 or greater to 1. Additional aspects of LCPs of interest are found in Bewernitz et al., "A metastable liquid precursor phase of calcium carbonate and its interactions with polyaspartate," Faraday Discussions. 7 Jun. 2012. DOI: 10.1039/c2fd20080e (2012) 159: 291-312. The presence of LCPs may be determined using any convenient protocol, e.g., the protocols described in Faatz et al., Advanced Materials, 2004, 16, 996-1000; Wolf et al., Nanoscale, 2011, 3, 1158-1165; Rieger et al., Faraday Discussions, 2007, 136, 265-277; and Bewernitz et al., Faraday Discussions, 2012, 159, 291-312.

Where the bicarbonate rich product has two phases, e.g., as described above, the first phase may have a higher concentration of bicarbonate ion than a second phase, where the magnitude of the difference in bicarbonate ion concentration may vary, ranging in some instances from 0.1 to 4, such as 1 to 2. For example, in some embodiments, a bicarbonate rich product may include a first phase in which the bicarbonate ion concentration ranges from 1000 ppm to 5000 ppm, and a second phase where the bicarbonate ion concentration is higher, e.g., where the concentration ranges from 5000 ppm to 6000 ppm or greater, e.g., 7000 ppm or greater, 8000 ppm or greater, 9000 ppm or greater, 10,000 ppm or greater, 25,000 ppm or greater, 50,000 ppm or greater, 75,000 ppm or greater, 100,000 ppm, 500,000 or greater.

In addition to the above characteristics, a given bicarbonate rich product may include a number of additional markers which serve to identify the source of $CO_2$ from it has been produced. For example, a given bicarbonate component may include markers which identify the water from which it has been produced. Waters of interest include naturally occurring waters, e.g., waters obtained from seas, oceans, lakes, swamps, estuaries, lagoons, brines, alkaline lakes, inland seas, as well as man-made waters, e.g., brines produced by water desalination plants, and the like. In such instances, markers that may be present include amounts of one or more of the following elements: Ca, Mg, Be, Ba, Sr, Pb, Fe, Hg, Na, K, Li, Mn, Ni, Cu, Zn, Cu, Ce, La, Al, Y, Nd, Zr, Gd, Dy, Ti, Th, U, La, Sm, Pr, Co, Cr, Te, Bi, Ge, Ta, As, Nb, W, Mo, V, etc. Alternatively or in addition to the above markers, a given bicarbonate component may include markers which identify the particular $CO_2$-containing gas used to produce the bicarbonate component. Such markers may include, but are not limited to, one or more of: nitrogen, mononitrogen oxides, e.g., NO, $NO_2$, and $NO_3$, oxygen, sulfur, monosulfur oxides, e.g., SO, $SO_2$ and $SO_3$), volatile organic compounds, e.g., benzo(a)pyrene $C_2OH_{12}$, benzo(g,h,l)perylene $C_{22}H_{12}$, dibenzo(a,h)anthracene $C_{22}H_{14}$, etc. Particulate components that may be present in the $CO_2$ containing gas from which the bicarbonate component is produced and therefore which may be present in the bicarbonate component include, but are not limited to particles of solids or liquids suspended in the gas, e.g., heavy metals such as strontium, barium, mercury, thallium, etc. When present, such markers may vary in their amounts, ranging in some instances from 0.1 to 10,000, such as 1 to 5,000 ppm. Of interest in certain embodiments are agents (referred to herein as "bicarbonate promoters" or "BLCP promoters") that promote the production of high-bicarbonate-content bicarbonate additive (which may also be referred to herein as a bicarbonate admixture), e.g., by promoting the production and/or stabilization of BLCPs, e.g., facilitating the formation of a BLCP in a bicarbonate-containing solution while preventing precipitation of the solution's components to form solid carbonate-containing materials. A high-bicarbonate-content bicarbonate component is one that has a bicarbonate content of 0.1 wt. % or greater, such as 4 wt. % or greater, including 10 wt. % or greater, such as a bicarbonate component having a bicarbonate content ranging from 5 to 40 wt. %, such as 10 to 20 wt. %. The amount of bicarbonate promoter present in a given bicarbonate component may vary, where in some instances the amount ranges from 0.000001 wt. % to 40 wt. %, such as 0.0001 to 20 wt. % and including 0.001 to 10 wt. %. Such promoters are further described in U.S. patent application Ser. No. 14/112,495; the disclosure of which is herein incorporated by reference.

As indicated above, in making a $CO_2$ sequestering material according to certain embodiments of the invention, the $CO_2$ containing gas is contacted with an aqueous medium under conditions sufficient to produce the bicarbonate-rich product. The $CO_2$ containing gas may be contacted with the aqueous medium using any convenient protocol. For example, contact protocols of interest include, but are not limited to: direct contacting protocols, e.g., bubbling the gas through a volume of the aqueous medium, concurrent contacting protocols, i.e., contact between unidirectionally flowing gaseous and liquid phase streams, countercurrent protocols, i.e., contact between oppositely flowing gaseous and liquid phase streams, and the like. Contact may be accomplished through use of infusers, bubblers, fluidic Venturi reactors, spargers, gas filters, sprays, trays, or packed column reactors, and the like, as may be convenient.

Contact occurs under conditions such that a substantial portion of the $CO_2$ present in the $CO_2$ containing gas goes into solution to produce bicarbonate ions. In some instances, 5% or more, such as 10% or more, including 20% or more of all the bicarbonate ions in the initial expanded liquid phase solution (mother liquor) become sequestered in LCPs. Where desired, the $CO_2$ containing gas is contacted with the bicarbonate buffered aqueous medium in the presence of a catalyst (i.e., an absorption catalyst) that mediates the conversion of $CO_2$ to bicarbonate. Catalyst of interest are further described in U.S. patent application Ser. No. 14/112,495; the disclosure of which is herein incorporated by reference.

Following preparation of the bicarbonate rich product (as well as any storage thereof, as desired), the bicarbonate rich product or component thereof (e.g., LCP) is manipulated to produce solid phase carbonate compositions, and therefore sequester $CO_2$ from the initial $CO_2$ containing gas into a solid form and produce a $CO_2$ sequestering material, which may be a highly reflective material of the invention, e.g., a material having reflective properties, such as described above. In certain instances of such embodiments, the bicarbonate rich product or component thereof (e.g., LCP) is combined with a cation source (e.g., a source of one or more alkaline earth metal cations) under conditions sufficient to produce a solid carbonate composition. Cations of different valances can form solid carbonate compositions (e.g., in the form of carbonate minerals). In some instances, monovalent cations, such as sodium and potassium cations, may be employed. In other instances, divalent cations, such as alkaline earth metal cations, e.g., calcium and magnesium cations, may be employed. When cations are added to the bicarbonate rich product or component thereof (e.g., LCP), precipitation of carbonate solids, such as amorphous calcium carbonate when the divalent cations include $Ca^{2+}$, may be produced with a stoichiometric ratio of one carbonate-species ion per cation.

Any convenient cation source may be employed in such instances. Cation sources of interest include, but are not limited to, the brine from water processing facilities such as sea water desalination plants, brackish water desalination plants, groundwater recovery facilities, wastewater facilities, and the like, which produce a concentrated stream of solution high in cation contents. Also of interest as cation sources are naturally occurring sources, such as but not limited to native seawater and geological brines, which may have varying cation concentrations and may also provide a ready source of cations to trigger the production of carbonate solids from the bicarbonate rich product or component thereof (e.g., LCP). The cation source employed in such solid carbonate production steps may be the same as or different from the aqueous media employed in the bicarbonate rich product production step, e.g., as described above. For example, the aqueous medium employed to produce a bicarbonate rich product may be native seawater with a calcium cation concentration of approximately 400 ppm. A more concentrated cation solution, such as the brine concentrate from a seawater desalination plant, with over twice the native seawater concentration of calcium cation, may then be employed for the second precipitation step.

During the production of solid carbonate compositions from the bicarbonate rich product or component thereof (e.g., LCP), one mol of $CO_2$ may be produced for every 2 mols of bicarbonate ion from the bicarbonate rich product or component thereof (e.g., LCP). For example, where solid carbonate compositions are produced by adding calcium cation to the bicarbonate rich product or component thereof (e.g., LCP), the production of solid carbonate compositions, e.g., the form of amorphous calcium carbonate minerals, may proceed according to the following reaction:

$$2HCO_3^- + Ca^{++} \leftrightarrow CaCO_3 \cdot H_2O + CO_2$$

$$Ca^{++}_{(aq)} + 2HCO_{3(aq)}^- \leftrightarrow CaCO_{3(s)} + H_2O_{(l)} + CO_{2(g)}$$

While the above reaction shows the production of 1 mol of $CO_2$, 2 moles of $CO_2$ from the $CO_2$ containing gas were initially converted to bicarbonate. As such, the overall process sequesters a net 1 mol of $CO_2$ and therefore is an effective $CO_2$ sequestration process, with a downhill thermodynamic energy profile of −34 kJ $mol^{-1}$ for the above reaction.

In producing the $CO_2$ sequestering material from a $CO_2$-containing gas, a $CO_2$-containing gas may be contacted with an aqueous medium under conditions sufficient to remove $CO_2$ from the $CO_2$-containing gas and produce the bicarbonate component, e.g., as described above. While any convenient protocol may be employed, protocols of interest include, but are not limited to, those described in U.S. patent application Ser. No. 14/112,495; the disclosure of which is herein incorporated by reference.

Also of interest as $CO_2$ sequestering materials are compounds produced using carbonate mediated sequestration protocols, i.e., alkaline intensive protocols, in which a $CO_2$ containing gas is contacted with an aqueous medium at pH of about 10 or more. Examples of such protocols include, but are not limited to, those described in U.S. Pat. Nos. 8,333,944; 8,177,909; 8,137,455; 8,114,214; 8,062,418; 8,006,446; 7,939,336; 7,931,809; 7,922,809; 7,914,685; 7,906,028; 7,887,694; 7,829,053; 7,815,880; 7,771,684; 7,753,618; 7,749,476; 7,744,761; and 7,735,274; the disclosures of which are herein incorporated by reference.

Non-$CO_2$ Sequestering Highly Reflective Materials

In some instances, the highly reflective materials are not $CO_2$ sequestering, e.g., as described above. For example, the highly reflective carbonate materials may be produced from reaction of carbonate precursors, where carbonate precursors of interest include, but are not limited to: Calcium Chloride; Magnesium Chloride; Strontium Chloride; Sodium Sulfate; Sodium Bicarbonate; etc. Reaction conditions for preparing highly reflective carbonate materials from such reagents include those described in the experimental section, below.

In some instances, the highly reflected materials are clay minerals. Clay minerals of interest include hydrous aluminium phyllosilicates, where specific examples of clay minerals of interest include, but are not limited to: kaolins, e.g., kaolinite, dickite, halloysite, and nacrite; smectites, e.g., montmorillonite, nontronite and saponite; illite, chlorites, etc. In some instances, the materials are combinations of two or more of the above different types of materials, e.g., carbonates and clays.

Modifiers

The highly reflective materials, e.g., as described above, may include one or more modifiers that modify the properties of the reflective materials in some manner. For example, the highly reflective materials may be produced using a color modifier(s) which modifies the color of the final material in some desirable way. Examples of such modifiers include, but are not limited to, ions which substitute into the carbonate mineral of the carbonate compositions, such as transition metals, e.g., copper, etc., as may be provided by precipitating carbonates from transition metal precursors, such as transition metal chlorides. Examples of such ions include, but are not limited to: Managanese, iron, Copper, Nichol, Chromium, Cobalt, Zinc, etc. When such modifiers are employed, the highly reflective materials may have a visible color that varies, including but not limited to: red, blue, green, yellow, orange, brown, black, etc.

Examples of such modifiers also include physical modifiers. Examples of physical modifier include Si containing compositions, e.g., silicates, colloidal silica, etc.

Modifiers of interest further include crystallinity modifiers, e.g., which serve to modify crystallinity or crystal size and composition as desired, e.g., to maintain an amorphous composition. For example phosphate, silica, sulfate, surfactants, or organics such as chitin polysaccharides find use to modify grain boundaries or poison/modify crystal growth.

Highly Reflective Amorphous/Microcrystalline Material Compositions

The highly reflective materials, e.g., as described above, may be employed as is following their production, or further manipulated as desired to produce various compositions having a variety of forms. Highly reflective amorphous/microcrystalline material compositions may have a variety of different configurations, where configurations of interest include, but are not limited to: molded objects in a variety of shapes, such as blocks, cylinders, spheres, sheets, etc; amorphous configurations, e.g., aggregates; granular configurations, etc. As such, the dimensions of a given highly reflective material of the invention may vary widely, e.g., from nanometer to meter sized. Compositions that include a highly reflective material as described herein may be configured as solid, semi-solid, or fluid, e.g., liquid or gaseous, compositions, as desired. As such, in some instances the compositions are solid compositions, which may be granular compositions, e.g., powders, solid structures, e.g., blocks or other formed objects, etc. In some instances the compositions are semi-solid compositions, e.g., compositions that have a high viscosity, ranging in some instances from 1 to 25,000, such as 500 to 2,000 cP. In some instances, the compositions are fluid compositions, which compositions include liquid compositions as well as gaseous compositions.

In some instances, the materials are present in a granular configuration, i.e., as a composition made up of small particles. In certain embodiments, the particles range in size from 0.001 microns to 10,000 microns, e.g., 0.1 to 5,000 microns, including 10 to 2,500 microns, e.g., 50 or 100 microns to 2500 microns, as determined by Scanning electron microscopy. In some embodiments, the particle sizes exhibit a bimodal or multi-modal distribution. In certain embodiments, the particles have a high surface are, e.g., ranging from 0.5 to 100 $m^2/gm$, 0.5 to 50 $m^2/gm$, such as from 0.5 to 2.0 $m^2/gm$, as determined by Brauner, Emmit, & Teller (BET) Surface Area Analysis. Larger sized objects are also of interest, such as but not limited to objects having a longest dimension ranging from 1 cm to 10 m, such as 10 cm to 5 m, e.g., 50 cm to 1 m.

In some instances the materials could have varying crystallinity or crystal size and composition. For example phosphate, silica, sulfate, surfactants, or organics such as chitin polysaccharides could be used to modify grain boundaries or poison/modify crystal growth.

A given composition may be made up of just the highly reflective material, e.g., as described above, or include one or more additional compositions, such as but not limited to binders, delivery vehicles, other agents that impart functionality to the compositions, UV absorbers, pigments, biocides, etc., which may vary widely depending on the intended use of the composition. As such, a given portion or amount of highly reflective material may be made up of a single compound, e.g., as described above, such that it is homogeneous or pure with respect to that compound, or may be may up of two or more distinct compounds, such that it is heterogeneous. In the latter case, the two or more compounds may be combined in a manner such that they are mixed throughout the given amount of the material, where any portion of the given amount from the interior to the exterior includes each of the component compounds. As such, the interior of the material, e.g., granule, includes two or more compounds dispersed throughout the interior. Heterogeneous materials of interest include combinations of microcrystalline/amorphous compounds, e.g., carbonates, in combination with one or more additional compounds. A variety of additional compounds may be included to make up the materials, where such compounds include, but are not limited to: pigments, e.g., as described in greater detail below, biocides (algaecides), fillers, binders, etc.

For example, the heterogeneous materials of interest include combinations of microcrystalline/amorphous compounds, e.g., carbonates, in combination with algae-resistance compounds (i.e., algaecides), examples of which include copper materials, zinc materials, and mixtures thereof. For example, cuprous oxide and/or zinc oxide, or a mixture thereof, can be used. The copper materials that can be used in the present invention include cuprous oxide, cupric acetate, cupric chloride, cupric nitrate, cupric oxide, cupric sulfate, cupric sulfide, cupric stearate, cupric cyamide, cuprous cyamide, cuprous stannate, cuprous thiocyanate, cupric silicate, cuprous chloride, cupric iodide, cupric bromide, cupric carbonate, cupric fluoroborate, and mixtures thereof. The zinc materials can include zinc oxide, such as French process zinc oxide, zinc sulfide, zinc borate, zinc sulfate, zinc pyrithione, zinc ricinoleate, zinc stearate, zinc chromate, and mixtures thereof. Also of interest are eluting organic materials.

In yet other embodiments, the heterogeneous materials of interest include combinations of microcrystalline/amorphous compounds, e.g., carbonates, in combination with pigments, examples of which include PC-9415 Yellow, PC-9416 Yellow, PC-9158 Autumn Gold, PC-9189 Bright Golden Yellow, v-9186 Iron-Free Chestnut Brown, V-780 Black, V0797 IR Black, V-9248 Blue, PC-9250 Bright Blue, PC-5686 Turquoise, V-13810 Red, V-12600 Camouflage Green, V12560 IR Green, V-778 IR Black, and V-799 Black, carbon black, iron oxide, phthalocyanine, umber, chromium oxide, titanium oxide and cobalt blue, etc.). In some instances, the pigments employed are solar reflective pigments, e.g., as described in U.S. Pat. Nos. 8,394,498; 8,491,985 and 8535,803; the disclosures of which are herein incorporated by reference. In some instances, such solar reflective pigments are selected from the group consisting of solar reflective pigments having L* less than 30 and a solar reflectance of at least 20 percent. As used in the present specification L*, a* and b* refer to the parameters of the CIELAB color system. "Colored" means having an L* value of of 85 or less, such as 55 or less, including 45 or less, when measured using a HunterLab Model Labscan XE spectrophotometer using a 0 degree viewing angle, a 45 degree illumination angle, a 10 degree standard observer, and a D-65 illuminant. "Colored" as so defined is intended to include relatively dark tones. "Dark color" means a color having an L* value of 30 or less. "Solar reflective," and "Solar heat-reflective" refer to reflectance in the near infrared range (700 to 2500 nm) of the electromagnetic spectrum, and "high solar reflectance" means having an average reflectance of 70 percent or more over the near infrared range (700 to 2500 nm) of the electromagnetic spectrum.

In yet other instances, the compositions may include a UV absorber, which absorber is present in an amount sufficient to absorb at least some of the UV light, e.g., light having a wavelength ranging from 100 to 400 nm, reflected by the carbonate compounds of the carbonate material. UV absorbers of interest include, but are not limited to: benzotriazole type ultraviolet light absorbers, such as 2-[2-hydroxy-3,5-di-(1,1-dimethylbenzyl)]-2H-benzotriazole (CAS#: 70321-86-7), a blend of α-[3-[3-(2H-Benotriazol-2-yl)-5-(1,1-dimethylethyl)-4-hydroxyphenyl]-1-oxopropyl]-ω-hydroxypoly (oxo-1,2-ethanediyl) [CAS #104810-48-2]+α-[3-[3-(2H-Benotriazol-2-yl)-5-(1,1-dimethylethyl)-4-hydroxyphenyl]-1-oxopropyl]-ω-[3-[3-(2H-benzotriazol-2-yl)-5-(1,1-dimethylethyl)-4-hydroxyphenyl]-1-oxopropoxy]poly(oxy-1,2-ethanediyl) [CAS #104810-47-1]+Polyethylene glycol 300 [CAS #25322-68-3,2-(3'-tert-butyl-2'-hydroxy-5'-methylphenyl)-5-chlorobenzotriazole (CAS#: 3896-11-5), 2-(2'-Hydroxy-3',5'-di-tert-amylphenyl) benzotriazole (CAS#: 25973-55-1), 2-(2H-Benzotriazole-2-yl)-4-methylphenyl (CAS#: 2440-22-4), and 2-(2-hydroxy-5-tert-octylphenyl) benzotriazole (CAS#: 3147-75-9); benzophenone UV absorbers, such as 2-Hydroxy-4-n-Octoxybenzophenone (CAS#: 1843-05-6), etc. When present, the amount of UV absorber in the highly reflective material may range from 0% to 25%, such as 1% to 5%.

Other components that may be present in the carbonate material include, but are not limited to: fillers, binders, sealants, polymers, other inorganic and organic compounds, etc.

Granular Compositions

In some embodiments of the invention, the highly reflective material of interest is a granular composition made up of highly reflective carbonate granules, where the granules include a carbonate component, which component may be or may not be $CO_2$ sequestering, e.g., as described above. In the granular composition, the size of the granules may vary, ranging in some instances from 50 μm to 5 mm, such as 100 μm to 2.5 mm, e.g., 250 μm to 2 mm. The size distribution of the granules may also vary. In some instances, the weight percent of granules having a size from 500 μm to 1.5 mm ranges from 50 to 100 wt. %, such as 55 to 95 wt. %, e.g., 60 to 90 wt. %.

The mechanical properties of the granules may vary. In some instances, the granules have a compressive strength ranging of 7,500 psi or greater, such as 10,000 psi or greater, including 12,500 psi or greater, e.g., as measured by ASTM. The granules may, in some instances, exhibit a freeze-thaw resistance of 5% max on mass loss or lower, such as 3% max on mass loss or lower, including 2% max on mass loss or lower. The granules may, in some instances, exhibit a wet-dry resistance of 3% max on mass loss or lower, such as 2% max on mass loss or lower, including 1% max on mass loss or lower. The granules may, in some instances, exhibit a spalling resistance of 10% max on mass loss or lower, such as 7.5% max on mass loss or lower, including 5% max on mass loss or lower. The granules may, in some instances, exhibit abrasion resistance of 1% max or lower, such as 0.5% max or lower, including 2% max or lower, e.g., as measured by the ARMA test method published in Asphalt Roofing Manufacturers Association (ARMA) Granule Test Procedures Manual. The granules may, in some instances, exhibit a temperature stability of 500° C. or greater, such as 600° C. or greater, including 700° or greater. The granules may, in some instances, exhibit a soundness of 2% max on mass loss or lower, such as 1% max on mass loss or lower, including 0.75% max on mass loss or lower, e.g., as measured by the ASTM C88. The granules may, in some instances, exhibit an abrasion and impact resistance of 15% max or lower, such as 12.5% max or lower, including 10% max or lower, e.g., as measured by ASTM C-133.

The physical properties of the granular compositions of these embodiments may also vary. In some instances, the solar reflectance of the granular composition is 60% or higher, such as 70% or higher, including 80% or higher, e.g., as measured by ASTM C1549. In some instances, the thermal emittance of the granular composition is 0.5 or higher, such as 0.7 or higher, including 0.8 or higher, e.g., as measured by ASTM C1371. In some instances, the water absorption of the granular composition is 10% or less, such as 5% or less, including 4% or less. In some instances, the UV opacity of the granular composition is 80% or higher, such as 90% or higher, including 95% or higher, e.g., as measured by the ARMA method published in Asphalt Roofing Manufacturers Association (ARMA) Granule Test Procedures Manual. In some instances, the moisture content of the granular composition is 1.0 wt. % or less, such as 0.5 wt. % or less, including 0.3 wt. % or less. In some instances, the granules exhibit a hardness as measured on the Moh's mineral scale of 5.0 or greater, such as 6.0 or greater, including 7.0 or greater, e.g., ranging from 5.0 to 7.0. In some instances, the granules exhibit a bulk density (crushed) which ranges from 60 to 200, such as 75 to 150, e.g., 80 to 115 lb/ft$^3$, e.g., as measured by the ARMA method published in Asphalt Roofing Manufacturers Association (ARMA) Granule Test Procedures Manual. In some instances, the granules exhibit a specific density which ranges from 1.0 to 5.0, such as 2.0 to 4.0, e.g., 2.5 to 3.0. In some instances, the oil absorption of the granular composition is 5% or less, such as 3% or less, including 2% or less.

The granular composition may exhibit a number of additional desirable properties. In some instances, the granular composition exhibits an acid resistance of 5% mass loss or less, such as 3% mass loss or less, including 2% mass loss or less. In some instances, the granular composition is exhibits high weatherability as evidenced by substantially little, if any, degradation after 10,0000 hours. In some instances, the granular composition satisfies the metal leaching standards as specified in EPA title 40, section 162.24 for non-hazardous waste. In some instances, the granular composition exhibits an adhesion to asphalt scrub loss of 5 gm or less, such as 2 gm or less, including 1 gm or less.

The above granular compositions may be made using any convenient protocol. In some instances, an initial carbonate composition, e.g., as described above, is subjected to elevated pressure and or combined with a setting liquid in a manner sufficient to produce a solid product, which resultant solid product may then be disrupted as desired to produce a granular composition. When subjected to pressure, an initial particulate composition (which may or may not be $CO_2$ sequestering, such as described above), is subjected to elevated pressures for a period of time sufficient to produce a desired solid product. In some instances, the elevated pressures range from 1,000 to 100,000 psi, such as 1,500 to 50,000 psi and including 2,000 to 25,000 psi. The period of time to which the composition is subjected to elevated pressures may vary, and in some instances ranges from 1 second to 24 hours, such as 30 seconds to 30 minutes.

In some instances, the initial carbonate composition may be combined with a setting liquid. Setting liquids of interest vary, and in some instances are aqueous liquid that include one or more solutes, e.g., magnesium, calcium, carbonate, bicarbonate, chloride, strontium, sodium, silicates (including but not limited to those described in U.S. Pat. Nos. 6,375,935 and 6,719,993, the disclosures of which are herein incorporated by reference), etc. When present, these solutes may vary in concentration, ranging in some instances from 1 to 10 mM, such as 1 to 5 mM. Where desired, the setting liquids may further include a source of silica, e.g., colloidal silica, etc. When combined with a setting liquid, the liquid to solid weight ratio may vary, ranging in some instances from 0.1 to 1.0, such as 0.2 to 0.5. When a setting liquid is employed in combination with elevated pressure, the setting liquid may be combined with the initial carbonate composition first and the resultant product, e.g., slurry or paste, may be subjected to elevated pressure, e.g., as described above. When pastes or slurries are prepared, where desired such may be subjected to extrusion and/or dewatering.

Where desired, the resultant solid product may be cured for a period of time following production. The curing period of time may vary, ranging in some instances from 15 minutes to 1 month, such as 1 day to 7 days and including 3 days to 7 days. The product may be cured in air at a convenient temperature, such as a temperature ranging from 0 to 100° C., such as 15 to 60° C. In other instances, the product may be cured in a curing liquid, such as but not limited to, aqueous liquids, e.g., water, salt solutions, sea water like solutions, solutions containing LCP, solutions containing bicarbonate ion, solutions containing carbonate ion, solutions containing strontium, magnesium calcium chloride and the like.

Where desired, one or more additional components may be combined with the carbonate component at some point during the production protocol, as desired. Additional components that may be combined with the carbonate component may vary, where examples include, but are not limited to, powder consolidation materials, stearate, antifungal agents, compound eluting agents, pigments (such as described in greater detail below); etc.

Following production, the solid product may be disrupted to produce the desired granular composition. The solid product may be disrupted using any convenient protocol, e.g., milling, crushing or granulation using such devices as a jaw, rotor, mortar, crushing, disk, or beater mill, a hammer mill or a screen mill-granulator or reduction device, and the like.

In some instances, the granular composition may itself include a pigment, e.g., where the pigment component may be a distinct component mixed or combined with the granular product in a heterogeneous composition, or the pigment may be integral part of the granules of the granular composition. Pigments of interest include, but are not limited to: metal based pigments, e.g., Cadmium pigments: cadmium yellow, cadmium red, cadmium green, cadmium orange, cadmium sulfoselenide; Chromium pigments: chrome yellow and chrome green; Cobalt pigments: cobalt violet, cobalt blue, cerulean blue, aureolin (cobalt yellow); Copper pigments: Azurite, Han purple, Han blue, Egyptian blue, Malachite, Paris green, Phthalocyanine Blue BN, Phthalocyanine Green G, verdigris, viridian; Iron oxide pigments: sanguine, caput mortuum, oxide red, red ochre, Venetian red, Prussian blue; Lead pigments: lead white, cremnitz white, Naples yellow, red lead; Manganese pigments: manganese violet; Mercury pigments: vermilion; Titanium pigments: titanium yellow, titanium beige, titanium white, titanium black and Zinc pigments: zinc white, zinc ferrite; inorganic pigments, such as Carbon pigments: carbon black (including vine blac, lamp black), ivory black (bone char); Clay earth pigments (iron oxides): yellow ochre, raw sienna, burnt sienna, raw umber, burnt umber; Ultramarine pigments: ultramarine, ultramarine green shade; biological and organic pigments, e.g., pigments of biological origin: alizarin (synthesized), alizarin crimson (synthesized), gamboge, cochineal red, rose madder, indigo, Indian yellow, Tyrian purple; pigments of non-biological organic: quinacridone, magenta, phthalo green, phthalo blue, pigment red 170; etc. As indicated above, in some instances the pigment component may be blended with the granular composition to produce the desired colored composition. In other instances, the pigment may be incorporated into the carbonate granules, e.g., by including the pigment in the composition that is subjected to elevated pressure and/or setting liquid, such as describe above. Also of interest are pigments which substitute into the carbonate mineral of the carbonate compositions, such as transition metals, e.g., copper, etc., as may be provided by precipitating carbonates from transition metal precursors, such as transition metal chlorides.

When present, pigmented granular composition still exhibits high reflectivity, such as described above. As such, in some instances pigmented compositions may exhibit UV reflectivity of 10% or greater, such as 50% or greater, including 95% or greater. In some instances, the pigmented compositions may exhibit visible light reflectivity of 10% or greater, such as 50% or greater, including 99% or greater. In some instances, the pigmented compositions may exhibit NIR reflectivity of 10% or greater, such as 30% or greater, including 99% or greater.

The resultant granular compositions, such as described above, find use in a variety of applications, e.g., in building materials, in roads, etc., such as described in greater detail below.

Aggregates

Another composition format in which the highly reflective materials may be present is aggregate. The term "aggregate" is used herein in its conventional sense to include a particulate composition that finds use in concretes, mortars and other materials, e.g., roadbeds, asphalts, and other structures and is suitable for use in such structures. Aggregates of the invention are particulate compositions that may in some embodiments be classified as fine or coarse. Fine aggregates according to embodiments of the invention are particulate compositions that almost entirely pass through a Number 4 sieve (ASTM C 125 and ASTM C 33). Fine aggregate compositions according to embodiments of the invention have an average particle size ranging from 0.001 inch (in) to 0.25 in, such as 0.05 in to 0.125 in and including 0.01 in to 0.08 in. Coarse aggregates of the invention are compositions that are predominantly retained on a Number 4 sieve (ASTM C 125 and ASTM C 33). Coarse aggregate compositions according to embodiments of the invention are compositions that have an average particle size ranging from 0.125 in to 6 in, such as 0.187 in to 3.0 in and including 0.25 in to 1.0 in. As used herein, "aggregate" may also in some embodiments encompass larger sizes, such as 3 in to 12 in or even 3 in to 24 in, or larger, such as 12 in to 48 in, or larger than 48 in, e.g., such as sizes used in riprap and the like. In some embodiments, such as producing wave-resistant structures for the ocean, the sizes may be even larger, such as over 48 in, e.g., over 60 in, or over 72 in.

Aggregates may be produced from highly reflective materials in a manner analogous to the process employed to make granules, but with a disruption protocol employed that provides for the desired size products, e.g., as described above.

Aggregates of the invention have a density that may vary so long as the aggregate provides the desired properties for the use for which it will be employed, e.g., for the building material in which it is employed. In certain instances, the density of the aggregate particles ranges from 1.1 to 5 gm/cc, such as 1.3 gm/cc to 3.15 gm/cc, and including 1.8 gm/cc to 2.7 gm/cc. Other particle densities in embodiments of the invention, e.g., for lightweight aggregates, may range from 1.1 to 2.2 gm/cc, e.g, 1.2 to 2.0 g/cc or 1.4 to 1.8 g/cc. In some embodiments the invention provides aggregates that range in bulk density (unit weight) from 50 lb/ft$^3$ to 200 lb/ft$^3$, or 75 lb/ft$^3$ to 175 lb/ft$^3$, or 50 lb/ft$^3$ to 100 lb/ft$^3$, or 75 lb/ft$^3$ to 125 lb/ft$^3$, or 90 lb/ft$^3$ to 115 lb/ft$^3$, or 100 lb/ft$^3$ to 200 lb/ft$^3$, or 125 lb/ft$^3$ to 175 lb/ft$^3$, or 140 lb/ft$^3$ to 160 lb/ft$^3$, or 50 lb/ft$^3$ to 200 lb/ft$^3$. Some embodiments of the invention provide lightweight aggregate, e.g., aggregate that has a bulk density (unit weight) of 75 lb/ft$^3$ to 125 lb/ft$^3$. Some embodiments of the invention provide lightweight aggregate, e.g., aggregate that has a bulk density (unit weight) of 90 lb/ft$^3$ to 115 lb/ft$^3$.

The hardness of the aggregate particles making up the aggregate compositions of the invention may also vary, and in certain instances the hardness, expressed on the Mohs scale, ranges from 1.0 to 9, such as 1 to 7, including 1 to 6 or 1 to 5. In some embodiments, the Mohr's hardness of aggregates of the invention ranges from 2-5, or 2-4. In some embodiments, the Mohs hardness ranges from 2-6. Other hardness scales may also be used to characterize the aggregate, such as the Rockwell, Vickers, or Brinell scales, and equivalent values to those of the Mohs scale may be used to characterize the aggregates of the invention; e.g., a Vickers hardness rating of 250 corresponds to a Mohs rating of 3; conversions between the scales are known in the art.

The abrasion resistance of an aggregate may also be important, e.g., for use in a roadway surface, where aggregates of high abrasion resistance are useful to keep surfaces from polishing. Abrasion resistance is related to hardness but is not the same. Aggregates of the invention include aggregates that have an abrasion resistance similar to that of natural limestone, or aggregates that have an abrasion resistance superior to natural limestone, as well as aggregates having an abrasion resistance lower than natural limestone, as measured by art accepted methods, such as ASTM C131-03. In some embodiments aggregates of the invention have an abrasion resistance of less than 50%, or less than 40%, or less than 35%, or less than 30%, or less than 25%, or less than 20%, or less than 15%, or less than 10%, when measured by ASTM C131-03.

Aggregates of the invention may also have a porosity within a particular ranges. As will be appreciated by those of skill in the art, in some cases a highly porous aggregate is desired, in others an aggregate of moderate porosity is desired, while in other cases aggregates of low porosity, or no porosity, are desired. Porosities of aggregates of some embodiments of the invention, as measured by water uptake after oven drying followed by full immersion for 60 minutes, expressed as % dry weight, can be in the range of 1-40%, such as 2-20%, or 2-15%, including 2-10% or even 3-9%.

Formed Objects

Highly reflective material compositions of the invention may be configured as formed objects. Formed objects according to embodiments of the invention may vary greatly, which formed objects are made up of materials shaped (e.g., molded, cast, cut, or otherwise produced) into man-made structures with defined physical shape, i.e., configuration. Formed objects are distinct from amorphous building materials (e.g., powder, paste, slurry, etc.) that do not have a defined and stable shape, but instead conform to the container in which they are held, e.g., a bag or other container. Formed objects of the invention are also distinct from irregularly or imprecisely produced objects (e.g., aggregate, bulk forms for disposal, etc.) in that formed objects are produced according to specifications that allow for use of formed objects as building materials in, for example, buildings. Formed objects of the invention may be prepared in accordance with traditional manufacturing protocols for such structures, with the exception that an amount of highly reflective microcrystalline/amorphous material composition of the invention is employed.

Composite Structures

In a given composition, the material may be associated with the other components (when present) of the composition in a variety of different ways depending on the nature of the final composition. For example, where the composition comprises a substrate, e.g., metal, glass, fibrous, polymeric, etc., the substrate component may be coated with the material to produce the composition. In other words, the material may be stably associated with a target surface, e.g., by applying the material to the target surface. In these instances, the material may be applied to the target surface using any convenient protocol, e.g., spreading the material on the surface, spraying the material onto the surface, contacting the surface with the material, e.g., by at least partially immersing an object having the surface in the material, etc. Where desired, the composition may include a vehicle, e.g., solvent, which facilitates application of the material to the surface. Solvents of interest include both aqueous and non-aqueous solvents. For example, the material may be applied as a liquid to a surface, such as a road surface (e.g., using a mobile liquid spreader, such as a vehicle having a tank containing the liquid carbonate material and a spreader component configured to disperse the liquid carbonate material on a road bed), following which a solvent component of the liquid evaporates leaving a solid coating of the carbonate material on the road surface. Alternatively, the material may be incorporated into the object having the surface to be modified, the reflective material may be a component with one or more additional components (material(s)) of the object during manufacture of the object.

Methods of Albedo Enhancement

Aspects of the invention include methods of enhancing albedo of a surface. Albedo, i.e., reflection coefficient, refers to the diffuse reflectivity or reflecting power of a surface. It is defined as the ratio of reflected radiation from the surface to incident radiation upon it. Albedo is a dimensionless fraction, and may be expressed as a ratio or a percentage. Albedo is measured on a scale from zero for no reflecting power of a perfectly black surface, to 1 for perfect reflection of a white surface. While albedo depends on the frequency of the radiation, as used herein Albedo is given without reference to a particular wavelength and thus refers to an average across the spectrum of visible light, i.e., from about 380 to about 740 nm.

As the methods are methods of enhancing albedo of a surface, the methods in some instances result in a magnitude of increase in albedo (as compared to a suitable control, e.g., the albedo of the same surface not subjected to methods of invention) that is 0.05 or greater, such as 0.1 or greater, e.g., 0.2 or greater, 0.3 or greater, 0.4 or greater, 0.5 or greater, 0.6 or greater, 0.7 or greater, 0.8 or greater, 0.9 or greater, including 0.95 or greater, including up to 1.0. As such, aspects of the subject methods include increasing albedo of a surface to 0.1 or greater, such as 0.2 or greater, e.g., 0.3 or greater, 0.4 or greater, 0.5 or greater, 0.6 or greater, 0.7 or greater, 0.8 or greater, 0.9 or greater, 0.95 or greater, including 0.975 or greater and up to approximately 1.0.

Aspects of the methods include associating with a surface of interest an amount of a highly reflective microcrystalline or amorphous material composition effective to enhance the albedo of the surface by a desired amount, such as the amounts listed above. The material composition may be associated with the target surface using any convenient protocol. As such, the material composition may be associated with the target surface by incorporating the material into the material of the object having the surface to be modified. For example, where the target surface is the surface of a building material, such as a roof tile or concrete mixture, the material composition may be included in the composition of the material so as to be present on the target surface of the object. Alternatively, the material composition may be positioned on at least a portion of the target surface, e.g., by coating the target surface with the composition. Where the surface is coated with the material composition, the thickness of the resultant on the surface may vary, and in some instances may range from 0.1 mm to 25 mm, such as 2 mm to 20 mm and including 5 mm to 10 mm.

The albedo of a variety of surfaces may be enhanced. Surfaces of interest include at least partially facing skyward surfaces of both man-made and naturally occurring objects. Man-made surfaces of interest include, but are not limited to: roads, sidewalks, buildings and components thereof, e.g., roofs and components thereof (roof shingles) and sides, runways, and other man-made structures, e.g., walls, dams, monuments, decorative objects, etc. Naturally occurring surfaces of interest include, but are not limited to: plant surfaces, e.g., as found in both forested and non-forested areas, non-vegetated locations, water, e.g., lake, ocean and sea surfaces, etc.

Aspects of the methods may include determining the albedo of a surface following provision of the carbonate material to the surface, e.g., following application of the carbonate material onto the surface. The albedo of the surface may be determined using any convenient protocol, e.g., with a pyranometer. Protocols for measuring albedo may also be found in: "Residential cooling Loads and the Urban Heat Island—the Effects of Albedo," Building and Environment, Vol. 23, No. 4, pp. 271-283, 1988; and "Urban climates and heat islands: albedo, evapotranspiration, and anthropogenic heat, "Energy and Buildings 25 (1997) 99-103.

The methods and compositions, e.g., as described above, find use in any application where increasing or enhancing the albedo of a surface is desired. Applications of interest include, but are not limited to: reducing the temperature of urban heat islands, e.g., by 1° C. or more, such as 2° C. or more, including 5° C. or more; reducing lighting needs; reducing light absorption by man-made and naturally occurring structures, as well as both new structures and retrofitting existing structures, etc.

Utility

Highly reflective microcrystalline/amorphous compositions, e.g., as described herein, find use in a variety of different applications. Applications are varied, where applications of interest include, but are not limited to: roofing granules; roofing membranes; cool pigments; pavement compositions; cements and concretes; formed building materials; paints and primers; photovoltaic devices and systems; etc.

Roofing Granules

One type of formed building material which may include highly reflective compositions of the invention is formed roofing materials, such as roof shingles, tiles, sheets, etc., where incorporation of the materials results may result in the material being a "cool" roofing material.

Roof shingles of interest may include a support component, e.g., made from metal, clay, concrete, wood, asphalt, etc., which has on a surface thereof a highly reflective composition, e.g., as described above, where the composition may or may include one or more additional components, e.g., pigments, UV absorbers, etc. An example of roofing material, such as a roof shingle, according to an embodiment of the invention is provided in FIG. 1. FIG. 1 is a schematic drawing of a roof shingle 10 according to one embodiment of the present invention. The roof shingle 10 includes at least one asphalt layer 12, such as a layer of bitumen or modified bitumen. Bitumen or modified bitumen can be composed of one or more asphalt layers 14 and one or more layers of a reinforcing material 16 such as, for example, polyester or fiberglass. The upper asphalt layer 12 includes at least one granular layer 18 including a plurality of carbonate granules or particles 20 (e.g., as described above) adhered to or embedded within a top surface of the asphalt layer 12. According to various embodiments, the carbonate particles have a solar reflectance ranging from 2%% to 99%% such that when applied to the reinforced asphalt layer 12 result in a roofing system having a solar reflectance of 30% or more, such as 45% % or more. The particles may be white in color or pigmented (i.e., hued), and may range in size in some instances from 0.01 mm to 5 mm. In one embodiment, the particles 62 are of substantially the same particle size distribution. The roof shingle 10 including the asphalt layer may be produced using any convenient protocol, such as by passing a reinforcement material 16, such as fiberglass or polyester, through hot liquid asphalt, which impregnates and coats the reinforcement material 16. This coated strip is then run under a hopper which dispenses the carbonate particles 20 onto the upper surface of the hot asphalt coated strip to substantially fully cover the surface. This strip is then passed over a roller or drum to flatten the particles 20 and press them into the asphalt included in the reinforced asphalt layer 12. The roofing material can be provided in the form of individual shingles or sheets which can then be applied to any commercial, industrial low or steep slope roofing surface.

In some embodiments, the highly reflective granules used in the roofing materials, e.g., as described above, can include a coating and/or a surface treatment. The granules can be coated and/or their surfaces treated for any number of reasons including dust control, to enhance and/or increase water repellency and to prevent various kinds of staining. Various compounds can be used to coat or treat the surface the granules described above according to the various embodiments of the present invention. These compounds include, but are not limited to the following: silanes, siloxanes, polysiloxanes, organo-siloxanes, silicates, organic silicates, silicone resins, acrylics, urethanes, polyurethanes, glycol ethers and mineral oil. Further details regarding suitable coatings are provided in paragraphs 20 to 23 of U.S. Published Patent Application No. 20110081537; the disclosure of which paragraphs is herein incorporated by reference.

Roofing Membranes

The highly reflective materials, e.g., as described herein, also find use in roofing membranes. The term "roofing membrane" is employed in its conventional sense to refer to single-ply membranes that are flexible sheets of compounded synthetic materials that are configured for use in roofing applications. Roofing membranes of interest include thermoset, thermoplastic, and modified bitumen roofing membranes. Thermoset roofing membranes are made of large, flat pieces of synthetic rubber or similar materials, where the pieces are welded together at the seams to form one continuous membrane. Rubbers of interest include, but are not limited to: ethylene propylene diene monomer (EPDM), neoprene, etc. In thermoset roofing membranes, the seams are held together using suitable adhesives materials or tapes. Thermoplastic membranes are similar to thermoset membranes, where the seams are bonded melted or dissolved with heat or solvents, and can be as strong as the rest of the membrane. Thermoplastic membranes are based on elastomeric polymers that can be processed as plastics. Thermoplastic polyolefin (TPO) based roofing membranes may be a melt blend or reactor blend of a polyolefin plastic, such as a polypropylene polymer, with an olefin copolymer elastomer (OCE), such as an ethylene-3Q propylene rubber (EPR) or an ethylene-propylene-diene rubber (EPDR). TPO-based roofing membranes may comprise one or more layers. A TPO membrane may comprise base-(bottom) and cap-(top) layers with a fiber reinforcement scrim (middle) sandwiched between the other two layers. The scrim may be a woven, nonwoven, or knitted fabric composed of continuous strands of material used for reinforcing or strengthening membranes. The scrim is generally the strongest layer in the composite. The fabric can contribute significantly to the tensile strength of the roofing membrane and provide for dimensional stability. In an example, the fabric reinforcement comprises a polyester yarn based scrim. Modified bitumen membranes are factory-fabricated layers of asphalt, "modified" using a rubber or plastic ingredient (e.g., APP (atactic polypropylene) and SBS (styrene butadiene styrene) for increased flexibility, and combined with reinforcement for added strength and stability. While a given roofing membrane's thickness may vary, in some instances the thickness ranges from 0.75 mm to 1.5 mm.

In roofing membranes of the invention, the highly reflective material of the invention, e.g., as described above, may be incorporated into the one or more layers of the membrane and or provided in a surface coating of the membrane, e.g., a surface of the membrane (e.g., the skyward surface of the membrane which does not face the interior of the building to which the membrane is applied). The highly reflective material may be incorporated into the roofing membrane in a variety of formats, e.g., from particles to granules, e.g., as described above. In some instances, the highly reflective material is present as particles, e.g., as ultrafine particles having a mean particle size of 165 nm or less, such as between 125 to 150 nm or between 110 to 165 nm.

Examples of specific roofing membranes and related compositions into which the highly reflective materials of the invention may be incorporated, e.g., in place of or in addition to the $TiO_2$ component of such membranes and related compositions, include but are not limited to those described in United States Published Patent Application Nos. 20130130581; 20120288678; 20110256378; 20110223385; 20100255739; 20100197844; 20100151198; 20100120953; 20080277056; 20070295390; 20070295389; 20070185245; 20070054576; 20070054129; 20060280892; 20060199453; 20060197069; 20060157103; 20050282449; 20050261407; 20050257875; 20050250399; 20030207969;

the disclosures of the roofing membranes and related compositions of these published applications being incorporated herein by reference.

Cool Pigments

Highly reflective materials, e.g., as described above, find use as cool pigments. Cool pigments are solar reflective pigments. In some instances, the pigments have an L* value of 85 or less and a solar reflectance of 20 percent or higher. As used in the present specification L*, a* and b* refer to the parameters of the CIELAB color system. "Colored" means having an L* value of 85 or less, such as 55 or less, including 45 or less, when measured using a HunterLab Model Labscan XE spectrophotometer using a 0 degree viewing angle, a 45 degree illumination angle, a 10 degree standard observer, and a D-65 illuminant. "Colored" as so defined is intended to include relatively dark tones. "Dark color" means a color having an L* value of 30 or less. "Solar reflective," and "Solar heat-reflective" refer to reflectance in the near infrared range (700 to 2500 nm) of the electromagnetic spectrum, and "high solar reflectance" means having an average reflectance of 70 percent or more over the near infrared range (700 to 2500 nm) of the electromagnetic spectrum. Cool pigments prepared from highly reflective materials of the invention may have a variety of different colors, including but not limited to: Whites; e.g., Inorganic Oxide White, Titanium Dioxide White, Titanium White; Blacks/Browns, e.g., Carbon Black, Ivory Black, Copper Chromite Black, Mars Black, Chrome Iron Nickel Black Spinel, Chromium Green-Black Hematite, Chromium Green-Black Hematite Modified, Chromium Green-Black Hematite Modified, Chromium Green-Black Hematite Modified, Chromium Iron Oxide, Chromium Iron Oxide, Perylene Black, Burnt Sienna, Raw Sienna, Raw Umber, Iron Titanium Brown Spinel, Iron Titanium Brown Spinel, Iron Titanium Brown Spinel, Manganese Antimony Titanium Buff Rutile, Zinc Iron Chromite Brown Spinel, Zinc Iron Chromite Brown Spinel; Blues/Purples, e.g., Cobalt Aluminate Blue Spinel, Cobalt Aluminate Blue Spinel, Cobalt Aluminate Blue Spinel, Cobalt Aluminum Blue, Cobalt Blue, Cerulean Blue, Cobalt Chromite Blue, Cobalt Chromite Blue-Green Spinel, Cobalt Chromite Blue-Green Spinel, Prussian Blue, French Ultramarine Blue, Phthalo Blue, Phthalo Blue, Dioxazine Purple, Greens, e.g., Chrome Green, Chromium Oxide Green, Chromium Green-Black Modified, Cobalt Chromite Blue-Green Spinel, Cobalt Chromite Green Spinel, Cobalt Chromite Green Spinel, Cobalt Teal, Cobalt Titanate Green Spinel, Cobalt Titanate Green Spinel, Phthalo Green, Phthalo Green; Reds/Oranges, such as Red Iron Oxide, Red Iron Oxide, Red Iron Oxide, Red Oxide, Cadmium Orange, Acra Burnt Orange, Acra Red, Monastral Red, Naphthol Red Light; Yellows, e.g., Yellow Oxide, Cadmium Yellow Light, Chrome Yellow, Chrome Antimony Titanium Buff Rutile, Chrome Antimony Titanium Buff Rutile, Chrome Antimony Titanium Buff Rutile, Chrome Titanate Yellow, Nickel Antimony Titanium Yellow Rutile, Nickel Antimony Titanium Yellow Rutile, Nickel Antimony Titanium Yellow Rutile, Nickel Titanate Yellow, Yellow Medium Azo, Yellow Orange Azo; and Pearlescents, e.g., Bright Gold (Pearlescent), Bright White (Pearlescent), Interference Blue, Interference Gold, Interference Green, Interference Orange, Interference Red, Interference Violet, Iridescent White, Brass (Pearlescent), Bright Bronze (Pearlescent), Bright Copper (Pearlescent), Rich Bronze and Russet (Pearlescent); etc.

Where desired, the cool pigments may exhibit varying reflectance and transmittance values, as desired. For example, the pigments may be configured to reflect NIR and visible light but transmit UV light. Alternatively, the pigments may be configured to reflect visible and UV light but transmit NIR. Alternatively, the pigments may be configured to reflective NIR and UV light, but transmit visible light. In some instances, the pigments may be configured to reflect only one of NIR, UV and visible light, while transmitting the wavelengths that are not reflected.

Pavement Compositions

Highly reflective materials as described herein also find use in pavement compositions, including but not limited to: asphalt concrete, seal coats (e.g., chip seals, slurry seals, microsurfacings, sand seals and cape seals (chip seal followed by sand seal or slurry seal), etc., where the high reflective materials be present as aggregates in combination with one or more components, e.g., asphalt(bitumen), water, emulsifiers, other additives, etc. By aggregate is meant both course and fine aggregate. Fine aggregates are materials that almost entirely pass through a Number 4 sieve (ASTM C125 and ASTM C33), such as silica sand. Coarse aggregates are materials that are predominantly retained on a Number 4 sieve (ASTM C125 and ASTM C33). The amount and nature of an aggregate that is included in pavement compositions may vary widely.

Cements and Concretes

In some instances, the compositions find use in cementitious compositions that are prepared from a cement. Embodiments of the compositions may be described as sellable cementitious compositions, where the cementitious compositions include an amount of a highly reflective material, e.g., carbonate, as described herein, e.g., to enhance the albedo of a product produced from the cementitious composition. By "sellable cementitious composition" is meant a flowable composition that is prepared from a cement and a setting liquid, where the flowable composition sets into a solid product following preparation. Upon production, the flowable composition may have a variety of consistencies, e.g., paste, putty, etc., where the viscosity of the flowable composition may vary, ranging in some instances from 0 to 1000 mPa*s, such as 2 to 100 mPa*s. The flowable compositions set into a solid product following a period of time from production of the flowable composition, where this period of time may vary, and in some instances ranges from 1 min to 24 hrs, such as 1 hr to 3 hrs. The compressive strength of the solid products produced upon setting of the flowable compositions may also vary, ranging in some instances from 1 to 20,000 psi, such as 1000 to 5000 psi, as determined using the ASTM Test No. C109. Each of the cement and bicarbonate additive components, as well as other optional components, e.g., an additional setting liquid, aggregate, additive, etc., used to produce the sellable cementitious compositions are now reviewed in greater detail. Settable cementitious compositions include cements and concretes, the latter being a cement in combination with an aggregate, e.g., a coarse or fine aggregate.

The term "cement" as used herein refers to a particulate composition that sets and hardens after being combined with a setting fluid, e.g., an aqueous solution, such as water or an LCP (e.g., as described in above). The particulate composition that makes up a given cement may include particles of various sizes. In some instances, a given cement may be made up of particles having a longest cross-sectional length (e.g., diameter in a spherical particle) that ranges from 1 nm to 100 μm, such as 10 nm to 20 μm and including 15 nm to 10 μm.

Cements of interest include hydraulic cements. The term "hydraulic cement" as used herein refers to a cement that, when mixed with a setting fluid, hardens due to one or more chemical reactions that are independent of the water content of the mixture and are stable in aqueous environments. As such, hydraulic cements can harden underwater or when constantly exposed to wet weather conditions. Hydraulic cements of interest include, but are not limited to Portland cements, modified Portland cements, and blended hydraulic cements.

In some embodiments, the cement is a Portland cement or a Portland cement blend. Portland cements are hydraulic cement compositions that are produced by grinding or pulverizing clinkers, which are materials consisting essentially of hydraulic calcium silicates and a small amount of one or more forms of calcium sulfate as an inter-ground addition. Clinkers are made from a sintered material that is produced when a raw mixture comprising calcium and silica in predetermined proportions is sintered, or heated to high temperatures. Examples of raw materials used to produce such a mixture include, but are not limited to, limestone and clay. In addition to Portland cement clinker, a limited amount of calcium sulfate (which controls the set time), and up to 5% minor constituents (as allowed by various standards) may also be included in a Portland cement. As defined by the European Standard EN197.1, "Portland cement clinker is a hydraulic material which shall consist of at least two-thirds by mass of calcium silicates ($3CaO.SiO_2$ and $2CaO.SiO_2$), the remainder consisting of aluminium- and iron-containing clinker phases and other compounds. The ratio of CaO to $SiO_2$ shall not be less than 2.0. The magnesium content (MgO) shall not exceed 5.0% by mass." In certain embodiments, a Portland cement is a Portland cement that satisfies the ASTM Standards and Specifications of C150 (Types 1-VIII) of the American Society for Testing of Materials (ASTM C150-Standard Specification for Portland Cement). ASTM C150 covers eight types of Portland cement, each possessing different properties, and which are used specifically for those properties. The eight types of Portland cement are: Type 1 (normal); Type IA (normal, air-entraining), Type II (moderate sulfate resistance); Type IIA (moderate sulfate resistance, air-entraining); Type III (high early strength); Type IIIA (high early strength, air-entraining); Type IV (low heat of hydration); and Type V (high sulfate resistance). In some embodiments, a Portland cement may be a white Portland cement. White Portland cement is made from selected raw materials that only contain negligible amounts of iron and magnesium oxides, which are the chemical compounds that give ordinary Portland cement its grey color. White Portland cement is typically used for architectural and/or aesthetic purposes in visible structural walls, panels, terrazzo surfaces, stucco, cement paint, tile grout, and decorative concrete.

In some embodiments, a cement may be a blended hydraulic cement. The phrase "blended hydraulic cement" as used herein refers to a hydraulic cement composition that includes two or more types of cement materials. Materials used to form blended hydraulic cements include, but are not limited to: Portland cement, blast furnace slag, fly ash, silica fume, calcined clay, pozzolanic materials, hydrated lime, and combinations thereof. In some embodiments, a cement may be a masonry or mortar cement. Masonry and mortar cements are cements that are made from a mixture of a Portland cement or blended hydraulic cement and one or more plasticizing materials, such as limestone or hydrated or hydraulic lime. In certain embodiments, other materials may also be included in a masonry or mortar cement to modulate the properties of the cement, such as the setting time, workability, water retention, and durability, e.g., as described in greater detail below in the additives section.

In some embodiments, the cement component may be a non-hydraulic cement. By "non-hydraulic cement" is meant a cement whose products of hydration (i.e., the composition that is formed when the cement is mixed with a setting fluid) are not resistant to water. Examples of non-hydraulic cements include gypsum, plaster and lime cements. Non-hydraulic cements may be mixed with other components, such as pozzolanic materials, to render them resistant to water, i.e., to render them hydraulic. The term "pozzolanic materials" as used herein means a material (either a naturally-occurring material or a man-made material) containing silica or a mixture of silica and alumina.

The highly reflective materials of the invention may be present in the cementitious composition in a variety of formats, e.g., as powders or granules, such as described above. The amount of highly reflective material that may be present in the cement may vary, and in some instances may be present in amounts ranging from 0.1 to 99, such as 1 to 50 wt %.

Formed Building Materials

The highly reflective materials described herein also find use in formed building materials. For example, the composition may be incorporated into formed building materials, e.g., to enhance the albedo of such materials, etc. Formed building materials according to embodiments of the invention may vary greatly, which formed building materials comprise materials shaped (e.g., molded, cast, cut, or otherwise produced) into man-made structures with defined physical shape, i.e., configuration. Formed building materials are distinct from amorphous building materials (e.g., powder, paste, slurry, etc.) that do not have a defined and stable shape, but instead conform to the container in which they are held, e.g., a bag or other container. Formed building materials of the invention are also distinct from irregularly or imprecisely formed materials (e.g., aggregate, bulk forms for disposal, etc.) in that formed building materials are produced according to specifications that allow for use of formed building materials in, for example, buildings. Formed building materials of the invention may be prepared in accordance with traditional manufacturing protocols for such structures, with the exception that an amount of highly reflective microcrystalline/amorphous material composition of the invention is employed. The portion of components replaced with the material composition may vary, and in some instances is 5% by weight or more, including 10% by weight or more, 25% by weight or more, 50% by weight or more, 75% by weight or more, 90% by weight or more, or even 100% by weight. In producing the formed building materials, an amount of the highly reflective material composition may be combined additional components. Illustrative formed building materials according to certain embodiments of the invention are reviewed in greater detail below. However, the below review of formed building materials is not limiting on the invention, and is provided solely to further describe various exemplary embodiments of highly reflective material composition formed building materials.

Masonry units are formed building materials used in the construction of load-bearing and non-load-bearing structures that are generally assembled using mortar, grout, and the like. Exemplary masonry units of the invention include bricks, blocks, and tiles. Bricks and blocks of the invention are polygonal structures possessing linear dimensions. Bricks of the invention are masonry units with dimensions (mm) not exceeding 337.5×225×112.5 (length×width×height). Any unit with dimensions (mm) between 337.5×225×112.5 to 2000×1000×500 (length×width×depth) is termed a "block." Structural units with dimensions (mm)

exceeding 2000×1000×500 (length×width×depth) are termed "slabs." Tiles refer to masonry units that possess the same dimensions as bricks or blocks, but may vary considerably in shape, i.e., may not be polygonal (e.g., hacienda-style roof tiles).

One type of masonry unit provided by the invention is a brick, which refers to a structural unit of material used in masonry construction, generally laid using mortar. Bricks of the invention are masonry units with dimensions (mm) not exceeding 337.5×225×112.5 (length×width×height). In some embodiments, the bricks may have lengths ranging from 175 to 300 mm, such as 200 to 250 mm, including 200 to 230 mm; widths ranging from 75 to 150 mm, such as 100 to 120 mm, including 100 to 110 mm; and heights ranging from 50 to 90 mm, such as 50 to 80 mm, including 55 to 75 mm. Bricks of the invention may vary in grade, class, color, texture, size, weight and can be solid, cellular, perforated, frogged, or hollow. Bricks of the invention may include but are not limited to building brick, facing brick, load bearing brick, engineering brick, thin veneer brick, paving brick, glazed brick, firebox brick, chemical resistant brick, sewer and manhole brick, industrial floor brick, etc. The bricks may also vary in frost resistance (i.e., frost resistant, moderately frost resistant or non-frost resistant), which relates to the durability of bricks in conditions where exposure to water may result in different levels of freezing and thawing. Frost resistant bricks are durable in conditions of constant exposure to water and freezing and thawing. Moderately frost resistant bricks are durable in conditions of sporadic exposure to water and freezing and thawing. Non-frost resistant bricks are not durable in conditions of exposure to water and freezing and thawing. These bricks are suitable only for internal use and are liable to damage by freezing and thawing except when protected by an impermeable cladding during construction. Bricks of the invention may also vary in soluble salt content (i.e., low or normal). Percentage by mass of soluble ions in bricks with a low soluble salt content does not exceed 0.03% magnesium, 0.03% potassium, 0.03% sodium, and 0.5% sulfate. Percentage by mass of soluble ions in bricks with a normal salt content does not exceed 0.25% of magnesium, potassium, and sodium in total and sulfate content does not exceed 1.6%. The bricks of the invention may vary considerably in physical and mechanical properties. The compressive strength of bricks of the invention may range, in certain instances, from 5 to 100 megapascals (MPa), including 20-40 MPa. The flexural strength of bricks of the invention may vary, ranging from 0.5 to 10 MPa, including 2 to 7 MPa, such as 2 to 5 MPa. The maximum water absorption of bricks of the invention may vary, ranging from 5 to 25%, including 10 to 15%. Bricks of the invention may also undergo moisture movement (expansion or contraction) due to the absorption or loss of water to its environment. The dimensional stability (i.e., linear shrinkage or expansion) due to moisture movement may vary, in certain instances ranging from 0.001 to 0.2%, including 0.05 to 0.1%. In some embodiments, the bricks of the invention may be used for paving a road. Bricks used to pave areas exposed to heavy traffic (e.g., pedestrian, vehicular, etc.) may have an abrasion resistance index ranging from 0.1 to 0.5, including 0.2 to 0.4, such as 0.3. In addition, bricks of the invention may have a volume abrasion loss ranging from 1.0 to 4.0 $cm^3/cm^2$, including 1.5 to 2.5 $cm^3/cm^2$, such as 2.0 $cm^3/cm^2$. The highly reflective material composition of the invention may be molded, extruded, or sculpted into the desired shape and size to form a brick. The shaped composition is then dried and further hardened by hydraulic pressure, autoclave or fired in a kiln at temperatures ranging between 900° to 1200° C., such as 900° to 1100° C. and including 1000° C.

Another type of masonry unit provided by the invention is blocks, (e.g., concrete, cement, foundation, etc.). Blocks are distinct from bricks based on their structural dimensions. Specifically, blocks exceed the dimensions (mm) of 337.5×225×112.5 (length×width×height). Blocks of the invention may vary in color, texture, size, and weight and can be solid, cellular, and hollow or employ insulation (e.g., expanded polystyrene foam) in the block void volume. Blocks of the invention may be load-bearing, non-load-bearing or veneer (i.e., decorative) blocks. In some embodiments, the blocks may have lengths ranging from 300 to 500 mm, such as 350 to 450 mm, widths ranging from 150 to 250 mm, such as 180 to 215 mm and heights ranging from 100 to 250 mm, such as 150 to 200 mm. The blocks of the invention may also vary in faceshell thickness. In some instances, the blocks may have faceshell thicknesses ranging from 15 to 40 mm, including 20 to 30 mm, such as 25 mm. The blocks may also vary in web thickness. In some embodiments, the blocks may have web thicknesses ranging from 15 to 30 mm, including 15 to 25 mm, such as 20 mm. The blocks of the invention may vary considerably in physical and mechanical properties. The compressive strength of blocks of the invention may vary, in certain instances ranging from 5 to 100 MPa, including 15 to 75 MPa, such as 20 to 40 MPa. The flexural strength of blocks of the invention may also vary, ranging from 0.5 to 15 MPa, including 2 to 10 MPa, such as 4 to 6 MPa. The maximum water absorption of the blocks of the invention may vary, ranging from 7 to 20% by weight including 8 to 15%, such as 9 to 11%. Blocks of the invention may also undergo moisture movement (expansion or contraction) due to the absorption or loss of water to its environment. Blocks of the invention may be Type I moisture-controlled units or Type II non-moisture-controlled units. The dimensional stability (i.e., linear shrinkage) of the blocks of the invention may vary depending on their intended use and/or geographical location of use, in certain instances ranging from 0.02 to 0.15%, such as 0.03 to 0.05%. The highly reflective material composition of the invention may be molded, extruded, or sculpted into the desired shape and size to form a block. The shaped composition may be further compacted by roller compaction, hydraulic pressure, vibrational compaction, or resonant shock compaction. In some instances, the resultant composition may also be foamed using mechanically or chemically introduced gases prior to being shaped or while the composition is setting in order to form a lightweight concrete block. The composition is further cured in an environment with a controlled temperature and humidity.

Another type of building material provided by the invention is a tile. Tiles of the invention refer to non-load-bearing building materials that are commonly employed on roofs and to pave exterior and interior floors of commercial and residential structures. Some examples where tiles of the invention may be employed include, but are not limited to, the roofs of commercial and residential buildings, decorative patios, bathrooms, saunas, kitchens, building foyer, driveways, pool decks, porches, walkways, sidewalks, and the like. Tiles may take on many forms depending on their intended use and/or intended geographical location of use, varying in shape, size, weight, and may be solid, webbed, cellular or hollow. Tiles of the invention may vary in dimension, e.g., lengths ranging from 100 to 1000 mm, including 250 to 500 mm, such as 250 to 300 mm; widths ranging from 50 to 1000 mm, including 100 to 250 mm, such as 125 to 175 mm; and thickness ranging from 10 to 30 mm, including 15 to 25 mm, such as 15 to 20 mm. The compressive strengths of tiles of the invention may also vary, in certain instances ranging from 5 to 75 MPa, including 15 to 40 MPa, such as 25 MPa. The flexural strength of tiles of the invention may vary, ranging from 0.5 to 7.5 MPa, including 2 to 5 MPa, such as 2.5 MPa. The maximum water absorption of tiles of the invention may also vary, in certain instances ranging from 5 to 15%, including 7 to 12%. Tiles of the invention may also undergo moisture movement (expansion or contraction) due to the absorption or loss of water to its environment. The dimensional stability (i.e., linear shrinkage or expansion) due to moisture movement may vary, in certain instances ranging from 0.001 to 0.25%, including 0.025 to 0.075%, such as 0.05%. Tiles used to pave areas exposed to heavy traffic (e.g., pedestrian, vehicular, etc.) may have an abrasion resistance index that may vary considerably, ranging from 0.1 to 0.5, including 0.25. In addition, tiles may have a volume abrasion loss ranging from 1.0 to 4.0 $cm^3/cm^2$, including 1.5 to 3.0 $cm^3/cm^2$, such as 2.7 $cm^3/cm^2$. Tiles may be polygonal, circular or take on any other desired shape. As such, the highly reflective material composition of the invention may be molded or cast into the desired tile shape and size. The shaped composition may be further compacted by roller compaction, hydraulic pressure, vibrational compaction, or resonant shock compaction. The resultant composition may also be poured out into sheets or a roller may be used to form sheets of a desired thickness. The sheets are then cut to the desired dimensions of the tiles. In some instances, the resultant composition may also be foamed using mechanically or chemically introduced gases prior to being shaped or while the composition is setting in order to form a lightweight tile. The shaped composition is then allowed to set and further cured in an environment with a controlled temperature and humidity. Tiles may be further polished, colored, textured, shot blasted, inlaid with decorative components and the like.

Construction panels are formed building materials employed in a broad sense to refer to any non-load-bearing structural element that are characterized such that their length and width are substantially greater than their thickness. Exemplary construction panels of the invention include cement boards, fiber-cement sidings, and drywall. Construction panels are polygonal structures with dimensions that vary greatly depending on their intended use. The dimensions of construction panels may range from 50 to 500 cm in length, including 100 to 300 cm, such as 250 cm; width ranging from 25 to 200 cm, including 75 to 150 cm, such as 100 cm; thickness ranging from 5 to 25 mm, including 7 to 20 mm, including 10 to 15 mm. Cement boards comprise construction panels conventionally prepared as a combination of cement and fiberglass and possess additional fiberglass reinforcement at both faces of the board. Fiber-cement sidings comprise construction panels conventionally prepared as a combination of cement, aggregate, interwoven cellulose, and/or polymeric fibers and possess a texture and flexibility that resembles wood. Drywall comprises construction panels conventionally prepared from gypsum plaster (i.e., semi-hydrous form of calcium sulfate), fibers (glass or paper) and is sandwiched between two sheets of outer material, e.g., paper or fiberglass mats.

One type of construction panel provided by the invention is cement board. They are formed building materials where in some embodiments, are used as backer boards for ceramics that may be employed behind bathroom tiles, kitchen counters, backsplashes, etc. and may have lengths ranging from 100 to 200 cm, such as 125 to 175 cm, e.g., 150 to 160 cm; a breadth ranging from 75 to 100 cm, such as 80 to 100 cm, e.g., 90 to 95 cm, and a thickness ranging from 5 to 25 mm, e.g., 5 to 15 mm, including 5 to 10 mm. Cement boards of the invention may vary in physical and mechanical properties. In some embodiments, the flexural strength may vary, ranging between 1 to 7.5 MPa, including 2 to 6 MPa, such as 5 MPa. The compressive strengths may also vary, ranging from 5 to 50 MPa, including 10 to 30 MPa, such as 15 to 20 MPa. In some embodiments of the invention, cement boards may be employed in environments having extensive exposure to moisture (e.g., commercial saunas). The maximum water absorption of the cement boards of the invention may vary, ranging from 5 to 15% by weight, including 8 to 10%, such as 9%. Cement boards of the invention may also undergo moisture movement (expansion or contraction) due to the absorption or loss of water to its environment. The dimensional stability (i.e., linear shrinkage or expansion) due to moisture movement may vary, in certain instances ranging from 0.035 to 0.1%, including 0.04 to 0.08%, such as 0.05 to 0.06%. The highly reflective material composition of the invention may be used to produce the desired shape and size to form a cement board. In addition, a variety of further components may be added to the cement boards which include but are not limited to: plasticizers, foaming agents, accelerators, retarders and air entrainment additives. The highly reflective building material composition is then poured out into sheet molds or a roller may be used to form sheets of a desired thickness. The shaped composition may be further compacted by roller compaction, hydraulic pressure, vibrational compaction, or resonant shock compaction. The sheets are then cut to the desired dimensions of the cement boards. In some instances, the resultant composition may also be foamed using mechanically or chemically introduced gases prior to being shaped or while the composition is setting in order to form a lightweight cement board. The shaped composition is then allowed to set and further cured in an environment with a controlled temperature and humidity. The cement boards of the invention then may be covered in a fiberglass mat on both faces of the board. Where desired, the cement boards of the current invention may also be prepared using chemical admixtures such that they possess increased fire, water, and frost resistance as well as resistance to damage by biodegradation and corrosion. The cement board of the current invention may also be combined with components such as dispersed glass fibers, which may impart improved durability, increased flexural strength, and a smoother surface.

Another type of construction panel provided by the invention is fiber-cement siding. Fiber-cement sidings of the invention are formed building materials used to cover the exterior or roofs of buildings and include, but are not limited to building sheets, roof panels, ceiling panels, eternits, and the like. They may also find use as a substitute for timber fascias and barge boards in high fire areas. Fiber-cement sidings may have dimensions that vary, ranging from 200 to 400 cm in length, e.g., 250 cm and 50 to 150 cm in width, e.g., 100 cm and a thickness ranging from 4 to 20 mm, e.g., 5 to 15 mm, including 10 mm. Fiber-cement sidings of the invention may possess physical and mechanical properties that vary. In some embodiments, the flexural strength may range between 0.5 to 5 MPa, including 1 to 3 MPa, such as 2 MPa. The compressive strengths may also vary, in some instances ranging from 2 to 25 MPa, including 10 to 15 MPa, such as 10 to 12 MPa. In some embodiments of the invention, fiber-cement sidings may be employed on buildings that are subject to varying weather conditions, in some embodiments ranging from extremely arid to wet (i.e., low to high levels of humidity). Accordingly, the maximum water absorption of the fiber-cement sidings of the invention may vary, ranging from 10 to 25% by mass, including 10 to 20%, such as 12 to 15%. The dimensional stability (i.e., linear shrinkage or expansion) due to moisture movement may vary, in certain instances ranging from 0.05 to 0.1%, including 0.07 to 0.09%. The highly reflective material composition of the invention may be used to produce the desired shape and size to form a fiber-cement siding. In addition, a variety of further components may be added to the fiber-cement sidings which include but are not limited to: cellulose fibers, plasticizers, foaming agents, accelerators, retarders and air entrainment additives. The $CO_2$ sequestering material composition is then poured into sheet molds or a roller is used to form sheets of a desired thickness. The shaped composition may be further compacted by roller compaction, hydraulic pressure, vibrational compaction, or resonant shock compaction. The sheets are then cut to the desired dimensions of the fiber-cement sidings. In some instances, the resultant composition may also be foamed using mechanically or chemically introduced gases prior to being shaped or while the composition is setting in order to form a lightweight fiber-cement siding. The shaped composition is then allowed to set and further cured in an environment with a controlled temperature and humidity. The fiber-cement sidings of the invention may then be covered with a polymeric film, enamel or paint. Where desired, the fiber-cement sidings of the current invention may also be prepared using chemical admixtures such that they possess increased fire, water, and frost resistance as well as resistance to damage by bio-degradation and corrosion.

Another building material provided by the invention is a column, which, in a broad sense, refers to a vertical load-bearing structure that carries loads chiefly through axial compression and includes structural elements such as compression members. Other vertical compression members of the invention may include, but are not limited to pillars, piers, pedestals, or posts. Columns of the invention may be rigid, upright supports, composed of relatively few pieces. Columns may also be decorative pillars having a cylindrical or polygonal, smooth or fluted, tapered or straight shaft with a capital and usually a base, among other configurations. The capital and base of the column may have a similar shape as the column or may be different. Any combination of shapes for the capital and base on a column are possible. Polygonal columns of the invention possess a width that is not more than four times its thickness. Columns of the invention may be constructed such that they are solid, hollow (e.g., decorative columns), reinforcement filled, or any combination thereof. Columns of the invention can be short columns (i.e., columns where strength is governed by construction components and the geometry of its cross section) or slender columns (i.e., cross-sectional dimensions that are less than 5 times its length). The dimensions of the column may vary greatly depending on the intended use of the structure, e.g., from being less than a single story high, to several stories high or more, and having a corresponding width. Columns of the invention may vary in their mechanical and physical properties. Properties such as compressive and flexural strengths may vary depending on the design and intended use of the column. For example, unreinforced concrete columns may possess flexural strengths that range from 2 to 20 MPa, including 5 to 15 MPa, such as 7 to 12 MPa and compressive strengths that range from 10 to 100 MPa, including 25 to 75 MPa, such as 50 MPa. Structurally reinforced concrete columns of the invention may possess considerably larger flexural strengths, ranging from 15 to 50 MPa, including 20 to 40 MPa, such as 25 to 35 MPa and compressive strengths that range from 25 to 200 MPa, including 50 to 150 MPa, such as 75 to 125 MPa. In some embodiments, columns may be composite, wherein it may act compositely with other structural units by the introduction of interfacial shear mechanisms. In other embodiments, columns may be non-composite, wherein it utilizes the properties of the basic column alone. In producing columns of the invention, the highly reflective material compositions may be poured into a column form or cast around a correlated steel reinforcing column structure (e.g., steel rebar). In some embodiments, the steel reinforcement is pretensioned prior to casting the composition around the steel framework. In other embodiments, columns of the invention may be cast with a steel reinforcing cage that is mechanically anchored to the concrete column. The columns of the invention may also employ additional structural support components such as, but not limited to cables, wires and mesh composed of steel, ductile iron, polymeric fibers, aluminum or plastic. The structural support components may be employed parallel, perpendicular, or at some other angle to the carried load. The molded or casted composition may be further compacted by roller compaction, hydraulic pressure, vibrational compaction, or resonant shock compaction. The composition is further allowed to set and is cured in an environment with a controlled temperature and humidity. In addition, the columns of the invention may include a variety of additional components, such as but not limited to: plasticizers, foaming agents, accelerators, retarders and air entrainment additives. Where desired, these additional components may include chemical admixtures such that the columns of the invention possess increased resistance to damage by bio-degradation, frost, water, fire and corrosion.

Another building material provided by the invention is a concrete slab. Concrete slabs are those building materials used in the construction of prefabricated foundations, floors and wall panels. In some instances, a concrete slab may be employed as a floor unit. (e.g., hollow plank unit or double tee design) In other instances, a precast concrete slab may be a shallow precast plank used as a foundation for in-situ concrete formwork. Wall panels are, in a broad sense, vertical load-bearing members of a building that are polygonal and possess a width that is more than four times its thickness. Precast concrete foundation, floors and wall panels may vary considerably in dimension depending on the intended use of the precast concrete slab (e.g., one or two story building). As such, precast concrete slabs may have dimensions which range from 1 to 10 m in length or longer, including 3 to 8 m, such as 5 to 6 m; height that ranges from 1 to 10 m or taller, including 4 to 10 m, such as 4 to 5 m; and a thickness that may range from 0.005 to 0.25 m or thicker, including 0.1 to 0.2 m such as 0.1 to 0.15 m. Formed building materials of the invention such as slabs, and structures made therefrom, may be thicker than corresponding structures that lack carbonate/bicarbonate components (e.g., highly reflective material compositions) of the invention.

Another building material provided by the invention is an acoustic barrier, which refers to a structure used as a barrier for the attenuation or absorption of sound. As such, an acoustic barrier may include, but is not limited to structures such as acoustical panels, reflective barriers, absorptive barriers, reactive barriers, etc. Acoustic barriers of the invention may widely vary in size and shape. Acoustic barriers may be polygonal, circular, or any other shape depending on its intended use. Acoustic barrier may be employed in the attenuation of sound from highways, roadways, bridges, industrial facilities, power plants, loading docks, public transportation stations, military facilities, gun ranges, housing complexes, entertainment venues (e.g., stadiums, concert halls) and the like. Acoustic barriers may also be employed for sound insulation for the interior of homes, music studios, movie theaters, classrooms, etc. The acoustic barriers of the invention may have dimensions that vary greatly depending on its intended use, ranging from 0.5 to 10 m in length or longer, e.g., 5 m and 0.1 to 10 m in height/width or wider, e.g., 5 m and a thickness ranging from 10 to 100 cm, or thicker e.g., 25 to 50 cm, including 40 cm. Where desired, the acoustic barrier may be employed with various coatings or liners (e.g., polymeric), and may be configured for easy joining with each other or pillars separating additional acoustic barriers to produce long acoustic barrier structures made up of multiple acoustic barriers of the invention. In some embodiments, acoustic barriers of the invention may employ sound absorptive material (e.g., wood shavings, textile fibers, glass wool, rock wool, polymeric foam, vermiculite, etc.) in addition to a structurally reinforcing framework. In some embodiments, acoustic barriers of the invention may be used as noise-reduction barriers in an outdoor environment (e.g., along a highway, near an airport, etc.) and may be employed with structural support components (e.g., columns, posts, beams, etc.). In producing acoustic barriers of the invention, the highly reflective material composition is poured into a mold to form the desired acoustic barrier shape and size. Also the composition may be poured out into a sheet mold or a roller may be used to form sheets of a desired thickness. The shaped composition may be further compacted by roller compaction, hydraulic pressure, vibrational compaction, or resonant shock compaction. The sheets are then cut to the desired dimensions of the acoustic barriers. In some instances, the resultant composition may also be foamed using mechanically or chemically introduced gases prior to being shaped or while the composition is setting in order to form a lightweight acoustic panel structure. The shaped composition is further allowed to set and is cured in an environment with a controlled temperature and humidity. In addition, the acoustic barriers of the invention may include a variety of further components, such as but not limited to: plasticizers, foaming agents, accelerators, retarders and air entrainment additives. Where desired, the further components may include chemical admixtures such that they possess increased resistance to damage by bio-degradation, frost, water, fire and corrosion. In some embodiments, the acoustic barriers of the invention may employ structural support components such as, but not limited to cables, wires and mesh composed of steel, ductile iron, polymeric fibers, aluminum or plastic.

Paints and Primers

In addition to formed building materials, the highly reflective material compositions may be incorporated into liquid compositions, e.g., primers, paints, pavements, other coating materials, etc., for application to a surface of a substrate in order to increase the albedo of the surface, e.g., as described above. As used herein, the term "paint" refers to a liquid composition that forms a colored film when applied to a surface. Where the compositions described herein are used as a paint, the paint may contain (in addition to the a highly reflective material, e.g., as described above, one or more of: binders, pigments; dyes; solvents; surface tension modifiers; rheology modifiers; stabilizers; binders; antifreeze property modifiers; foaming controllers; skinning controllers; thickeners; emulsifiers; texture modifiers; adhesion promoters; antioxidants; UV stabilizers; flatteners (de-glossing agents); biocides; and other materials.

Photovoltaic Devices and Systems

Highly reflective materials as described herein also find use in photovoltaic devices and systems that include the same. Photovoltaic devices are devices that include one or more photovoltaic elements, e.g., cells. Photovoltaic devices further include a component that includes a highly reflective material, e.g., as described herein. On type of photovoltaic device of interest is a device which includes one or more albedo surfaces that are configured to reflect light onto a photovoltaic element, which may or may not be bifacial and may or may not include an array of photovoltaic cells. The albedo surfaces may be beneath and or to the side of the photovoltaic element, as desired. The albedo surface may be made up entirely of the highly reflective material describe herein, or be a composite material of the highly reflective material and one or more additional materials, as desired. An example of a photovoltaic device that includes an albedo surface which may include a highly reflective material as described herein is disclosed in published U.S. Patent Application No. 2007/0017567, the disclosure of which is herein incorporated by reference.

Another type of photovoltaic device that may include a higher reflective material of the invention is a photovoltaic roofing element. An example of such a photovoltaic roofing element is one that includes roofing element which includes one or more photovoltaic cells, and granules that include a highly reflective material of the invention positioned (e.g., as described above) on the active surface thereof, either directly on the active surface or separated from the active surface of the cell(s) by one or more intervening, e.g., adhesive, layers. The composition of the granules may be configured to reflect only light outside of the active range of the photovoltaic cell(s) or may be positioned on the active surface in such a manner that not all of the surface is covered by the granules. Such photovoltaic devices are further described in published U.S. Patent Application No. 2012/0011783, the disclosure of which is herein incorporated by reference.

The following examples are offered by way of illustration and not by way of limitation.

EXPERIMENTAL

I. Preparation and Characterization of Reflective $CO_2$ Sequestering Compositions A. Preparation Two highly reflective materials (i.e., BP1 and BP2) were prepared as follows from highly reactive calcium carbonate compositions. The BP1 and BP2 calcium carbonate formulations were prepared from gaseous $CO_2$ using an LCP mediated protocol as described above. The BP1 dry powder formulation was determined to include three calcium carbonate polymorphs in the following amounts: 48.9% aragonite, 43.2% amorphous vaterite precursor/anhydrous amorphous carbonate and 8.0% calcite. The BP1 dry powder formulation also contained less than 5% kaolin. The BP2 formulation contained only reactive carbonate made up of amorphous vaterite precursor/anhydrous amorphous carbonate (50.1%) and aragonite (49.9%).

The BP1 and BP2 powder formulations were blended and hydrated with 10% by weight setting solution and pressed for 15 minutes at 5000 psi. BP1 contained <5% kaolin, BP2 was only reactive carbonate.

Figure 2B:
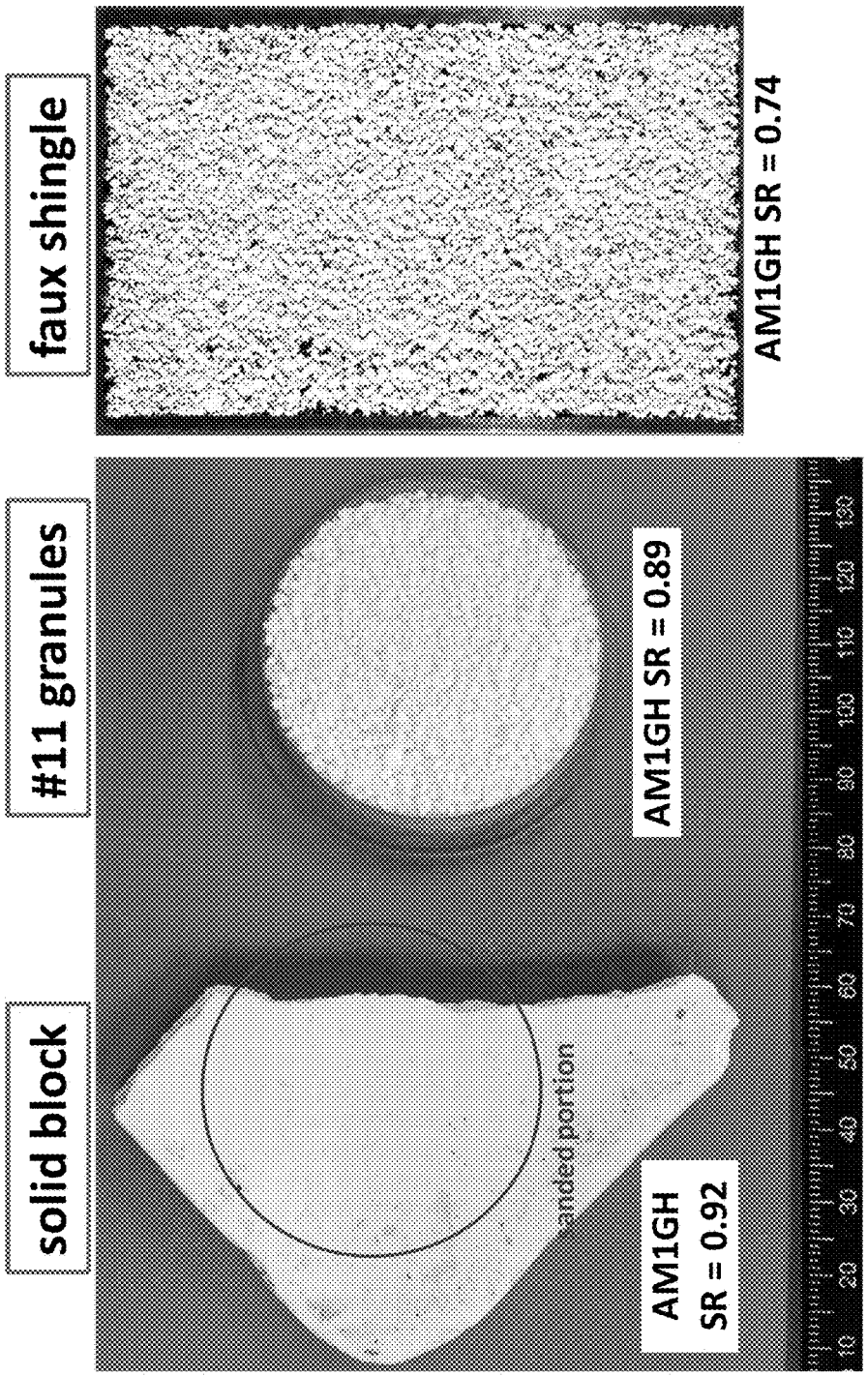
FIG. 2B provides picture of a solid block, #11 granules and a faux shingle prepared from formulation BP#2.

FIG. 2A provides picture of a solid block, #11 granules and a faux shingle prepared from formulation BP#1. FIG. 2B provides picture of a solid block, #11 granules and a faux shingle prepared from formulation BP#2. The blocks were prepared from a $CO_2$ sequestering cement composition, which composition was prepared as described above.

B. Reflectance Testing

Figure 3C:
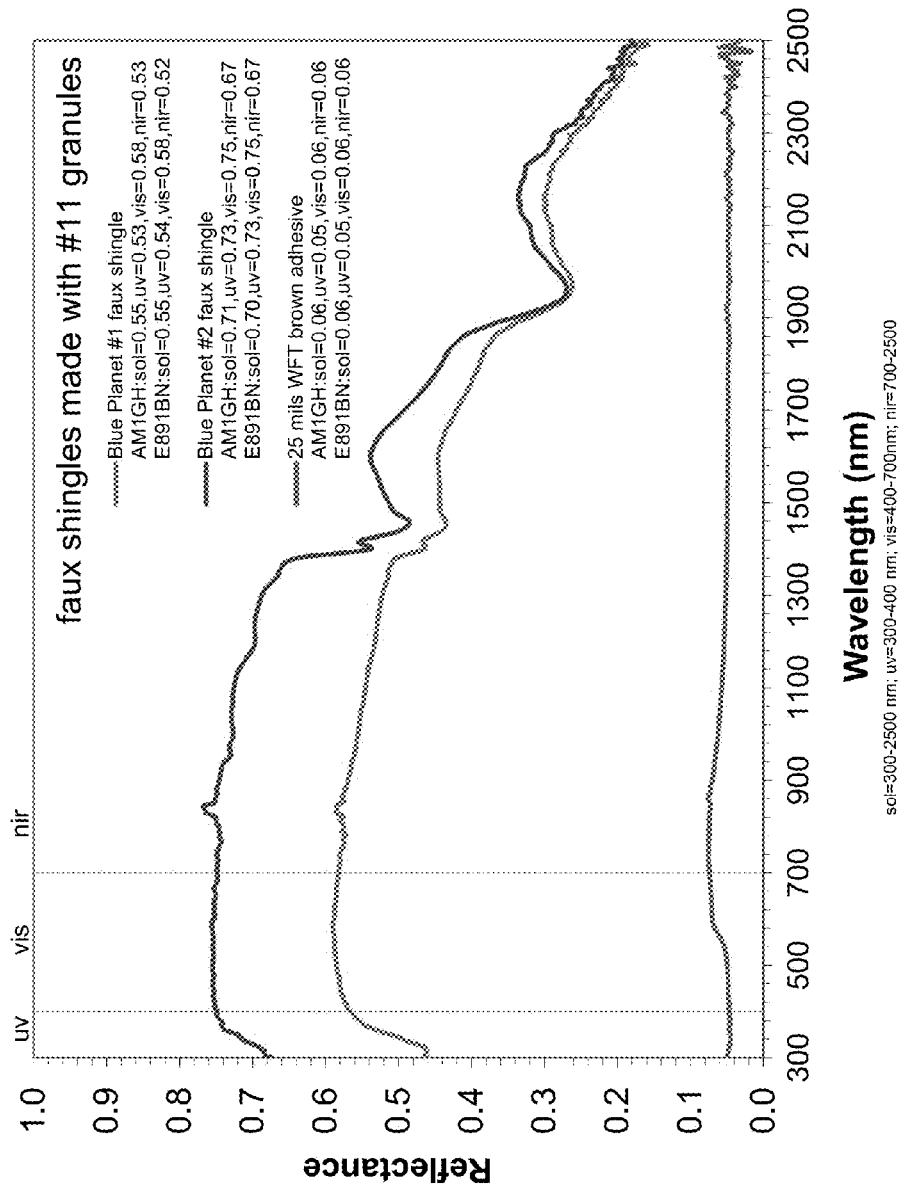
FIG. 3C provides graphical results of the observed reflectance of a faux shingles of BP#1 and BP#2, as compared to 25 mils WFT brown adhesive.

Reflectance was evaluated using the following protocol:
1. Solar Spectral Reflectance/Transmittance:
Instrument: Perkin-Elmer Lambda 900 Spectrophotometer, equipped with a 150-mm diameter Labsphere Spectralon integrating sphere
   ASTM E903-96
   measurement spans 300-2500 nm in 5 nm steps
   weight spectrometer measurements with AM1 GH solar spectral irradiance
2. Solar Reflectance
Instrument: Devices and Services, Co. Solar Spectrum Reflectometer, model SSR-ER version 6
   ASTM C1549-09
   measure AM1 GH solar reflectance (select G1 output on device)
3. Preparation of Specimens
a. #11 Granules
1. Crushed the sanded solid blocks with a hammer and screened material with a hand sieve
   Reflectance
      Poured granules into a Petri dish to create an opaque layer (~1 cm thickness)
      Measured opaque layer AM1 GH solar reflectance with SSR
   Transmittance of ~1 monolayer of #11 granules
      Sandwiched a 1.6 mm layer of #11 granules between 2 quartz plates
      Note that the characteristic diameter of granules is ~1.2 mm, so a 1.6 mm layer represents slightly more than 1 monolayer of granules
      Before measurements, calibrated spectrometer with empty quartz cell in place
b. Faux Shingle
1. Applied 25 mils WFT dark brown adhesive (AM1 GH SR=0.06) onto a chromated Al panel substrate
2. Pressed ~1 monolayer of granules into adhesive and allowed shingles to cure >1 week
C. Results FIG. 3A provides graphical results of the observed reflectance of a solid block of BP#1 and BP#2. FIG. 3B provides graphical results of the observed reflectance of a #11 granules of BP#1 and BP#2. FIG. 3C provides graphical results of the observed reflectance of a faux shingles of BP#1 and BP#2, as compared to 25 mils WFT brown adhesive.

The above results are summarized in Table 1 below:

|  | Blue Planet #1 | Blue Planet #2 |
| --- | --- | --- |
| Reflectance of solid block (opaque) | 0.76 | 0.92 |
| Reflectance of #11 granules (opaque layer) | 0.62 | 0.89 |
| Reflectance of faux shingle | 0.58 | 0.74 |
| Transmittance of ≥1 monolayers of #11 granules | 0.02 | 0.08 |

The above results demonstrate that the BP#1 and BP#2 $CO_2$ sequestering materials are highly reflective and suitable for use in building applications, such as inclusion in roofing shingles.

II. Preparation and Characterization of Highly Reflective Compositions

Materials and Methods:
1. Carbonate Precipitation

Carbonate precipitation reactions were performed in 16 to 84 L plastic vessels with industrial grade $CaCl_2$, $MgCl_2$, $Na_2SO_4$ and $NaHCO_3$. Precipitations were performed at ambient temperature and pressure with agitation.

The $CaCO_3(s)$ employed in the following experiments may also be produced using the following $CO_2$ sequestration reaction, which is further described in U.S. application Ser. No. 14/112,495; the disclosure of which is herein incorporated by reference:

Blue Planet Ltd. —Second Stage/Back End Reaction
Front End:

$$CO_2(g)+H_2O(l)=HCO_3.(aq)+H^+(aq) \quad (1)$$

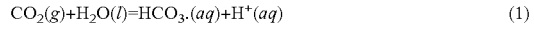

Back End:

$$Ca^2(aq)+2HCO_3.(aq)=CaCO_3(s)+CO_2(aq)+H_2O(l) \quad (2)$$

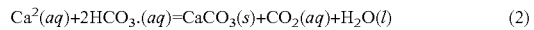

Precipitations were dewatered using Buchner filters and the resulting slurry was dried at ambient pressure and temperature to produce a powder.
2. Phase Identification FTIR Powders, cements and coupons (produced by pressing) were tested by hand and graded according to durability against breaking. All materials were observed by Fourier transform infrared (FTIR) on a Nicolet is 10 unit with a germanium crystal ATR attachment. Patterns were observed and analyzed from 600 $cm^{-1}$ to 2000 $cm^{-1}$ wavelength.
3. Scanning Electron Microscopy Precipitated Carbonates, Cements and Compacted Carbonate Materials were imaged on a scanning electron microscope (SEM)(Hitachi S-3400N-II SEM equipped with an INCA E250 EDX System for microanalysis). The SEM is variable pressure and works with both secondary electrons (SE) and backscattered electrons (BSE). Samples imaged used BSE with gold-coating (15 nm).
4. Carbonate Ceramic Testing Powders were mixed at 0.12 to 0.16 L:P (liquid to powder) ratio with solutions and pressed in Carver press model 3850 (12 ton press) using a 1" die. The die used was item SDS25, a 25 mm cylindrical die set purchased from Across International Inc. The maximum die pressure for this model is 30 metric tons.

Materials were weighed and thoroughly homogenized using a Homeland Housewares blender, item MBR-1701, and model MB1001B. Powder total weight was chosen between 6 g and 8 g depending on the unconsolidated powder volume. Powders were then inserted into the die and placed in the press. Materials were compacted to 20,000 lbf. The compact was held for 5 minutes at pressure. The liquid component was added either prior to pressing, and mixed with starting reagents, or after the initial 5 minutes of pressing. In the case that the liquid component was added, after 5 minutes of pressing the die was removed, bottom mold components removed, liquid introduced and allowed to absorb into the sample, and then the die was reassembled and pressed for 2 minutes at 13,000 lbf.
5. Curing The compacted pellets were further reacted in solutions to undergo curing process. Pellets were divided into pieces and each piece was submerged into tapwater, seawater, 3M $MgCl_2$, 1M $HCO_3$-containing or 1M $Na_2CO_3$ solutions. The submerged samples were stored in 5-mL plastic vials and kept in 40° C. water bath. The properties were continuously monitored using FTIR at regular time intervals.

6. Solar Irradiance Reflectance Measurement

Solar reflectance measurements were collected using SSR-ER instrument from Devices & Services Company, Dallas Tex. or Lamda 950 from Perkin Elmer. Samples were measured for Solar Reflectance and associated color rating in accordance with L*, a*, b* coloration measurement (CIELab, see e.g., http://en.wikipedia.org/wiki/Lab_color_space). LAB coloration system is designed to mimic the human eye's ability to identify and translate color.

Results:

1. Precipitation Reactions

Precipitated Ca-carbonates that were used to form the densified carbonate samples in this work were synthesized using a dual decomposition method with four different chemistries as seen below. Dual decomposition method involves separate dissolution of $CaCl_2$ and $NaHCO_3$ powders (indicated by separate parentheses in the reactions below). After reagents had fully dissolved, carbonate solutions were poured into $CaCl_2$ solutions. These chemistries resulted primarily in calcite, amorphous vaterite precursor/anhydrous amorphous carbonate, a low magnesium amorphous calcium carbonate (ACC-Mg)*, and calcium silicate-carbonate co-precipitate. The primary chemistries are as follows:

Calcite (1M $CaCl_2$)+(1M $NaHCO_3$)  1.

Amorphous vaterite precursor/anhydrous amorphous carbonate (0.13M $CaCl_2$+0.05M $MgCl_2$)+ (0.18M $NaHCO_3$+0.05M $Na_2SO_4$)  2.

Mg-ACC (0.15M $CaCl_2$+0.6M $MgCl_2$)+(0.75M $NaHCO_3$)  3.

Ca-silicate/carbonate (0.1M $CaCl_2$)+(0.095M $NaHCO_3$+0.005M $Na_2CO_3$)+($SiO_2 \cdot nH_2O$)  4.

Reagents used for reactions 1 to 3 are as follows: Calcium Chloride-Pellets of Fire, Dart Seasonal Products Inc. (see e.g., the website having address made up of "http://www." in front of "dartsp.com"). Magnesium Chloride—MAG Ice Melting Pellets, Dead Sea Works Ltd. (see e.g., the website having address made up of "http://www." in front of "iclfertilizers.com"). Strontium Chloride Hexahydrate, The Science Company CAS#10025-70-4, Lot#36377. Sodium Sulfate, Dudadiesel Biodiesel supply (see e.g., the website having address made up of "http://www." in front of "dudadiesel.com"). Sodium Bicarbonate, Arm & Hammer, Lot# BSFC-01170-04. Reagents used for reaction 4 were smaller scale, using ACS grade chemicals: Calcium Chloride Hexahydrate, Aldrich CAS# 7774-34-7, Lot# BCBL2738V, Sodium Bicarbonate, Arm & Hammer, Lot# BSFC-01170-04, Sodium Carbonate Anhydrous, Aqua Solutions CAS#497-19-8, Lot#106203, colloidal silica LUDOX AM-30 (30% suspended in water).

Precipitate Example 1

Calcite (reaction 1) was precipitated by dissolving 1.75 kg of $CaCl_2$ into 8 kg water and 672 g of $NaHCO_3$ in 8 kg water. The 8 kg $NaHCO_3$ solution was added to 8 kg $CaCl_2$ solution and the mixed solution immediately began to precipitate white carbonate precipitates. The precipitation continued for 1 hour with thorough mixing using an automated stirrer. Then the precipitates were Buchner-filtered and the filtered slurry was squeeze-dried using paper towels and dried overnight in ambient condition.

Precipitate Example 2

Amorphous vaterite precursor/anhydrous amorphous carbonate (reaction 2) was prepared in a similar manner to calcite, but in 84 L scale. 2.39 kg $CaCl_2$ and 0.85 kg $MgCl_2$ were dissolved in 56 L water, and 1.27 kg $NaHCO_3$ and 0.6 kg $Na_2SO_4$ were dissolved in 28 L water. After complete dissolution, $NaHCO_3.Na_2SO_4$ mixture was added to $CaCl_2$—$MgCl_2$ mixture and precipitated for 1 hour with automated stirring. Then the precipitates were Buchner-filtered and the filtered slurry was dried using paper towels and dried overnight in ambient condition. For amorphous vaterite precursor/anhydrous amorphous carbonate precipitation, sodium sulfate level was kept lower than 0.1 M due to dominant precipitation of calcium sulfate at sulfate concentration higher than 0.1 M.

Precipitate Example 3

Mg-ACC (reaction 3) was prepared in 84 L-scale, by mixing 2.76 kg $CaCl_2$ and 10.25 kg $MgCl_2$ in 42 L water, and 5.29 kg $NaHCO_3$ was dissolved in a separate container with 42 L water. The $NaHCO_3$ solution was poured into $CaCl_2$—$MgCl_2$ and precipitated for 1 hour with automated stirring. Then the precipitates were Buchner-filtered and the filtered slurry initially dried using paper towels and then dried overnight in ambient condition.

Precipitate Example 4

To increase the robustness of Ca-carbonate, colloidal silica was added to precipitate with carbonates to form a Ca-silicate/carbonate coprecipitate (reaction 4). First, 10.95 g $CaCl_2$ was dissolved in 500 ml water and another 500 ml-batch was prepared by mixing 0.212 g $Na_2CO_3$ and 3.99 g $NaHCO_3$ in 500 ml water. At 100° C., 10 ml of colloidal silica was first added to $CaCl_2$ solution with magnetic stirring. Then $NaHCO_3$—$Na_2CO_3$ solution was added to Ca-silica mixture and kept stirred for 1 hour at 100° C. to form the Ca-silicate/carbonate coprecipitate. The precipitates were Buchner-filtered and the filtered slurry initially dried using paper towels and then dried overnight in ambient condition.

a. Characterization

Peaks used to identify the materials by way of FTIR testing are described in Koutsoukos et al. (J. Chem. Soc., Faraday Trans. I, 1989, 85(10), 3165-3172). Calcite is indicated by dual peaks at 714 $cm^{-1}$ and 876 $cm^{-1}$ and amorphous vaterite precursor/anhydrous amorphous carbonate is indicated by a strong band at 745 $cm^{-1}$. Amorphous carbonate is identified by a large peak, signifying non-crystallinity, between 600 $cm^{-1}$ and 1000 $cm^{-1}$. Selected FTIR results are highlighted below and their associated chemistries are noted.

FTIR spectra of various precipitates were obtained and analyzed. Without Mg, most stable calcite was precipitated (peaks specific to 713 $cm^{-1}$ and 875 $cm^{-1}$), and with small amount of Mg, relatively unstable amorphous vaterite precursor/anhydrous amorphous carbonate phase precipitated (dark blue spectrum, amorphous vaterite precursor/anhydrous amorphous carbonate peak shown at 744 $cm^{-1}$). With higher Mg level, the most unstable amorphous carbonates (Mg-ACC) appeared (as shown in broadened peaks in the observed spectrum). A strong peak around 1100 $cm^{-1}$ (red) was indicative of polymerized silica in Ca-silicate precipitation.

Amorphous precipitates were also imaged on a scanning electron microscope (SEM) and energy dispersive x-ray (EDX) absorption tests were performed on reaction 3 (discussed above) and 5 (Sr used instead of Mg in reaction 3) which were:

(0.15M CaCl$_2$+0.6M MgCl$_2$)+(0.75M NaHCO$_3$)  3.

(0.15M CaCl$_2$+0.6M SrCl$_2$)+(0.75M NaHCO$_3$)  5.

Figure 4A:
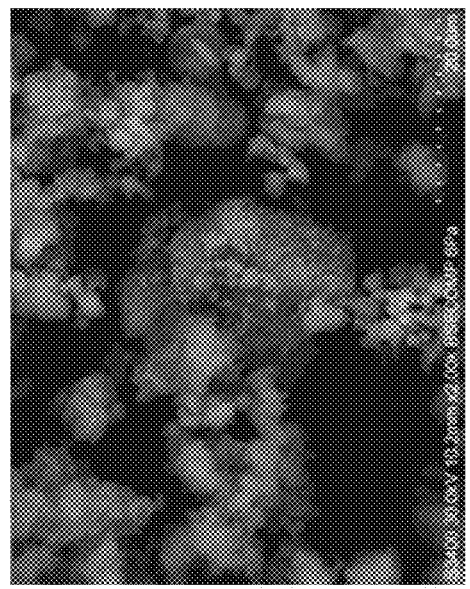
FIGS. 4A and 4B provide SEM images of two different materials produced in the Experimental Section, below.

FIG. 4A provides the image of precipitate 3. The elemental analysis of this precipitate is provided below:

| Element | Weight % | Atomic % |
|---|---|---|
| O K | 95.99 | 84.59 |
| Na K | 0.31 | 0.19 |
| Mg K | 1.59 | 0.92 |
| Cl K | 0.46 | 0.18 |
| Ca K | 40.11 | 14.11 |

Precipitate 3 appears to be a low magnesium calcite as indicated by Railsback et al. (LBR 820HMC-LMCSolubilities05 4/95; rev. October 2006—Railsback—Some fundamentals of Mineralogy and Geochemistry).

Figure 4B:
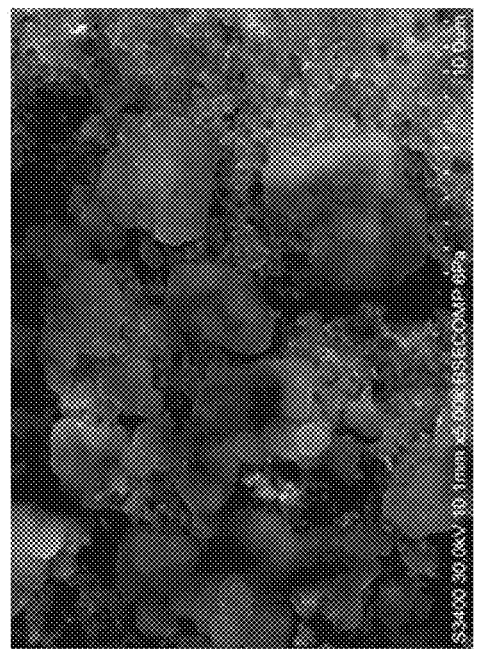

FIG. 4B provides the image of precipitation 5. The elemental analysis of this precipitate is provided below:

| Element | Weight % | Atomic % |
|---|---|---|
| C K | 61.66 | 51.37 |
| O K | 63.39 | 39.65 |
| Na K | 2.29 | 1.00 |
| Cl K | 6.39 | 1.80 |
| Ca K | 4.40 | 1.10 |
| Sr K | 44.57 | 5.09 |

When strontium was used in the same manner in the calcium and carbonate system it was apparent by EDX that a high level of Strontium was precipitated in the final carbonate. The material appears to be predominantly amorphous strontium carbonate.

b. Carbonate Precipitation from Flue Gas

Precipitate Example 5

In addition to using sodium bicarbonate chemicals, calcium carbonate precipitate has also been produced by using CO$_2$ gas. To form an LCP solution, 100 µg L-Arginine and 2 mM/L NaOH were added to 16 L water at 23° C. Then the solution was pressurized to 160 psi with CO$_2$. Once CO$_2$ was dissolved into the liquid phase, the solution was introduced into a reverse osmosis (RO) membrane system which allowed the retentate to be captured. Then 2000 mg/L CaCl$_2$.2H$_2$O was added to the retentate, which resulted in Ca-carbonate precipitation. The Ca-carbonate was used in forming carbonate cements. In an alternate example, calcium chloride was added prior to passing the solution through a membrane.

c. Colored Carbonate Precipitation

Colored carbonate materials were precipitated potentially for pigment applications. These materials were precipitated according to the standard Blue Planet method as outlined above. Transition metal chlorides were used, specifically MnCl$_2$ (Sigma-Aldrich Lot# MKBG2452V) and CuCl$_2$ (Sigma-Aldrich Lot# BCBL2738L) and further reagents were the same as used in previous reactions. Calcium Chloride Hexahydrate, Aldrich CAS#7774-34-7, Lot# BCBL2738V and Sodium Bicarbonate, Arm & Hammer, Lot# BSFC-01170-04.

The following reactions were performed in pyrex vessels with magnetic stirring at 400 rpm in the standard dual decomposition method. The reactions were performed at ambient temperature (23° C.) and took place at a lower pH than reactions 1-5 (referenced previously). Reactions 6 and 7 occurred at pH 6.1-6.7 and reactions 8 and 9 took place between 6.3-7.3.

(0.45M CaCl$_2$+0.05M MnCl$_2$)+(1M NaHCO$_3$)  6.

(0.5M MnCl$_2$)+(1M NaHCO$_3$)  7.

(0.45M CaCl$_2$+0.05M CuCl$_2$)+(1M NaHCO$_3$)  8.

(0.5M CuCl$_2$)+(1M NaHCO$_3$)  9.

Precipitated Pigment Example 1

In reaction 6, 98.59 g CaCl$_2$ and 6.29 g MnCl$_2$ were dissolved in 1 L of water, and 84.01 g NaHCO$_3$ was separately dissolved in 1 L water. The NaHCO$_3$ solution was poured into CaCl$_2$—MnCl$_2$ solution and the mixture was mixed with a magnetic stirrer for 1 hour. Then the light red precipitates were Buchner-filtered and the filtered slurry was initially dried using paper towels and then dried overnight under ambient condition.

Precipitated Pigment Example 2

Reaction 7 was precipitated by mixing 62.92 g MnCl$_2$ into 1 L of water and 84.01 g NaHCO$_3$ into another liter of water. Then NaHCO$_3$ solution was poured into CaCl$_2$—MnCl$_2$ solution with magnetic stirring and kept for 1 hour. The rose red precipitates were Buchner-filtered and the filtered slurry was initially dried using paper towels and then dried overnight under ambient condition.

Precipitated Pigment Example 3

In reaction 8, 98.59 g CaCl$_2$ and 6.72 g CuCl$_2$ were dissolved in 1 L of water, and 84.01 g NaHCO$_3$ was separately dissolved in 1 L water. The NaHCO$_3$ solution was poured into CaCl$_2$—CuCl$_2$ solution and the mixture was mixed with a magnetic stirrer for 1 hour. Then the blue precipitates were Buchner-filtered and the filtered slurry was initially dried using paper towels and then dried overnight under ambient condition.

Precipitated Pigment Example 4

Reaction 9 was precipitated by dissolving 67.23 g CuCl$_2$ into 1 L of water and 84.01 g NaHCO$_3$ into another liter of water. Then NaHCO$_3$ solution was poured into CaCl$_2$—CuCl$_2$ solution with magnetic stirring and kept for 1 hour. The green precipitates were Buchner-filtered and the filtered slurry was initially dried using paper towels and then dried overnight under ambient condition.

These resulted in variously colored carbonate precipitates. Reaction 6 was light red, and Reaction 7 was rose/red. Reaction 8 produced a blue/green product and Reaction 9 produced a green product.

2. Manufacture of Albedo Enhancing Materials from Precipitate a. Ceramic Samples Precipitated powders were pressed to densify and observe reactions that may take place during the powder pressing process. Coupons were composed of 6-11 grams of powders (depending on volume of respective powders) and hydrated with 10 wt. % of a liquid phase to aid and/or promote any potential reaction. The liquid phases introduced into the samples (mixing solutions) were 1M $MgCl_2$, 3M $MgCl_2$, 1M $Na_2CO_3$, 3M $Na_2CO_3$, as well as 10 ppm $SrCl_2$ and 10,000 ppm $SrCl_2$. Samples were compressed in a SD25, 25 mm die set in a Carver Press at 15,000 lbf. The die was used at ambient room temperature (23° C.), and at elevated temperature 80° C. and 130° C.

Samples were tested for durability qualitatively by hand. The most durable samples were reproduced (S47-S53) (similar to Ceramic Sample Example 3) and sent to measure reflectance with illumination by a solar irradiance lab tester, model SSR by Devices and Services Company (Data Seen Below—Reflectance Data). These samples were not cured post compression in a solution. Mechanical testing of various coupons as produced is in process. Highlighted below are various samples that were produced and compared to starting powders to observe any characteristic change in their bond characterization by way of ATR-FTIR.

Ceramic Production Example 1

Pressed sample 31 was composed of 4.5 grams of magnesium stabilized amorphous calcium carbonate (precipitate section ACC-Mg) as well as 4.5 grams of amorphous vaterite precursor/anhydrous amorphous carbonate. The powder was mixed with 1 ml 1M $MgCl_2$ solution and compacted to 15,000 lbf for 5 minutes. The die temperature was 130° C. As observed by FTIR, the sample showed no significant reaction and the pressed coupon indicated a peak pattern indicative of the addition of the curves exhibited by the powders.

Ceramic Production Example 2

Sample 35 was composed of 6 grams of amorphous vaterite precursor/anhydrous amorphous carbonate and 3 grams of magnesium stabilized calcium carbonate/low magnesium carbonate, mixed with 1 mL of 1M $Na_2CO_3$. Powders were mixed with fluid and placed in the heated die (130° C.) then compressed to 15,000 lbf and maintained under pressure for 5 minutes. This sample showed no significant reaction after compaction.

Ceramic Production Example 3

Sample 42 was a mixture of precipitated strontium carbonate (4 g) and amorphous vaterite precursor/anhydrous amorphous carbonate (4 g). The powders were blended and compressed in a die at 130° C. for 5 minutes at 15,000 lbf. No mixing solution was used in this experiment. Similar to samples 31 and 35, the compressed powders show no reaction product after being compressed.

Ceramic Production Example 4

Sample 19 was a compressed powder coupon composed of 6 grams of calcite precursor with a significant ACC character. This material was blended with 2 mL of 10 ppm $SrCl_2$. Hydrated powder was placed in the die at 130° C. and compacted for 5 minutes at 15,000 lbf. FTIR analysis revealed that the no reaction is taking place without a post-curing step.

| Sample# | materials | Mixing solution | Die temp (° C.) |
| --- | --- | --- | --- |
| S11 | Rxn 2 (amorphous vaterite precursor/anhydrous amorphous carbonate) 8 g | 4M $MgCl_2$ 2 g | 23 |
| S18 | Rxn 2 (amorphous vaterite precursor/anhydrous amorphous carbonate) 6 g | 10 ppm $SrCl_2$ 2 g | 23 |
| S19 | Rxn 2 (amorphous vaterite precursor/anhydrous amorphous carbonate) 6 g | 10 ppm $SrCl_2$ 2 g | 130 |
| S31 | Rxn 2 (amorphous vaterite precursor/anhydrous amorphous carbonate) + 4.5 g + Rxn 3 (Mg-ACC) 4.5 g | $MgCl_2$ 1 ml | 130 |
| S33 | Rxn 2 6 g + Rxn 3 3 g | $MgCl_2$ 1 ml | 130 |
| S35 | Rxn 2 (amorphous vaterite precursor/anhydrous amorphous carbonate) 6 g + Rxn 3 3 g | $Na_2CO_3$ 1 ml | 130 |
| S36 | Rxn 2 6 g + Rxn 3 3 g + $Na_2CO_3$ 1 g | $MgCl_2$ 1 ml | 130 |
| S37 | Rxn 2 6 g + Rxn 3 3 g + $NaHCO_3$ 1 g | $MgCl_2$ 1 ml | 130 |
| S38 | Rxn 2 4 g + Rxn 3 3.5 g | $Na_2CO_3$ 1 ml | 130 |
| S96 | Rxn 2 4 g (wet amorphous vaterite precursor/anhydrous amorphous carbonate) + rxn 1 (calcite) 6 g | | 23 |
| S109 | Rxn 2 4 g (dry amorphous vaterite precursor/anhydrous amorphous carbonate) + rxn 1 6 g | DI water 1 ml | 23 |
| S118 | Rxn 4 4 g (wet Ca-silicate) and rxn 1 6 g | | 65.8 |
| S119 | Rxn 4 (wet) 4 g and rxn 4 6 g | 1M $Na_2CO_3$ 1 ml | 71.9 |
| S120 | Rxn 2 (amorphous vaterite precursor/anhydrous amorphous carbonate) 4 g + rxn 1 4 g + AlO 0.5 g | LUDOX colloidal silica 1.5 ml | 48.4 |
| S122 | Rxn 2 (amorphous vaterite precursor/anhydrous amorphous carbonate) 4 g + rxn 1 4 g + silicic acid 0.5 g | LUDOX colloidal silica 1.5 ml | 68.9 |

Ceramic Production Example 5

Sample E 3 was produced by dewatering reaction precipitate #56 during reaction. 100 grams of the wet slurry was then placed in an extruder after blending with 120, 100 and 80 grams of a templating material. These extruded products were then exposed to setting and curing conditions.

ii. Effects of Preparation Method on Compressed Coupon Samples

The compressed sample preparation method can affect the chemistry and hardness of samples. As stated on the table above, sample 18 and 19 were prepared in the exact same manner, but sample 19 was heated while pressing, while sample 18 was pressed at room temperature. As the result, the chemistry of dried sample 18 and 19 was different.

Sample 18 showed mostly ACC with little calcite, while 19 showed calcite and amorphous vaterite precursor/anhydrous amorphous carbonate with little aragonite. Also, the compressive strength results after curing were significantly different. The unheated sample, 18 was found to be considerably stronger than heated sample 19.

Figure 5:
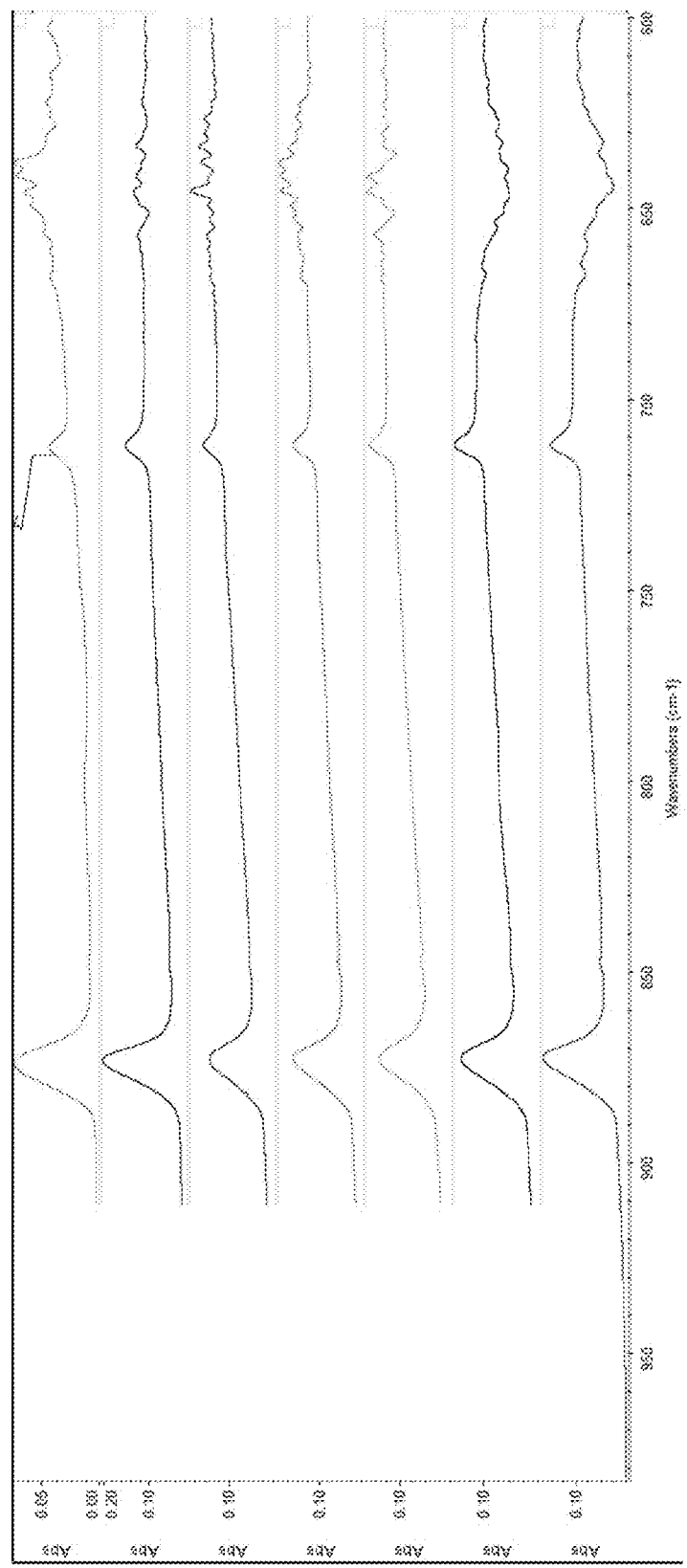
FIG. 5 provides the infrared spectra of sample 96 cured in various liquids, as detailed in the Experimental Section, below.

For some samples that contained stable starting materials, most transformation occurred mainly during compression, and no further reaction occurred during curing. Some of our samples contained calcite as the starting material for compression (S96-S122), as calcite can serve as a template for continuous calcite growth and eventually develop strength of the sample (see e.g., sample 96). As mentioned in the previous table, S96 was made from a mixture of reaction 2 (amorphous vaterite precursor/anhydrous amorphous carbonate) and reaction 1 (calcite). Most amorphous vaterite precursor/anhydrous amorphous carbonates in the sample transformed into calcite during compression, which was stable enough not to undergo further reactions regardless of curing. When S96 was compressed, the coupon came out to be very hard, and it maintained its strength even after curing. The coupons further hardened as all of remaining amorphous vaterite precursor/anhydrous amorphous carbonates transformed into calcite. In parallel to curing in tapwater, $Na_2CO_3$, seawater, and $MgCl_2$ at 40° C., other samples were cured in DI water and 1M $NaHCO_3$ for 17 days at room temperature. All the samples were stable enough to stay as calcite and maintained the very hard strength. The FTIR results are shown in FIG. 5. FIG. 5 provides an FTIR of original S96 (top), and S96 cured in water (second from top), in 1M $Na_2CO_3$ (third from top), in Moss Landing seawater (fourth from top), and in 3M $MgCl_2$ (third from bottom) for 7 days at 40° C.; FTIR of S96 cured in 1M $NaHCO_3$ (second from bottom) and DI water (bottom) for 17 days at 23° C. All the results show the common calcite peak at 877 and 713 $cm^{-1}$.

Unlike reaction 4, in which the co-precipitation of Ca-silicate and $CaCO_3$ were prepared before mixing (discussed more in detail in previous section), other samples were prepared by adding silicic acid and colloidal silica directly to $CaCO_3$ powder blends just before pressing (samples 122 and 123). The main purpose of adding silica to $CaCO_3$ blends was to improve the strength and stability of compressed coupons and cured samples. Unlike sample 118, which the reaction completed during compression and produced a hard pellet, samples 122 and 123 were still relatively weak after compression. FTIR results of S122 and S123 coupons indicated presence of ACC, amorphous vaterite precursor/anhydrous amorphous carbonate, polymerized silica with little calcite. However, as the samples were cured, drastic chemistry changes occurred and the samples began to build very high strength.

b. Curing of Compressed Samples

After compression, the samples were cured at 40° C. to form fully stabilized and hardened materials. Every compressed coupon piece was submerged into 3 ml tapwater, seawater (from Moss Landing), 3M $MgCl_2$, or 1M $Na_2CO_3$ solutions. The submerged samples were stored in 5-mL plastic vials and kept in a temperature-adjustable water bath at 40° C. to maintain the temperature for 1 week. As the samples were continuously monitored using FTIR, changes in chemistry occurred according to different reaction conditions. The detailed methodology of cured samples and the results are stated in table below. Different results were obtained by using different curing solutions.

Curing Example 1

As an example, sample 69, which originally consisted of ACC, transformed into calcite when cured in 1M $Na_2CO_3$ solution, while it transformed to aragonite in seawater. FTIR spectra comparing the original S69 and S69 cured in 1M $Na_2CO_3$ clearly indicated the formation of calcite by appearance of representative calcite peak at 713 $cm^{-1}$ after 4 days.

Curing Example 2

As a comparison, S69 cured in seawater shows a completely different result, as peaks specific to aragonite at 853, 713, and 700 $cm^{-1}$ continues to grow for 7 days. A possible reason for the diverging result is that high pH in $Na_2CO_3$ solution stabilizes the metastable ACC and amorphous vaterite precursor/anhydrous amorphous carbonate to calcite, and different kinds of cations and organic compounds induced transformation into aragonite in seawater as they inhibit calcite formation. For instance, past studies show evidence that the presence of $Mg^{2+}$, $Fe^{2+}$, and dissolved organic carbons (DOCs) inhibit calcite formation. The two resulting cured samples were intensely hardened, due to formation of calcite and aragonite.

As mentioned in previous section, amorphous vaterite precursor/anhydrous amorphous carbonate and ACCs are metastable phases of calcium carbonate that are prone to transformation into more stable polymorphs as calcite or aragonite depending on reaction conditions. Another example that shows different transformation tendency with different curing solution was sample 37.

Curing Example 3

The coupon was originally composed of amorphous vaterite precursor/anhydrous amorphous carbonate, ACC, and calcite. Although the original sample contained some calcite, it was transformed into aragonite when cured in water or 3M $MgCl_2$, while it transformed to calcite in 1M $Na_2CO_3$ solution. As the case of S69, the cured sample hardened after 4 to 6 days of curing.

The following table provides a summary of a subset of the curing samples that were studied.

| Sample# | Curing solution | FTIR before cure | FTIR after cure | hardness | Duration (days) |
|---|---|---|---|---|---|
| S11-CW | tap water | ACC | Aragonite | Very hard | 6 |
| S18-CC | 1M $Na_2CO_3$ | ACC | calcite | Very hard | 6 |
| S18-CW | tap water | ACC | Calcite, amorphous vaterite precursor/ anhydrous amorphous carbonate, ACC | soft | 6 |

-continued

| Sample# | Curing solution | FTIR before cure | FTIR after cure | hardness | Duration (days) |
|---------|-----------------|------------------|-----------------|----------|-----------------|
| S19-CC | 1M $Na_2CO_3$ | Calcite, amorphous vaterite precursor/ anhydrous amorphous carbonate | calcite | medium | 6 |
| S35-CW | tap water | Calcite, amorphous vaterite precursor/ anhydrous amorphous carbonate | Calcite, aragonite | medium | 7 |
| S36-CC | 1M $Na_2CO_3$ | Calcite, amorphous vaterite precursor/ anhydrous amorphous carbonate | Calcite | medium | 7 |
| S37-CC | 1M $Na_2CO_3$ | Calcite, amorphous vaterite precursor/ anhydrous amorphous carbonate, ACC | Calcite, ACC, amorphous vaterite precursor/ anhydrous amorphous carbonate | Very hard | 6 |
| S68-CS | seawater | ACC | Amorphous vaterite precursor/ anhydrous amorphous carbonate, aragonite | Very hard | 7 |
| S68-CM | 3M $MgCl_2$ | ACC | ACC, calcite, amorphous vaterite precursor/ anhydrous amorphous carbonate | soft | 7 |
| S68-CC | 1M $Na_2CO_3$ | ACC | ACC, calcite | Very hard | 7 |
| S96-CS | Seawater | calcite | calcite | Very hard | 4 |

FTIR analysis of original dry S69 coupon and S69 cured in 1 M $Na_2CO_3$ for 4 days was done. The observed peak at 713 $cm^{-1}$ for the cured sample represented calcite. FTIR of original dry S69 coupon and S69 cured in seawater for 4 days, and 7 days was done. The peaks appearing at 853, 713, 700 $cm^{-1}$ in the spectra of the cured samples represented the generation of aragonite.

c. Carbonate Ceramics Containing Colored Industrial Pigments & Carbonate Pigments Samples 87, 88, 89, and 90 (not shown in the table) were prepared in the exact same manner of preparing sample 68, by mixing 4 g of reaction 18 (amorphous vaterite precursor/ anhydrous amorphous carbonate) and 4 g of reaction 25 (Mg-stabilized ACC) with 1 ml of 3M $Na_2CO_3$ mixing solution. However, samples 87, 88, 89, and 90 were added with buff and red Sakrete pigments and, blue, and black Ferro pigments, respectively. The result of curing the samples for 7 days indicated that hardness of the samples was not significantly affected when using these metal oxide dyes. Colored coupons were also compressed using $MnCl_2$ or $CuCl_2$ starting materials to obtain beige, brown, green, and blue colors, and the samples were cured in solutions.

d. Production of Granules

Carbonate ceramics were granulated in a jaw crusher, gap graded on a US Tyler Sieve machine and placed on a bitumen backed shingle tile. #11 granules were removed form the sieve stack and used as the granular material coating the shingle. The materials were rolled onto the shingle and tested in reflectance. FIGS. 2A & 2B. Solar reflectance was measured and resulted in a high solar reflectance FIG. 3C. The reduction process has also been performed on a disk mill, roller mill, hammer mill, media mill and the granules may or may not be treated with a coating process prior to adhering to the shingle.

e. Production of Aggregate

Highly reflective aggregates have been produced by granulating precipitated powder, then pelletizing or tableting the granulated material. The aggregate could be from 1 mm to 100 mm in diameter and could be angular, fragmented in shape or round. The materials have been used in concrete, showing good performance data and could be used for high albedo reflective road surfacing. Furthermore, the aggregate may be produced in a gap graded fashion or reduced from large amounts of extruded materials that have set and cured, as desired.

f. Reflectance Data

Figure 6:
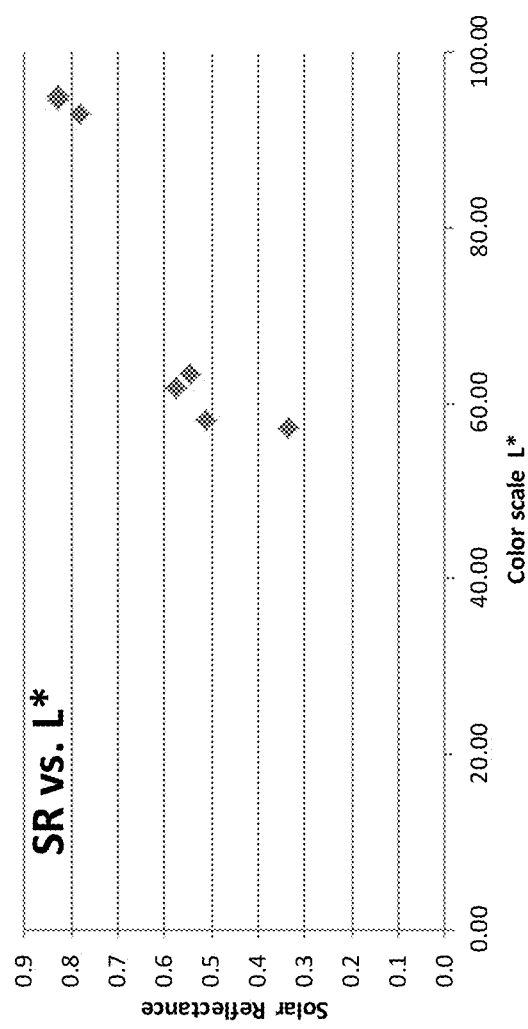
FIG. 6 provides graphical results of reflectance vs. color for various prepared materials, as detailed in the Experimental Section, below.

Reflectance Data of carbonate ceramic coupons S-47-S-53 can be seen below. Solar reflectance for the non-pigmented samples ranges from 78-83% reflective and the pigmented samples range from 33-57% reflective. Common roofing materials are much lower. FIG. 6 provides further results.

| | Color Data | | | Solar Reflectance | | |
|---|---|---|---|---|---|---|
| Sample ID | L* | a* | b* | reading 1 | reading 2 | Avg. |
| SP-47 | 95.01 | 1.09 | 3.89 | 0.813 | 0.831 | 0.822 |
| SP-48 | 94.62 | 1.08 | 4.52 | 0.828 | 0.823 | 0.826 |
| SP-49 | 92.95 | 1.00 | 3.94 | 0.764 | 0.787 | 0.776 |
| SP-50 side1 | 57.18 | 18.59 | 20.21 | 0.329 | 0.337 | 0.333 |

-continued

| | Color Data | | | Solar Reflectance | | |
|---|---|---|---|---|---|---|
| Sample ID | L* | a* | b* | reading 1 | reading 2 | Avg. |
| SP-50 side 2 | 72.71 | 15.23 | 21.57 | | | |
| SP-51 | 61.76 | 25.73 | 19.48 | 0.566 | 0.579 | 0.573 |
| SP-52 | 63.28 | 0.80 | −32.21 | 0.542 | 0.543 | 0.543 |
| SP-53 side 1 | 58.02 | −0.44 | −3.40 | 0.508 | 0.504 | 0.506 |
| SP-53 side 2 | 67.71 | −0.69 | −3.92 | | | |

Figure 7:
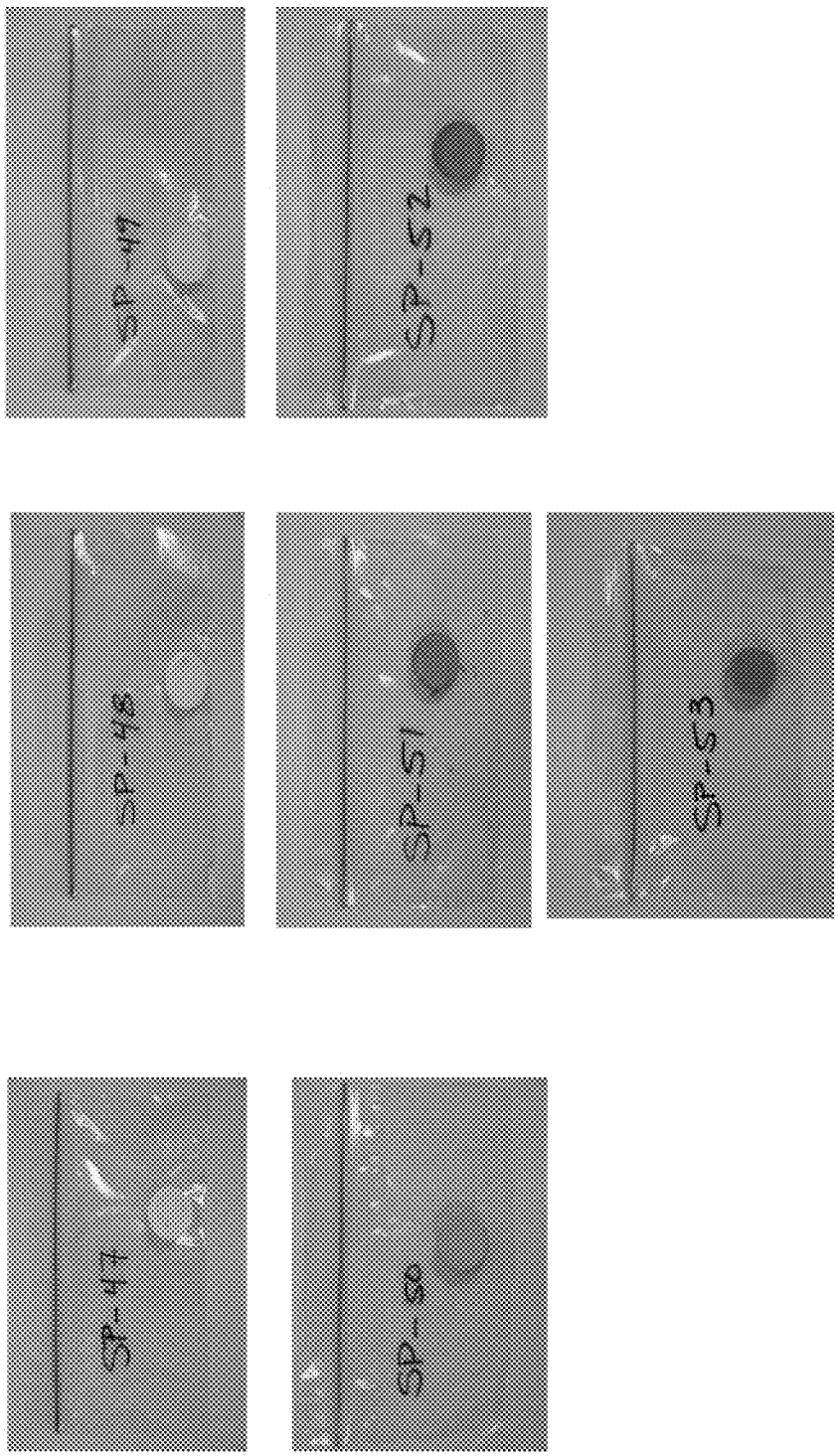
FIGS. 7 and 8 provide photographs of several different colored coupons produced in the Experimental Section, below.

FIG. 7 provides pictures of Samples 47 to 53. Samples were further sanded with 240 grit then 400 grit sandpaper and the solar reflectance increased:

| ID | 1.5E SR | L1 (IR) | L2 (RED) | L3 (Blue) | L4 (UV) |
|---|---|---|---|---|---|
| SP-47 | 0.889 | 0.803 | 0.927 | 0.922 | 0.825 |
| SP-48 | 0.887 | 0.805 | 0.921 | 0.921 | 0.816 |
| SP-49 | 0.854 | 0.752 | 0.892 | 0.911 | 0.793 |
| SP-50 | 0.626 | 0.654 | 0.691 | 0.461 | 0.314 |
| SP-51 | 0.632 | 0.75 | 0.683 | 0.353 | 0.317 |
| SP-52 | 0.675 | 0.751 | 0.658 | 0.606 | 0.726 |
| SP-53 | 0.558 | 0.779 | 0.436 | 0.464 | 0.515 |

Solar reflectance of S156-S164 (The composition of these materials was similar to ceramic coupon example 1 and 2 noted above) was measured at Lawrence Berkeley National Lab (LBNL). These samples were prepared by mixing 4 g of amorphous vaterite precursor/anhydrous amorphous carbonate and 4 g Mg-stabilized ACC blended with 0.5-1 ml Na2CO3 mixing solution. Solar reflectance of white samples range in 85-92%. The reflectance of cured sample (S156.4) dropped by approximately 7% compared to uncured sample (S163). Gray, red, orange, and blue-colored samples also exhibited relatively high reflectance compared to commercial cool roofing materials. They ranged in 32-59% reflectivity. Results are summarized in the table below: Setting performed in Humidity Chamber (noted HC at 80 C, 60-99% RH), Curing performed in a solution bath.

| Sample name | Sample description | Thickness (mm) | AM1GH solar reflectance |
|---|---|---|---|
| Rxn10 + sol. Silica | (none) | 19.2 | 0.853 |
| S156.4 | 7 day set HC; 6 day cure; 1M Na2CO3 | 8.0 | 0.808 |
| S157 | 8 day set HC | 6.1 | 0.919 |
| S158 | 8 day set HC | 6.3 | 0.591 |
| S159 | 8 day set HC | 6.0 | 0.324 |
| S160 | 8 day set HC | 5.3 | 0.512 |
| S162 | 8 day set HC | 8.5 | 0.438 |
| S163.4 | 7 day set HC | 6.1 | 0.876 |
| S163.5 | 7 day set HC | 6.0 | 0.891 |
| S163.6 | 7 day set HC | 6.1 | 0.896 |

Figure 8:
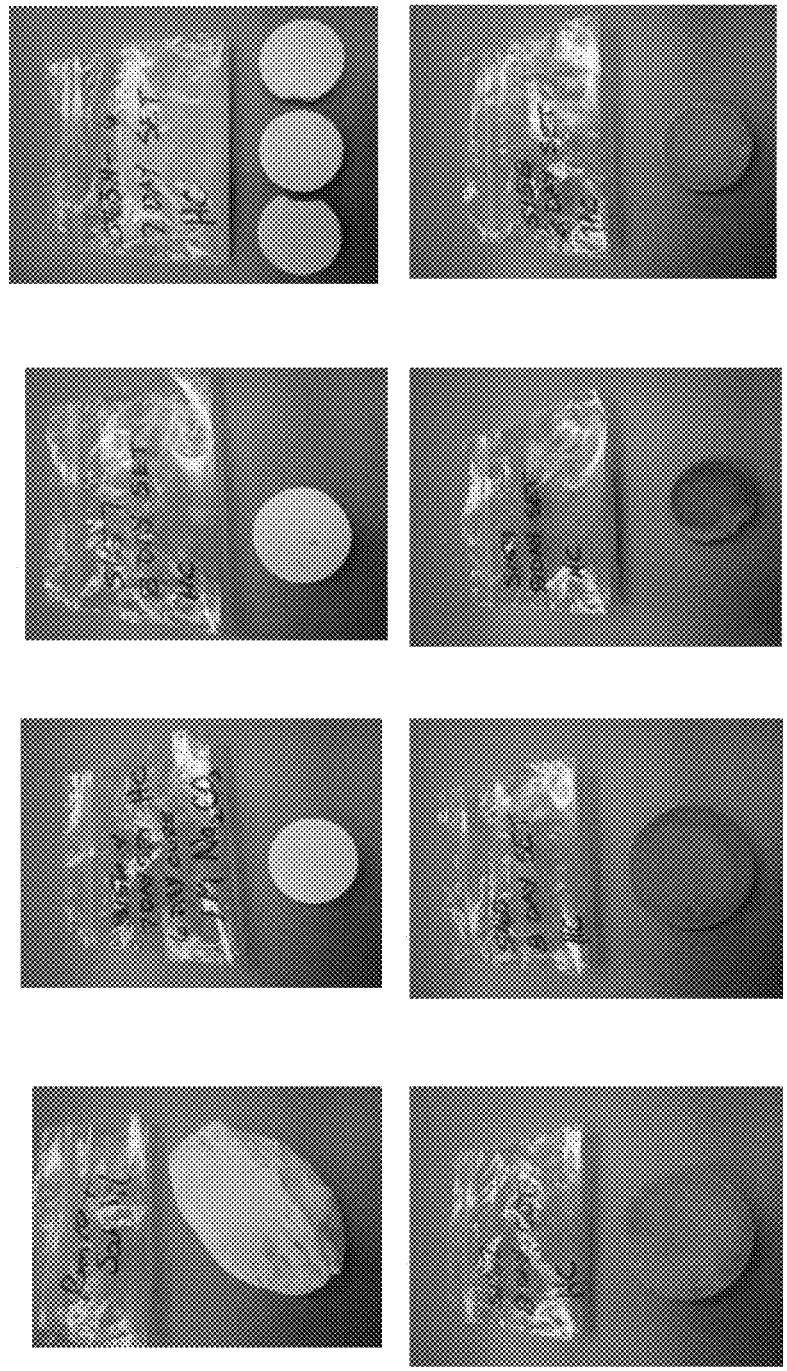

Pictures of the samples are provided in FIG. 8.

c. Products Made from Blue Planet Materials a. Roofing Granules

Roofing granules will be fed to a continuous process by a feeder where they may or may not be treated with a liquid coating and dried using ambient heat from the bitumen heating process. The materials will then be passed to and distributed onto a warmed bitumen surface, adhering to a fiber board shingle backing.

b. Cool Pigments

Figure 9:
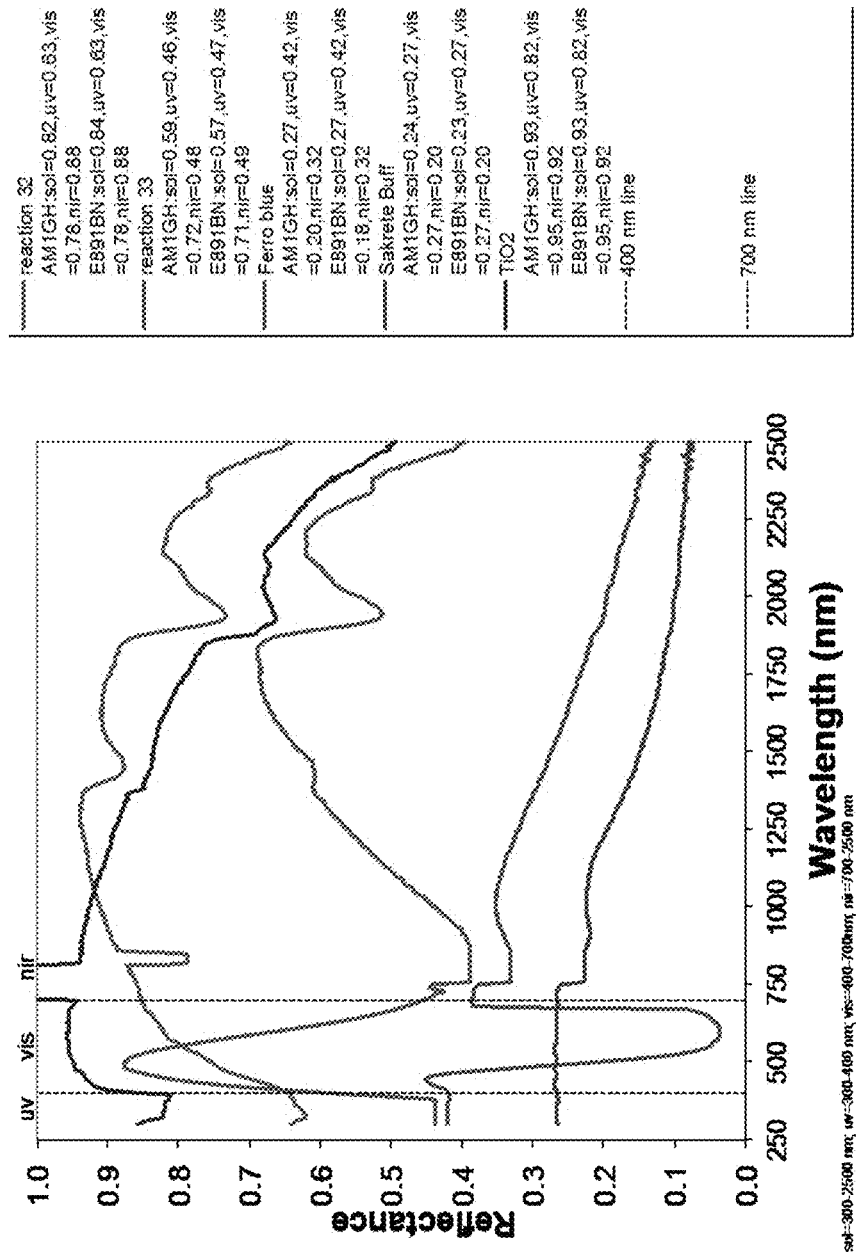
FIG. 9 provides reflectance data of colored precipitates compared to commercial Sakrete pigments, Ferro Pigments and $TiO_2$.

Cool pigments are precipitated and used as a replacement for current pigment technology. Examples are Ferro, Shepard, BASF mixed metal oxides, organic and inorganic pigments. Blue Planet cool pigments replace Titanium Dioxide for reflectance purposes and/or are used in conjunction with varying amounts of $TiO_2$. FIG. 9 is a solar Reflectance comparison between Blue Planet Pigment, TiO2 and industrially available pigments from Ferro and Sakrete. Cool pigments may also be used as pigment extenders or to extend the use of $TiO_2$. Blue Planet cool pigments and reflective 'white' materials find use to reduce the required amount of pigment or $TiO_2$ required for specific UV absorbtion, Near Infra-red reflectance or color additions, where reductions in requirements of $TiO_2$ while maintaining comparable functionality, e.g., substantially the same or the same functionality may vary, where reductions in need for $TiO_2$ may be 5% or more, such as 10% or more, including 15%, 20%, 25%, 50%, 75% or more, e.g., ranging in some instances from 5 to 90% reduction, such as 10 to 75% reduction, including 15 to 50% reduction, where all percentages are by weight.

c. Roofing Membranes

TPO or other polymer single or multi ply roofing membrane process include the use of a cool carbonate precipitate or a cool pigment to increase the albedo of the roofing product. Blue Planet cool pigments replace Titanium Dioxide for reflectance purposes or be used in conjunction with varying amounts of $TiO_2$.

d. Road Materials

Pelleted or tableted aggregates are used in application to road surfacing by using whole of in granular form. The aggregates are used with a bitumen glue layer on top of new or existing pavement, in a chip or cape sealing application. Aggregates are also used with tarring applications or asphalt road surfacing applications that include rubberized asphalt as well as cold patch and normal asphalt.

e. Concrete

Figure 10:
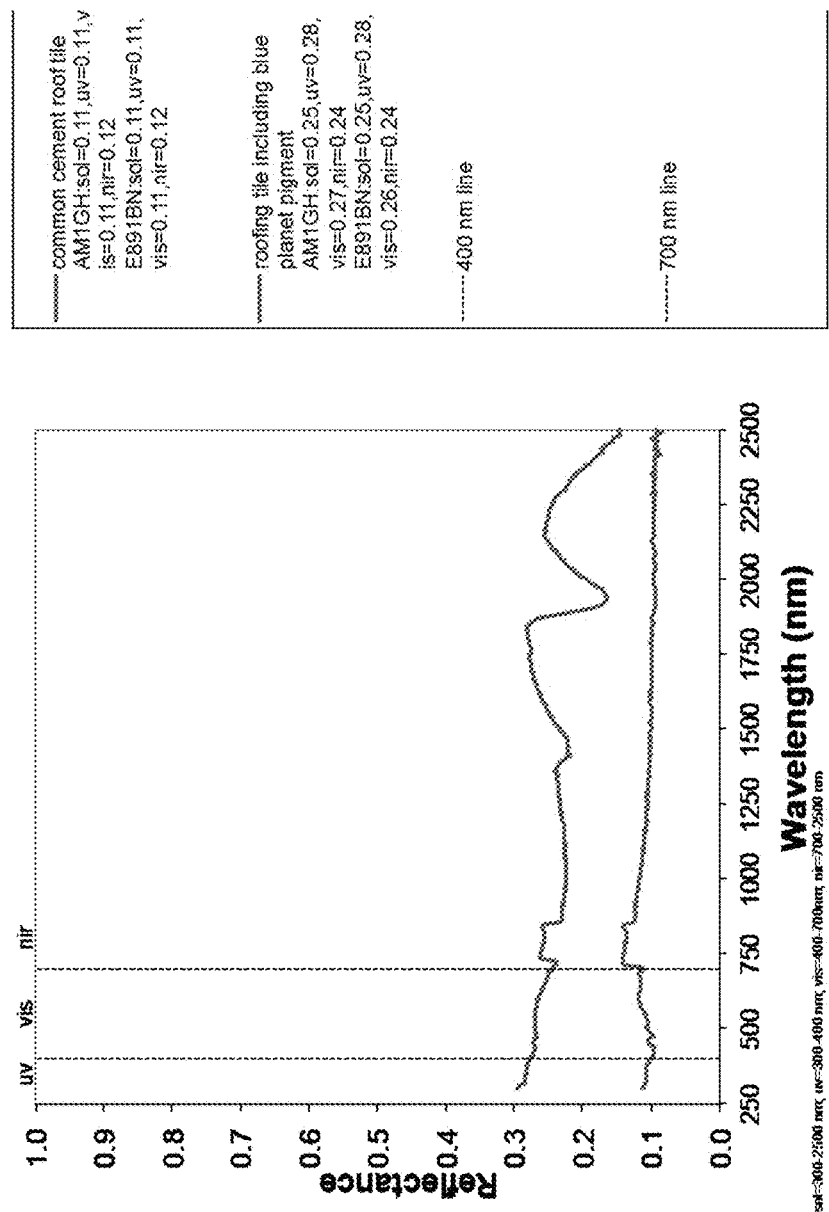
FIG. 10 provides a comparison between common concrete roofing tile and roofing tile including Blue Planet Pigment, as detailed in the Experimental Section, below.

Concrete is made using Blue Planet carbonate aggregates created from pelletizing, granulating and tableted form. The aggregate is used in precast concrete, brick, block, paver, various weight concrete and other concrete such as formed masonary units, pumpable concrete and normal weight concrete. FIG. 10 provides a comparison between common concrete roofing tile and roofing tile including Blue Planet Pigment.

Notwithstanding the appended clauses, the disclosure is also defined by the following clauses:

1. A light reflective composition, the composition comprising a highly reflective microcrystalline/amorphous material.
2. The composition according to Clause 1, wherein the material comprises a microcrystalline carbonate component.
3. The composition according to Clause 2, wherein the microcrystalline carbonate component has a crystal size ranging from 0 or X-ray Amorphous to 100μ.
4. The composition according to Clause 2, wherein the microcrystalline carbonate component comprises at least one of calcium carbonate and magnesium carbonate.
5. The composition according to Clause 4, wherein the microcrystalline component comprises both a calcium carbonate and a magnesium carbonate.
6. The composition according to Clause 1, wherein the microcrystalline component comprises a clay mineral.
7. The composition according to Clause 6, wherein the clay mineral comprises kaolinite.
8. The composition according to Clause 1, wherein the material is a $CO_2$ sequestering material.
9. The composition according to Clause 8, wherein the $CO_2$ sequestering material is prepared by:
   contacting a $CO_2$ containing gas with an aqueous medium under conditions sufficient to produce a bicarbonate rich product; and precipitating a carbonate mineral from the bicarbonate rich product.

10. The composition according to Clause 9, wherein the bicarbonate rich product comprises droplets of a liquid condensed phase (LCP) in a bulk liquid.

11. The composition according to any of the preceding clauses, wherein the material has a near infra-red (NIR) reflectance ranging from 50 to 99%.

12. The composition according to any of the preceding clauses, wherein the material has a ultra-violet (UV) reflectance ranging from 50 to 99%.

13. The composition according to any of the preceding clauses, wherein the material has a visible light reflectance ranging from 50 to 99%.

14. The composition according to any of the preceding clauses, wherein the composition further comprises one or more pigments.

15. The composition according to Clause 12, wherein the pigments are cool pigments.

16. The composition according to any of the preceding clauses, wherein the composition is a solid.

17. The composition according to Clause 16, wherein the microcrystalline material is in a granular form.

18. The composition according to Clause 17, wherein the composition further comprises a solid support, wherein the microcrystalline material is present on a surface of the solid support.

19. The composition according to Clause 18, wherein the composition is configured as a building material.

20. The composition according to Clause 19, wherein the building material is roofing material.

21. The composition according to Clause 16, wherein the composition is a dry powder.

22. The composition according to Clause 1, wherein the composition is a liquid.

23. The composition according to Clause 22, wherein the composition is a paint.

24. The composition according to Clause 1, wherein the composition comprises a photovoltaic element.

25. The composition according to Clause 1, wherein the composition is a cementitious composition.

26. A method of enhancing the albedo of a surface, the method comprising:
    associating with the surface an amount of a microcrystalline/amorphous material effective to enhance the albedo of the surface.

27. The method according to Clause 26, wherein the microcrystalline/amorphous material is a carbonate material.

28. The method according to Clause 27, wherein the microcrystalline carbonate component comprises at least one of calcium carbonate and magnesium carbonate.

29. The method according to Clause 28, wherein the microcrystalline component comprises both a calcium carbonate and a magnesium carbonate.

30. The method according to Clause 27, wherein the carbonate material comprises a highly reflective $CO_2$ sequestering material.

31. The method according to Clause 30, wherein the $CO_2$ sequestering material is prepared by:
    contacting a $CO_2$ containing gas with an aqueous medium under conditions sufficient to produce a bicarbonate rich product; and
    precipitating a carbonate mineral from the bicarbonate rich product.

32. The method according to Clause 31, wherein the bicarbonate rich product comprises droplets of a liquid condensed phase (LCP) in a bulk liquid.

33. The method according to Clause 26, wherein the material has a near infra-red (NIR) reflectance ranging from 50 to 99%.

34. The method according to Clause 26, wherein the material has a ultra-violet (UV) reflectance ranging from 50 to 99%.

35. The method according to Clause 26, wherein the material has a visible light reflectance ranging from 50 to 99%.

36. The method according to Clause 26, wherein the material is associated with the surface by incorporating it into an object having the surface.

37. The method according to any of Clauses 26 to 36, wherein the material is associated with the surface by applying the material onto the surface.

38. A method of making a light reflective composition, the method comprising:
    combining a highly reflective microcrystalline material and a second component to make the light reflective composition.

39. The method according to Clause 38, wherein the microcrystalline material comprises a microcrystalline carbonate component.

40. The method according to Clause 39, wherein the microcrystalline carbonate component has a crystal size ranging from X-ray Amorphous to 100μ.

41. The method according to Clause 40, wherein the microcrystalline carbonate component comprises at least one of calcium carbonate and magnesium carbonate.

42. The method according to Clause 41, wherein the microcrystalline component comprises both a calcium carbonate and a magnesium carbonate.

43. The method according to Clause 38, wherein the microcrystalline material has a ultra-violet (UV) reflectance ranging from 50 to 99%.

44. The method according to Clause 38, wherein the microcrystalline material has a visible light reflectance ranging from 50 to 99%.

45. The method according to Clause 38, wherein the second component comprises one or more pigments.

46. The method according to Clause 45, wherein the pigments are cool pigments.

47. The method according to Clause 38, wherein the composition is a solid.

48. The method according to Clause 38, wherein the composition is a liquid.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A method of enhancing the albedo of a surface of a roof shingle surface, the method comprising:
    applying to the roof shingle surface a carbonate material so that the carbonate material is present only on the surface of the roof shingle, wherein the carbonate material comprises a $CO_2$ sequestering carbonate compound that is produced by a method comprising:
    (a) contacting a $CO_2$ containing gas with a bicarbonate buffered aqueous medium having a pH that ranges from 8 to 10 under conditions sufficient to produce a bicarbonate rich product that comprises droplets of a liquid condensed phase (LCP) in a bulk liquid; and
    (b) combining the bicarbonate rich product with a cation source under conditions sufficient to produce a solid carbonate composition comprising the $CO_2$ sequestering carbonate compound.

2. The method according to claim 1, wherein the bicarbonate buffered aqueous medium has a pH that ranges from 8 to 9.

3. The method according to claim 1, wherein the bicarbonate buffered aqueous medium is sea water.

4. The method according to claim 1, wherein the $pCO_2$ of the $CO_2$ containing gas in contact with bicarbonate buffered aqueous medium is $10^4$ Pa or higher.

5. The method according to claim 1, wherein the droplets of a liquid condensed phase (LCP) have a diameter ranging from 10 to 100 nm.

6. The method according to claim 1, wherein the $CO_2$ containing gas is contacted with the bicarbonate buffered aqueous medium in the presence of a catalyst that mediates the conversion of $CO_2$ to bicarbonate.

7. The method according to claim 1, wherein the cation source is a source of divalent cations.

8. The method according to claim 7, wherein the divalent cations are alkaline earth metal cations.

9. The method according to claim 8, wherein the divalent alkaline earth metal cations are selected from the group consisting of $Ca^{2+}$ and $Mg^{2+}$, and combinations thereof.

10. The method according to claim 1, wherein the solid carbonate composition is produced without the use of an alkalinity source.

11. The method according to claim 1, wherein the carbonate material comprises a UV absorber.

12. The method according to claim 1, wherein the carbonate material applied onto the surface has a thickness of from 0.1 mm to 25 mm.

13. The method according to claim 1, wherein the carbonate material comprises a granular composition.

14. The method according to claim 13, wherein the granular composition comprises a pigment.

15. The method according to claim 13, wherein applying comprises dispensing the granular composition onto the surface.

16. The method according to claim 13, wherein the granular composition comprises granules ranging in size from 50 µm to 5 mm.

17. The method according to claim 1, wherein the carbonate material exhibits a near infra-red (NIR) reflectance ranging from Rg;0=0.0 to Rg;0=1.0.

18. The method according to claim 1, wherein the carbonate material has a hardness ranging from 3 to 8 Mohs.

* * * * *

UNITED STATES PATENT AND TRADEMARK OFFICE
CERTIFICATE OF CORRECTION

PATENT NO. : 10,203,434 B2
APPLICATION NO. : 14/214129
DATED : February 12, 2019
INVENTOR(S) : Brent R. Constantz et al.

Page 1 of 1

It is certified that error appears in the above-identified patent and that said Letters Patent is hereby corrected as shown below:

In the Specification

Please replace "sellable" with -- settable -- (Column 26, Line 28);

Please replace "sellable" with -- settable -- (Column 26, Line 32);

Please replace "sellable" with -- settable -- (Column 26, Line 50).

Signed and Sealed this
Twenty-third Day of July, 2019

Andrei Iancu
*Director of the United States Patent and Trademark Office*